(12) United States Patent
Nishimura et al.

(10) Patent No.: US 9,325,868 B2
(45) Date of Patent: Apr. 26, 2016

(54) IMAGE PROCESSOR DISPLAYING PLURAL FUNCTION KEYS IN SCROLLABLE STATE

(71) Applicant: KONICA MINOLTA, INC., Chiyoda-ku (JP)

(72) Inventors: Ryosuke Nishimura, Toyokawa (JP); Yoichi Kurumasa, Toyokawa (JP); Yoshiyuki Tamai, Toyohashi (JP); Mie Kawabata, Toyokawa (JP); Mitsutaka Morita, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 107 days.

(21) Appl. No.: 14/085,998

(22) Filed: Nov. 21, 2013

(65) Prior Publication Data

US 2014/0145987 A1 May 29, 2014

(30) Foreign Application Priority Data

Nov. 22, 2012 (JP) ................. 2012-256002

(51) Int. Cl.
*H04N 1/00* (2006.01)
*G06F 3/0482* (2013.01)
*G06F 3/0488* (2013.01)

(52) U.S. Cl.
CPC .......... *H04N 1/00411* (2013.01); *G06F 3/0482* (2013.01); *H04N 1/00413* (2013.01); *H04N 1/00419* (2013.01); *H04N 1/00424* (2013.01); *H04N 1/00474* (2013.01); *H04N 1/00482* (2013.01); *G06F 3/04886* (2013.01); *H04N 2201/0094* (2013.01)

(58) Field of Classification Search
None
See application file for complete search history.

(56) References Cited

U.S. PATENT DOCUMENTS

2006/0274347 A1  12/2006  Mori
2009/0070711 A1*  3/2009  Kwak et al. ............. 715/829

(Continued)

FOREIGN PATENT DOCUMENTS

JP  2003-316210 A  11/2003
JP  2006-043896 A  2/2006

(Continued)

OTHER PUBLICATIONS

Office Action (Notification of Reasons for Refusal) issued on Nov. 4, 2014, by the Japan Patent Office in corresponding Japanese Patent Application No. 2012-256002, and an English Translation of the Office Action. (6 pages).
Decision of Rejection issued in corresponding Japanese Patent Application No. 2012-256002; mailed Jan. 27, 2015, and English translation thereof (4 pages).

*Primary Examiner* — Antonio Xavier
(74) *Attorney, Agent, or Firm* — Buchanan Ingersoll & Rooney PC

(57) ABSTRACT

An image processor displays a mapscroller screen including a function key display region and an icon display region. The function key display region displays a plurality of function keys arrayed in first direction while being scrollable in the first direction, the plurality of function keys receiving a setting of a function related to image processing, and the icon display region displays a plurality of icons arrayed in the first direction in an order identical to that of the plurality of function keys displayed in the function key display region, the plurality of icons corresponding to the plurality of function keys displayed in the function key display region. The image processor groups and displays, on the mapscroller screen, the function key and icon corresponding to the function, in which the setting is received when a grouping instruction is received with the settings of the plurality of functions received.

21 Claims, 39 Drawing Sheets

(56) References Cited

U.S. PATENT DOCUMENTS

| | | | |
|---|---|---|---|
| 2011/0161867 A1* | 6/2011 | Tomita et al. | 715/785 |
| 2011/0199639 A1* | 8/2011 | Tani et al. | 358/1.15 |
| 2011/0317192 A1* | 12/2011 | Fukuoka et al. | 358/1.13 |
| 2012/0030636 A1* | 2/2012 | Miyazaki et al. | 715/863 |
| 2012/0069364 A1* | 3/2012 | Kodama et al. | 358/1.9 |
| 2012/0272136 A1 | 10/2012 | Takami | |

FOREIGN PATENT DOCUMENTS

| | | |
|---|---|---|
| JP | 2006-323504 A | 11/2006 |
| JP | 2010-277183 A | 9/2010 |
| JP | 2011-170574 A | 9/2011 |
| JP | 2012-068817 A | 4/2012 |
| JP | 2012-068934 A | 4/2012 |
| WO | 2011-065285 A1 | 6/2011 |

\* cited by examiner

FIG.35
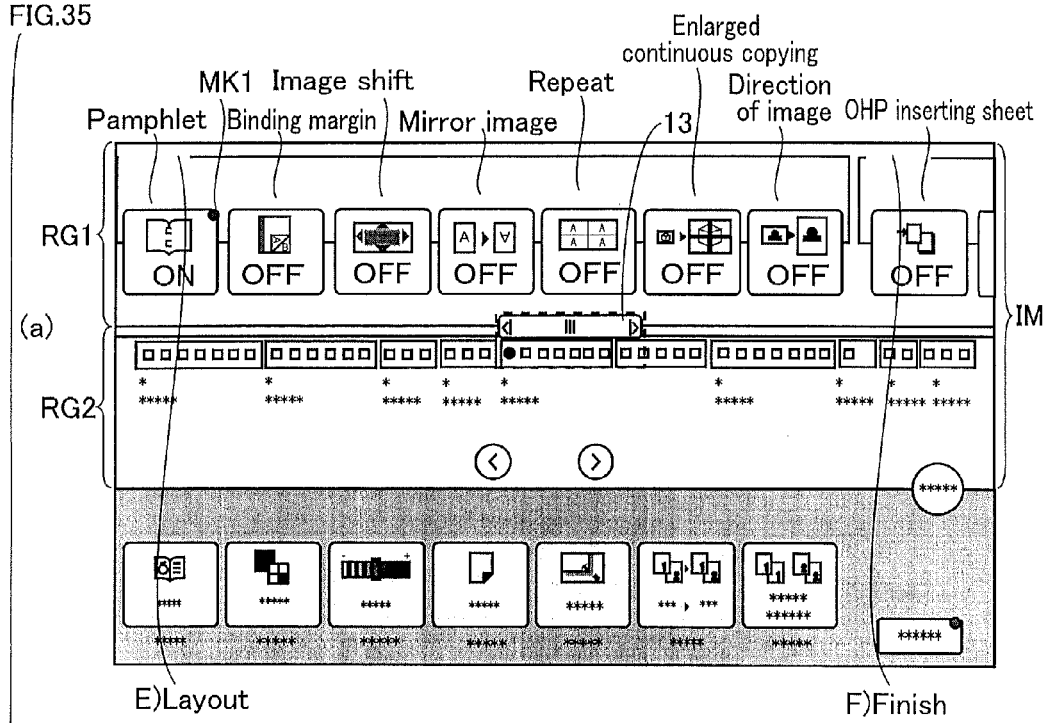
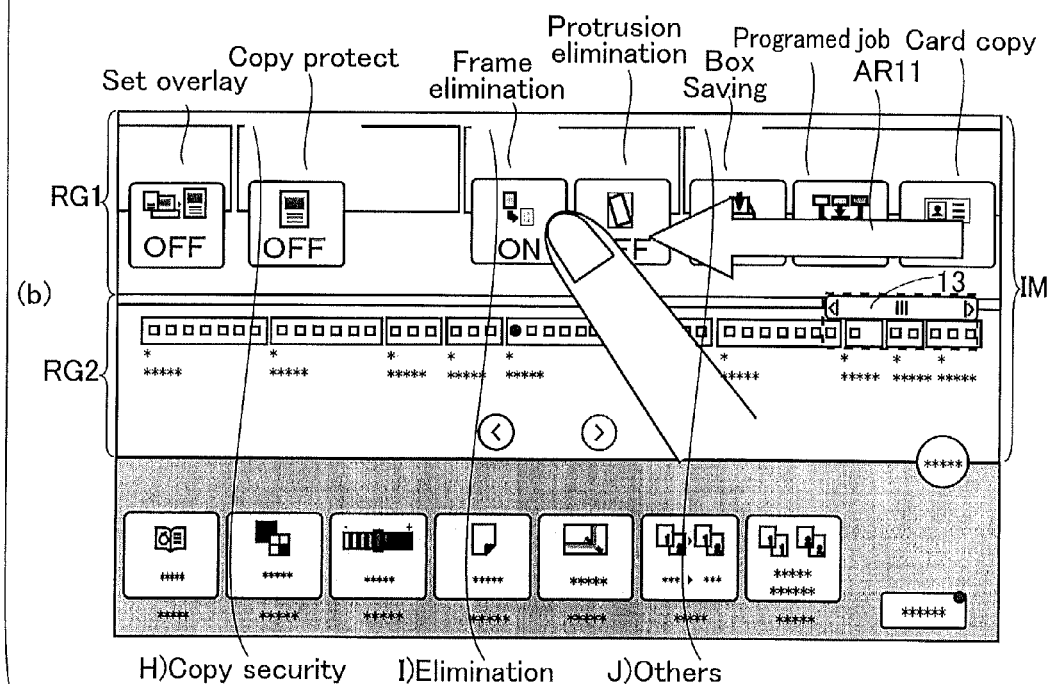

IMAGE PROCESSOR DISPLAYING PLURAL FUNCTION KEYS IN SCROLLABLE STATE

This application is based on Japanese Patent Application No. 2012-256002 filed with the Japan Patent Office on Nov. 22, 2012, the entire content of which is hereby incorporated by reference.

BACKGROUND OF THE INVENTION

1. Field of the Invention

The present invention relates to an image processor, more particularly to an image processor that can easily check a function setting situation.

2. Description of the Related Art

Nowadays, what is called a multifunction peripheral (hereinafter sometimes referred to as an MFP) including various functions such as a copier, a scanner, a facsimile machine, a network printer, and a document server is in widespread use.

Such an image processor as the MFP can perform many functions. At the same time, there is a limitation to a screen size of an operation panel of the image processor. It is impossible that all characters and graphics expressing functions and setting items, which can be performed by the image processor, are displayed at once on the screen of the operation panel with the size that can be visually recognized by a user. When the user displays a desired function on the screen of the operation panel, frequently an operation method becomes complicated. Therefore, recently a mapscroller function is proposed in the image processor.

In the mapscroller function, a mapscroller screen in which function keys (a function content is encoded and expressed by a simple picture) are arrayed is displayed on a display unit of the image processor, the function keys can be selected by scrolling the mapscroller screen, and the setting of the function related to image processing is received through the function key. The mapscroller screen includes a function key display region and an icon display region. The plurality of function keys are horizontally arrayed in the function key display region while being scrollable. In the icon display region, icons (dot marks) indicating whether the setting is performed through the function key displayed in the function key display region are horizontally arrayed in the order identical to the function keys displayed in the function key display region.

The user can get an overview of how many function keys are included in the image processor using the plurality of icons displayed in the icon display region. Additionally, the user can touch the icon (or perform an operation to scroll the function key display region) to scroll the function key display region, and display the function key related to the touch icon. As a result, the user can sequentially set the plurality of functions without switching the operation screen.

In the case the user sets many functions on the mapscroller screen, sometimes the user hardly recognizes the functions in which the setting is already performed or the functions in which the setting is not performed yet. In the case that the user set such the function that has an influence on another function, the MFP automatically sets another function (for example, in the case that the user sets the function of "pamphlet", the MFP automatically sets three functions of "scaling factor setting", "double-sided/page grouping", and "finish"). Therefore, sometimes the user does not recognize that other functions are automatically set. In the case that the setting performed through the function key has the complicated content (for example, in the case that an angle of the character displayed in copy protect can be set by a numerical value through the function key of "copy protect"), sometimes the user hardly understands the specific content of the setting. Accordingly, in the image processor, there is a demand to display a list of already-set functions or not-set functions.

For example, Documents 1 to 3 disclose a technology for displaying a list of the functions of the image processor.

Document 1 discloses a technology, in which a setting check button is displayed on various operation screens through which an input operation is received from the outside and a setting check screen on which setting contents are recited is displayed when the setting check button is pressed.

Document 2 discloses a technology in which a window including a list display region where the plurality of function keys (called an "icons" in Document 2) are displayed and a already-set display region where the assigned function key is displayed is displayed on the screen of the display device.

Document 3 discloses a technology, in which a function badge line in which plural function keys (called a "function badge" in Document 3) selecting the functions is displayed on the display unit while partially scrolled in accordance with the position of the window moving on a scroll track. In the technology, the scroll track is divided into a restricted function region and a non-restricted function region. The function badge in which a usage right is provided only to a specific user is displayed on the display unit in the case that the window is located in the restricted function region, the function badge except that of the restricted function is displayed on the display unit in the case that the window is located in the non-restricted function region.

[Document 1] Japanese Patent Publication Laying-Open No. 2006-43896
[Document 2] Japanese Patent Publication Laying-Open No. 2006-323504
[Document 3] Japanese Patent Publication Laying-Open No. 2012-68934

In the technology disclosed in Document 1, the setting check button is displayed on not the mapscroller screen but the usual setting screen. Therefore, in order to display the list of the setting contents received from the user, it is necessary to close the mapscroller screen to display the operation screen including the setting check button. As a result, unfortunately it takes a lot of trouble with checking the setting contents.

In the technology disclosed in Document 2, in the case that many functions are set, unfortunately all the function keys related to the set functions are hardly displayed in the already-set display region.

In the technology disclosed in Document 3, although the functions can be checked by the list, the function keys of the already-set functions (or the function keys of the not-set functions) cannot be listed.

SUMMARY OF THE INVENTION

In accordance with one aspect of the present invention, an image processor includes: a first display unit for displaying an operation screen including a function key display region and an icon display region, the function key display region displaying a plurality of function keys arrayed in first direction while being scrollable in the first direction, the plurality of function keys receiving a setting of a function related to image processing, the icon display region displaying a plurality of icons arrayed in the first direction in an order identical to that of the plurality of function keys displayed in the function key display region, the plurality of icons corresponding to the plurality of function keys displayed in the function key display region; a setting receiving unit for receiving the settings of the plurality of functions related to the image processing; a second display unit for grouping and displaying, on the operation screen, at least a part of the plurality of function keys corresponding to the plurality of functions, in which the setting is received by the setting receiving unit, or at least a part of grouping target keys in the plurality of function keys corresponding to the plurality of functions, in which the setting is not received by the setting receiving unit when the setting receiving unit receives the settings of the plurality of functions; and a grouping instruction receiving unit for receiving a grouping instruction. In the image processor, the second display unit groups and displays the grouping target keys when the grouping instruction receiving unit receives the grouping instruction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 35 is a view schematically illustrating the state in which the setting of the function of "pamphlet" is received in a tenth function key grouping method.

DESCRIPTION OF THE PREFERRED EMBODIMENTS

Hereinafter, an embodiment of the present invention will be described with reference to the drawings.

[Configuration of Image Processing System]

First, a schematic configuration of an image processing system of the present embodiment will be described.

The following image processing system is a system including an image forming apparatus (an example of the image processor) that forms an image by an electrophotographic method or an electrostatic recording method. The image forming apparatus of the present embodiment may be an MFP including a scanner function, a facsimile function, a copying function, a function as a printer, a data communication function, and a server function, a facsimile machine, a copying machine, or a printer. The image processing system may be a system including an image processor such as a PC (Personal Computer) and a scanner instead of the image forming apparatus.

Figure 1:
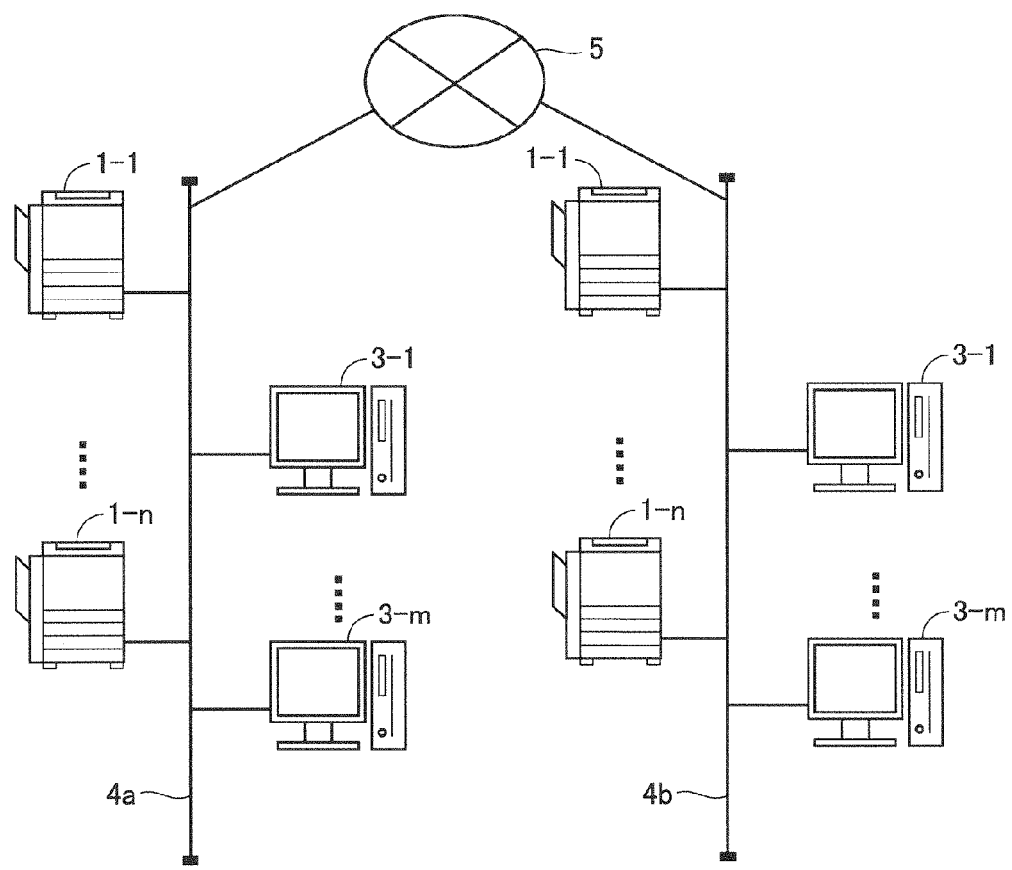
FIG. 1 is a view illustrating a schematic configuration of an image processing system according to a first embodiment of the present invention.

Referring to FIG. 1, the image processing system includes n (n is a natural number) image forming apparatuses 1-1 to 1-n (an example of the image processor) and m (m is a natural number) information processing apparatuses 3-1 to 3-m. Image forming apparatuses 1-1 to 1-n and information processing apparatuses 3-1 to 3-m are connected to one another through a network 4a. Network 4a is connected to a network 4b through an external network 5.

Hereinafter, sometimes any one of image forming apparatuses 1-1 to 1-n is referred to as an image forming apparatus 1. Sometimes any one of information processing apparatuses 3-1 to 3-m is referred to as an information processing apparatus 3. Sometimes any one of networks 4a and 4b is referred to as a network 4.

For example, a dedicated line such as a wired or wireless LAN (Local Area Network) is used in network 4. Various devices are connected to network 4 using a protocol of TCP/IP (Transmission Control Protocol/Internet Protocol). The devices connected to network 4 can exchange various pieces of data with each other. Network 4 may be one in which a general line or wireless communication is used.

Image forming apparatus 1 forms a copied image of a scanned original image or a copied image of an image, which is generated based on print data received from information processing apparatus 3, on a sheet. The print data means, for example, one in which a printer driver converts a drawing command issued by an operating system or an application program of information processing apparatus 3 into a page-description language that can be processed by image forming apparatus 1. The print data may be document data described in a file format such as PDF, TIFF, JPEG and XPS.

Image forming apparatus 1 can transmit the original image to information processing apparatus 3 or another image forming apparatus 1 through network 4. Image forming apparatus 1 can also transmit the original image to another image forming apparatus 1 and information processing apparatus 3, which are connected to another network 4, through external network 5. Image forming apparatus 1 can accumulate the original image and the document data, which are received from information processing apparatus 3, in a fixed storage device in image forming apparatus 1.

Information processing apparatus 3 is a general computer device including a CPU, a RAM, a fixed storage device (such as a hard disk drive), a monitor, a keyboard, and a mouse. Information processing apparatus 3 generates the print data in response to a user's instruction, and transmits the generated print data to image forming apparatus 1.

The image processing system needs to include the image processor, and may have a configuration different from that in FIG. 1.

Figure 2:
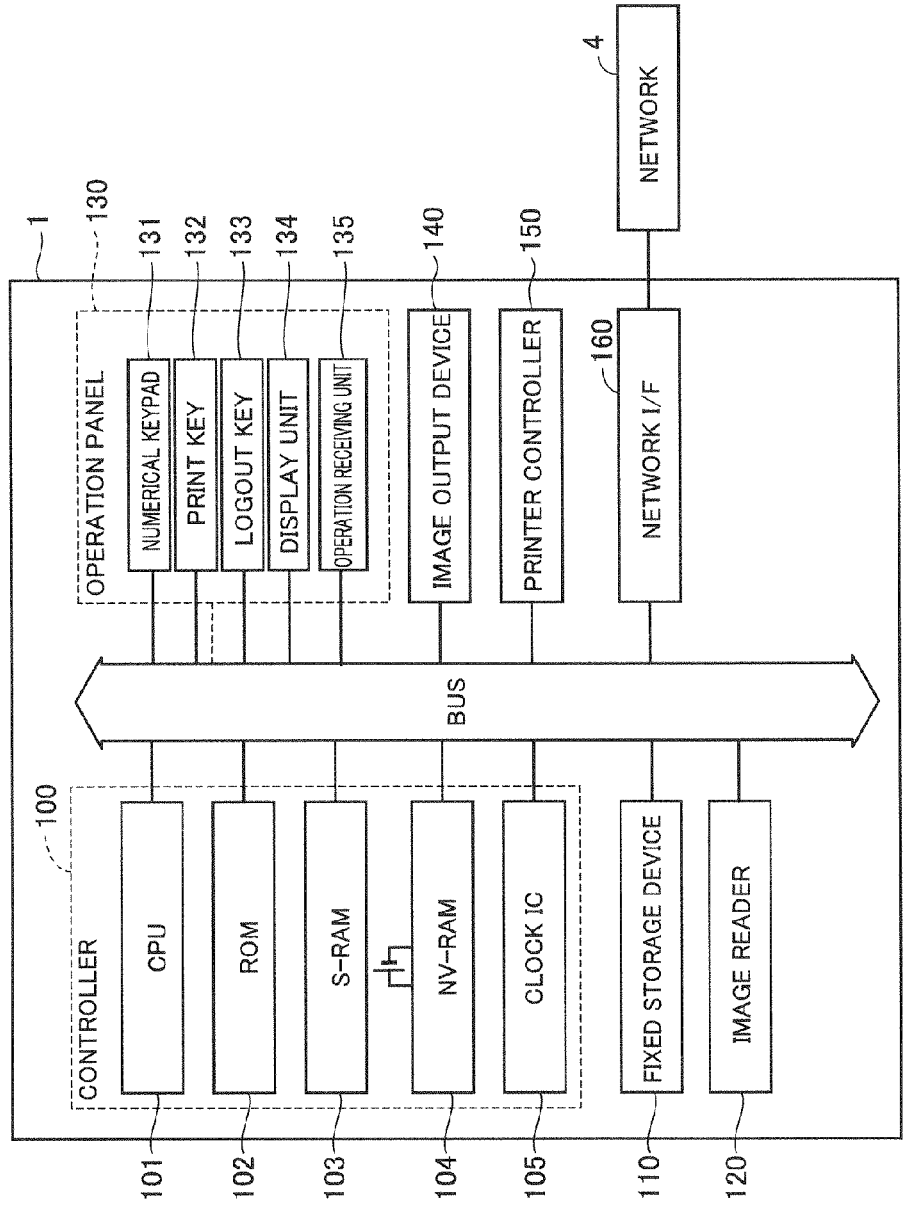
FIG. 2 is a block diagram illustrating an internal configuration of an image forming apparatus 1.

FIG. 2 is a block diagram illustrating an internal configuration of image forming apparatus 1.

Referring to FIG. 2, image forming apparatus 1 includes a controller 100, a fixed storage device 110, an image reader 120, an operation panel 130, an image output device 140, a printer controller 150, and network interface OF 160. Fixed storage device 110, image reader 120, operation panel 130, image output device 140, printer controller 150, and network OF 160 are connected to controller 100 through a bus.

Controller 100 controls the whole of image forming apparatus 1 with respect to various jobs such a scan job, a copy job, a mail transmission job, and a print job. Controller 100 includes a CPU 101, a ROM 102, an SRAM (Static Random Access Memory) 103, an NVRAM (Non Volatile Random Access Memory, nonvolatile memory) 104, and a clock IC (Integrated Circuit) 105. CPU 101, ROM 102, SRAM 103, NVRAM 104, and clock IC 105 are connected to one another through the bus. CPU 101 executes a control program stored in ROM 102. The control program controlling action of the image forming apparatus 1 is stored in ROM 102. SRAM 103 is a working memory for CPU 101. Various settings related to the image formation are stored in NVRAM 104 by battery backup.

For example, fixed storage device 110 is the hard disk drive in which various pieces of processing are stored.

Image reader 120 reads the image of the original.

Operation panel 130 receives various inputs from a user, and displays various pieces of information. Operation panel 130 includes a numerical keypad 131 used to input a numerical character, a print key 132 used to receive an instruction to perform print, an logout key 133 used to receive a logout instruction from the user, a display unit 134 that displays various pieces of information, and an operation receiving unit 135 that displays the image on display unit 134 to receive operations of software keys displayed on display unit 134. For example, operation receiving unit 135 is a touch panel that receives a touch operation performed to display unit 134. Operation panel 130 may include a hardware key in addition to numerical keypad 131, print key 132, and logout key 133.

Image output device 140 forms a copied image on the sheet.

Printer controller 150 generates a copied image from the print data received by network I/F 160.

Network I/F 160 connects image forming apparatus 1 to network 4. Network I/F 160 transmits and receives various pieces of information to and from an external device such as another image forming apparatus 1 and information processing apparatus 3.

[Entire Processing Performed by Image Forming Apparatus]

Then, entire processing performed by image forming apparatus 1 will be described.

Figure 3:
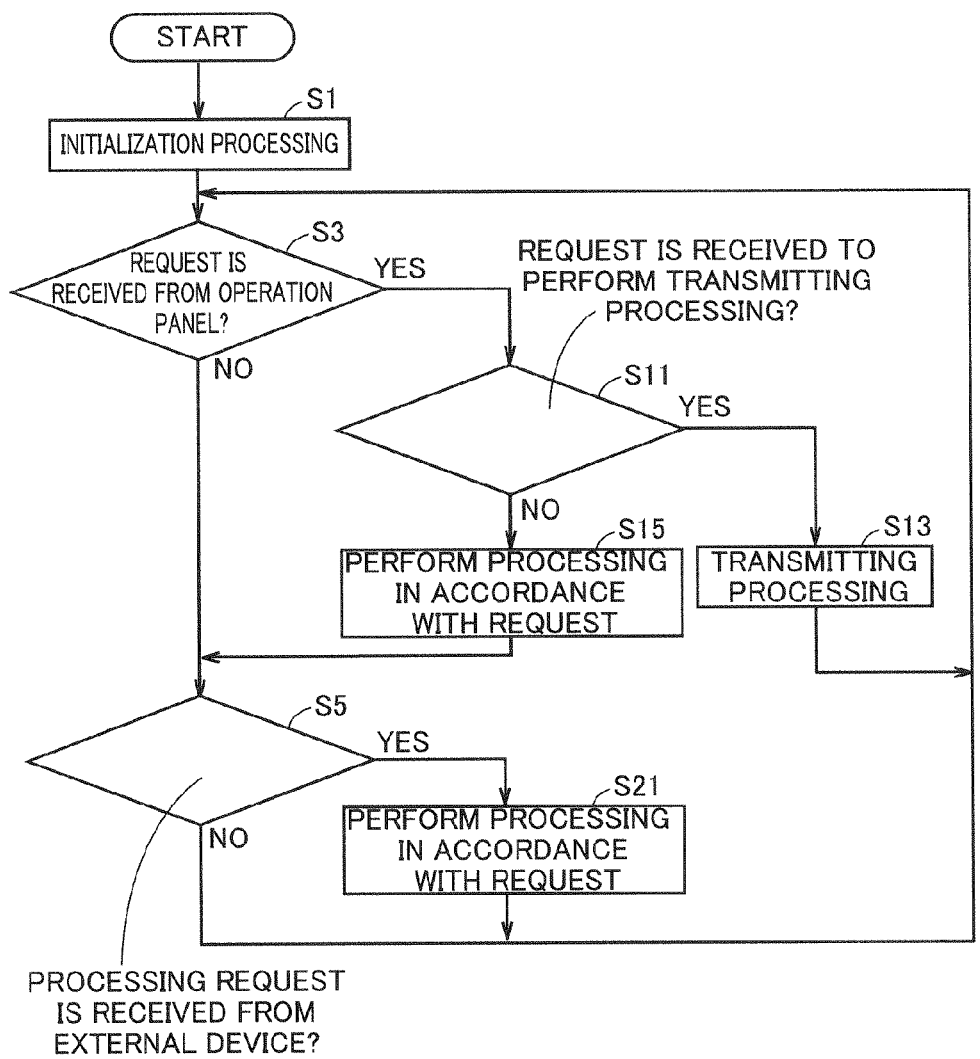
FIG. 3 is a flowchart of entire processing performed by the image forming apparatus 1 of an embodiment of the present invention.

FIG. 3 is a flowchart of the entire processing performed by image forming apparatus 1 of an embodiment of the present invention.

Referring to FIG. 3, CPU 101 of image forming apparatus 1 performs initialization processing when the image forming apparatus 1 starts processing at power-up (S1). In the initialization processing, for example, the memory is cleared and a standard mode is set as a setting of a job performed by image forming apparatus 1. Then, CPU 101 determines whether some sort of request (such as copying processing and various pieces of setting processing) is received from the user based on the hardware key (a key switch group) of operation panel 130 or software key operation received by operation receiving unit 135 (S3).

When it is determined that the request is received in step S3 (YES in S3), CPU 101 determines whether the received request is a request to perform original scanning and transmitting processing (S11). On the other hand, when it is determined that the request is not received in step S3 (NO in S3), the CPU 101 goes to the processing in step S5.

When the received request is the request to perform the original scanning and transmitting processing in step S11 (YES in S11), CPU 101 performs the original scanning and transmitting processing (S13). Then CPU 101 goes to the processing in step S3. On the other hand, when the received request is a request to perform another piece of processing except the original scanning and transmitting processing in step S11 (NO in S11), CPU 101 performs the processing in accordance with the received request (S15). Then CPU 101 goes to the processing in step S5. For example, the processing except the original scanning and transmitting processing means processing of copying the original, processing of scanning the original, and processing of changing various settings stored in NVRAM 104.

In step S5, CPU 101 determines whether a processing request (such as document print processing and various pieces of setting processing) is received from the external device such as information processing apparatus 3 through network 4 (S5). When it is determined that the processing request is received from the external device in step S5 (YES in S5), CPU 101 performs the processing in accordance with the received request (S21). Then CPU 101 goes to the processing in step S3. For example, the processing performed in step S21 means the print job transmitted from the external device such as information processing apparatus 3 and the processing of changing various settings stored in NVRAM 104. On the other hand, when it is determined that the processing request is not received from the external device in step S5 (NO in S5), CPU 101 goes to the processing in step S3.

[Configuration of Mapscroller Screen]

Next, a configuration of a mapscroller screen will be described.

Figure 4:
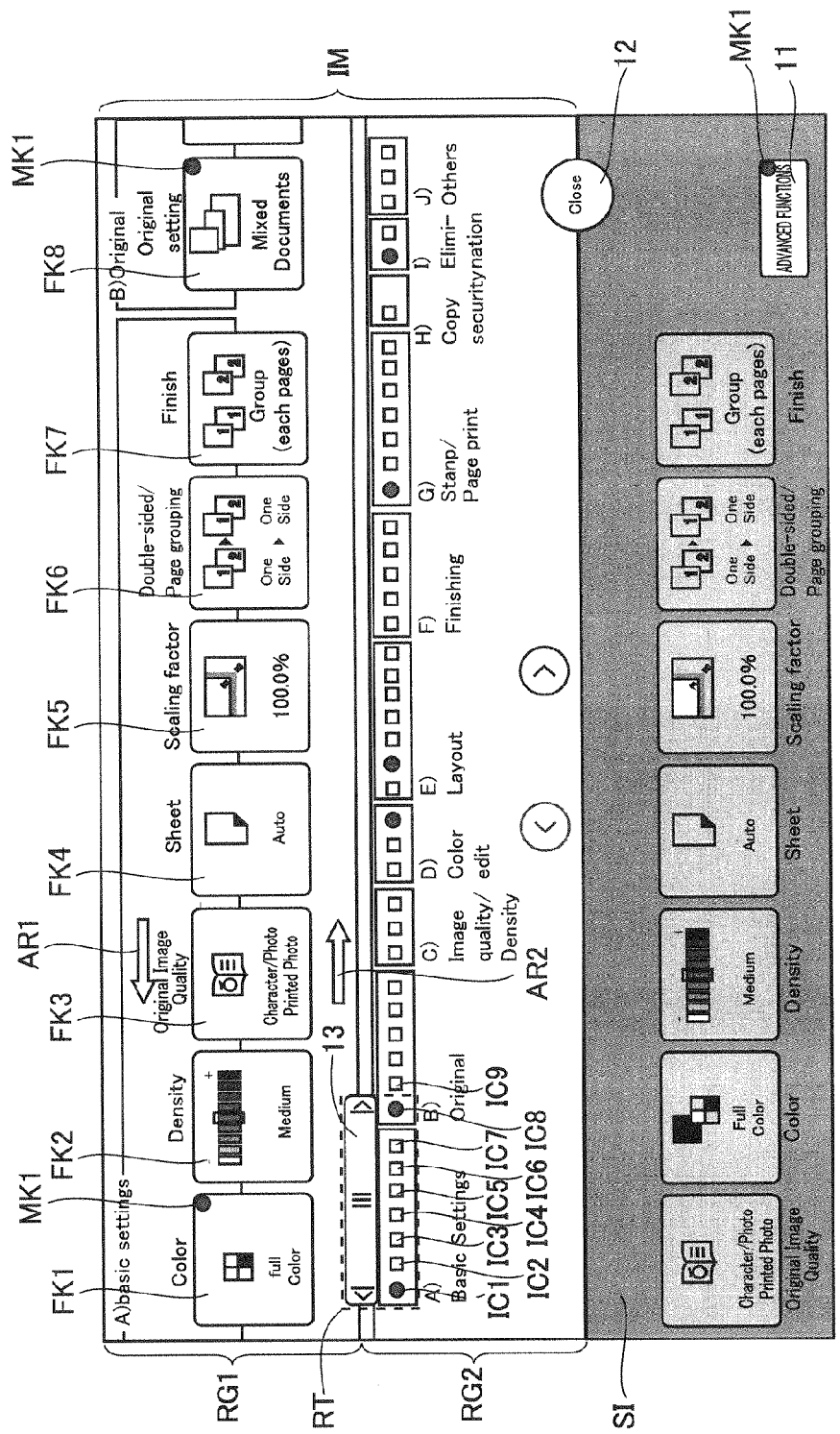
FIG. 4 is a view schematically illustrating a mapscroller screen IM displayed on a display unit 134 of an operation panel 130.

FIG. 4 is a view schematically illustrating a mapscroller screen IM displayed on display unit 134 of operation panel 130. Hereinafter, sometimes a left side of each of a function key display region RG1 and an icon display region RG2 is referred to as a front, and a right side of each of function key display region RG1 and icon display region RG2 is referred to as a rear. In FIG. 4, function key display region RG1 is scrolled to a front end, and a cursor 13 is located at the front end of icon display region RG2.

Referring to FIG. 4, image forming apparatus 1 displays a print start screen SI on display unit 134 of operation panel 130 when performing the initialization processing. Each function key related to a basic function and an application setting key 11 are displayed on start screen SI. In the case that application setting key 11 is pressed in start screen SI, image forming apparatus 1 performs pop-up display of mapscroller screen IM (an example of the operation screen) related to an application function on start screen SI. Mapscroller screen IM includes function key display region RG1 and icon display region RG2. For example, function key display region RG1 is provided in an upper portion of mapscroller screen IM, and icon display region RG2 is provided in a central portion of mapscroller screen IM with located adjacent to function key display region RG1.

In the case that mapscroller screen IM is displayed, image forming apparatus 1 performs grayout of start screen SI, but does not receive the operation of each function key of the basic setting included in start screen SI. When receiving the press of a close key 12, image forming apparatus 1 closes mapscroller screen IM, and receives the operation of each function key of the basic setting included in start screen SI.

Plural function keys used to receive the settings of the functions related to image processing are horizontally arrayed in function key display region RG1 while being scrollable. Each of the function keys are grouped in accordance with a function attribute. In the state in FIG. 4, function keys FK1 to FK7 belonging to the group of "A) basic settings" and a function key FK8 belonging to the group of "B) original" are displayed in this order from the front toward the rear of the mapscroller screen IM. In the function keys related to the application function, the function keys except the function keys FK1 to FK8 are not displayed in the state in FIG. 4. The function keys except the function keys FK1 to FK8 are displayed in the case that function key display region RG1 is scrolled to the rear.

Function keys FK1 to FK7 belonging to the group of "A) basic settings" are function keys of "color", "density", "original image quality", "sheet", "scaling factor", "double-sided/page grouping", and "finish", respectively. Function key FK8 belonging to the group of "B) original" is a function key of an "original setting".

Icon display region RG2 is a region where map display of a list of application functions mounted on image forming apparatus 1 is performed. A plurality of icons corresponding to all (substantially all) the function keys displayed in function key display region RG1 are arrayed in icon display region RG2 from the front toward the rear of icon display region RG2 in the same order as the function keys displayed in function key display region RG1 while grouped according to the function attribute. Specifically, icons IC1 to IC7 belonging to the group of "A) basic settings" and an icon IC8 belonging to the group of "B) original" in icon display region RG2 correspond to function keys FK1 to FK8. Because the seven icons belong to the group of "A) basic settings", the user can recognize that the seven function keys exist in the group of "A) basic settings". Because the six icons belong to the group of "B) original", the user can recognize that the six function keys exist in the group of "B) original".

Cursor 13 is displayed in the upper portion of icon display region RG2. Cursor 13 overlaps the plurality of icons. Specifically, cursor 13 overlaps the icons (eight icons IC1 to IC8 in the state in FIG. 4) included in a rectangle RT, which is formed so as to surround cursor 13, in the plurality of icons displayed in icon display region RG2. The function keys (function keys FK1 to FK8 in the state in FIG. 4) corresponding to the eight icons overlapped with cursor 13 are displayed in function key display region RG1.

The function keys and the icons are not necessarily arrayed in the horizontal direction, but the function keys and the icons may be arrayed in any direction. Mapscroller screen IM is displayed in any configuration, and function key display region RG1, icon display region RG2, and cursor 13 are the displayed in any position.

The user sets the function related to the print by pressing the function key displayed on mapscroller screen IM or the function key that is of the hardware key of operation panel 130. When receiving the press of the function key, image forming apparatus 1 receives the setting related to the function key (or performs the pop-up display of the screen in which the detailed setting related to the function key is received). In image forming apparatus 1, the setting received from the user is stored in NVRAM 104, for example.

As used herein, an "already-set function" means a function in which the setting is changed from a setting content of an initial state by the user and an enabled function. An "already-set function key" means a function key corresponding to the already-set function, and an "already-set icon" means an icon corresponding to the already-set function. A "not-set function" means a function in which the setting is not changed from a state of an initial mode of the print or a disabled function. A "not-set function key" is a function key corresponding to the not-set function, and a "not-set icon" is an icon corresponding to the not-set function.

In the plurality of function keys displayed in function key display region RG1, a mark MK1 indicating the setting is already performed is displayed in the already-set function key. In the state in FIG. 4, marks MK1 are displayed in application setting key 11 and function keys FK1 and FK8.

In the plurality of icons displayed in icon display region RG2, the already-set icon is displayed in the display configuration different from that of the not-set icon. In the state in FIG. 4, icons IC1 and IC8 that are of the already-set icon are displayed into a circular shape, and icons IC2 to IC7 that are of the not-set icon are displayed into a rectangular shape.

The user can scroll function key display region RG1 by performing a flick operation or a scroll operation along the direction in which the function keys are arrayed in function key display region RG1. When receiving the scroll operation, image forming apparatus 1 scrolls function key display region RG1, and displays the function key existing in the post-scroll position. For example, in the case that the user performs the scroll operation such that function key display region RG1 is scrolled by one function key in the direction (the direction from the front toward the rear) indicated by an arrow AR1, function key FK1 at the front end of function key display region RG1 is not displayed, but the second function key from the left in the group of the "original" is newly displayed after function key FK8. Each of function keys FK2 to FK8 moves forward by one function key. Cursor 13 moves backward by one icon, and overlaps six icons IC2 to IC7 in the group of "A) basic settings" and two icons IC8 and IC9 in the group of "B) original".

The user touches cursor 13 to move (drag) cursor 13 in the direction (the horizontal direction) in which the icons are arrayed, which allows the user to freely move cursor 13 in the horizontal direction in icon display region RG2. When receiving the drag operation of cursor 13, image forming apparatus 1 moves cursor 13 to display the function keys corresponding to the eight icons overlapping post-movement cursor 13 in function key display region RG1. For example, in the case that the user moves cursor 13 by one icon in the direction indicated by an arrow AR2, cursor 13 overlaps six icons IC2 to IC7 in the group of "A) basic settings" and two icons IC8 and IC9 in the group of "B) original". As a result, six function keys FK2 to FK7 in the group of "A) basic settings" and two function keys (function key FK8 and the function key corresponding to icon IC9) in the group of "B) original" are displayed in function key display region RG1.

Figure 5:
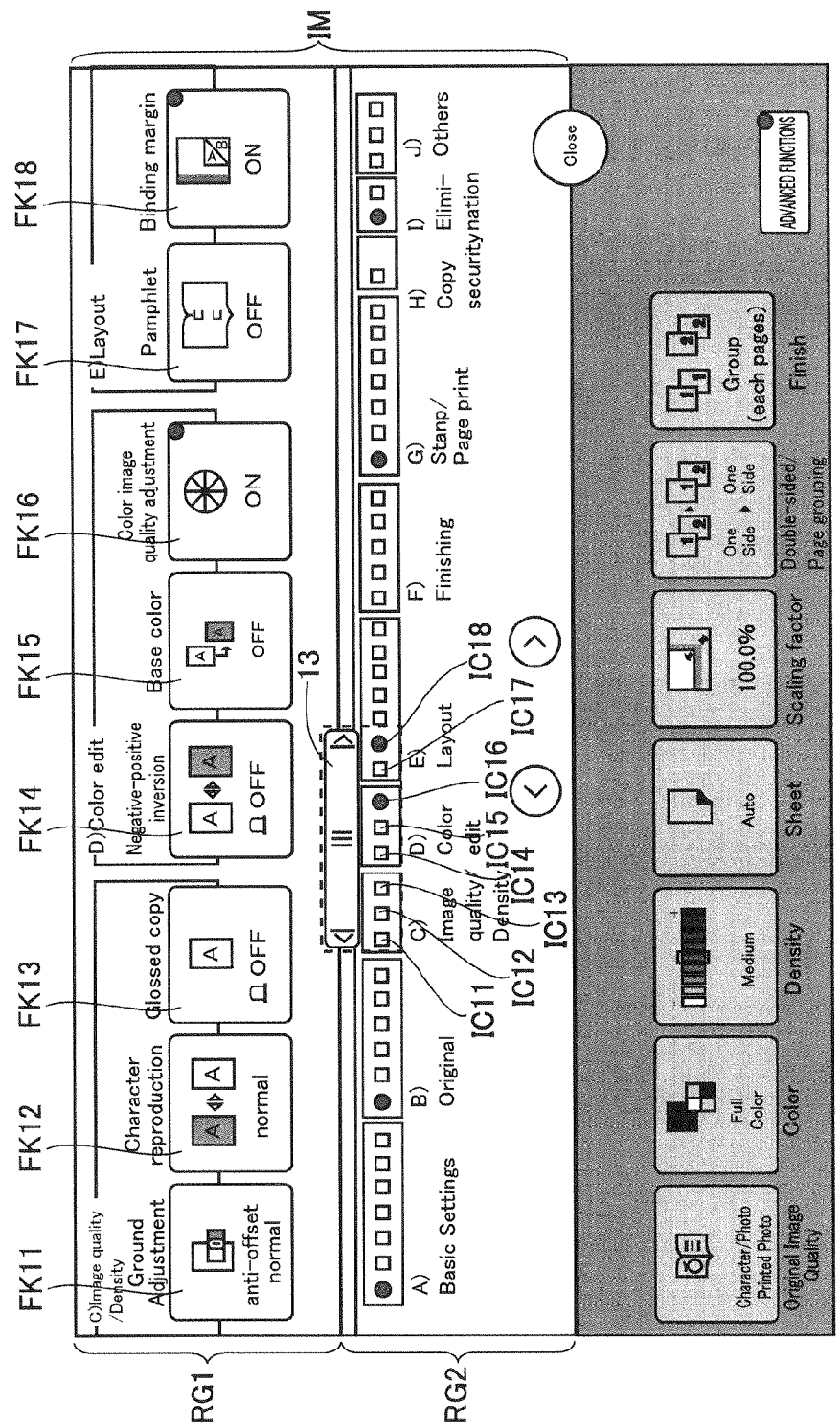
FIG. 5 is a view schematically illustrating a state in which a cursor 13 is moved from a position in FIG. 4.

FIG. 5 is a view schematically illustrating the state in which cursor 13 is moved from the position in FIG. 4.

Referring to FIG. 5, when the user moves cursor 13 to the central portion, image forming apparatus 1 displays function keys FK11 to FK18 corresponding to eight icons IC11 to IC18 overlapping post-movement cursor 13 in function key display region RG1. Function keys FK11 to FK13 and icons IC11 to IC13 belong to a group of "C) image quality/density", function keys FK14 to FK16 and icons IC14 to IC16 belong to a group of "D) color edit", function keys FK17 and FK18 and icons IC17 and IC18 belong to a group of "E) layout".

In the case that a touch to any icon displayed in icon display region RG2 is received from the user, image forming apparatus 1 may move cursor 13 to the position of the touched icon, and display the function key corresponding to the icon overlapping post-movement cursor 13 in function key display region RG1.

Then, first to tenth function key grouping methods on the mapscroller screen will be described. The grouping methods can be combined with each other.

[First Function Key Grouping Method]

In a first function key grouping method, in the case that function key display region RG1 is scrolled to the end portion (the front end or the rear end) on mapscroller screen IM, image forming apparatus 1 displays a setting check key (an example of the grouping display key), which is used to receive an instruction to group the already-set function keys, on mapscroller screen IM. When receiving the press of the setting check key, image forming apparatus 1 groups and displays all the already-set function keys and the icons.

Figure 6:
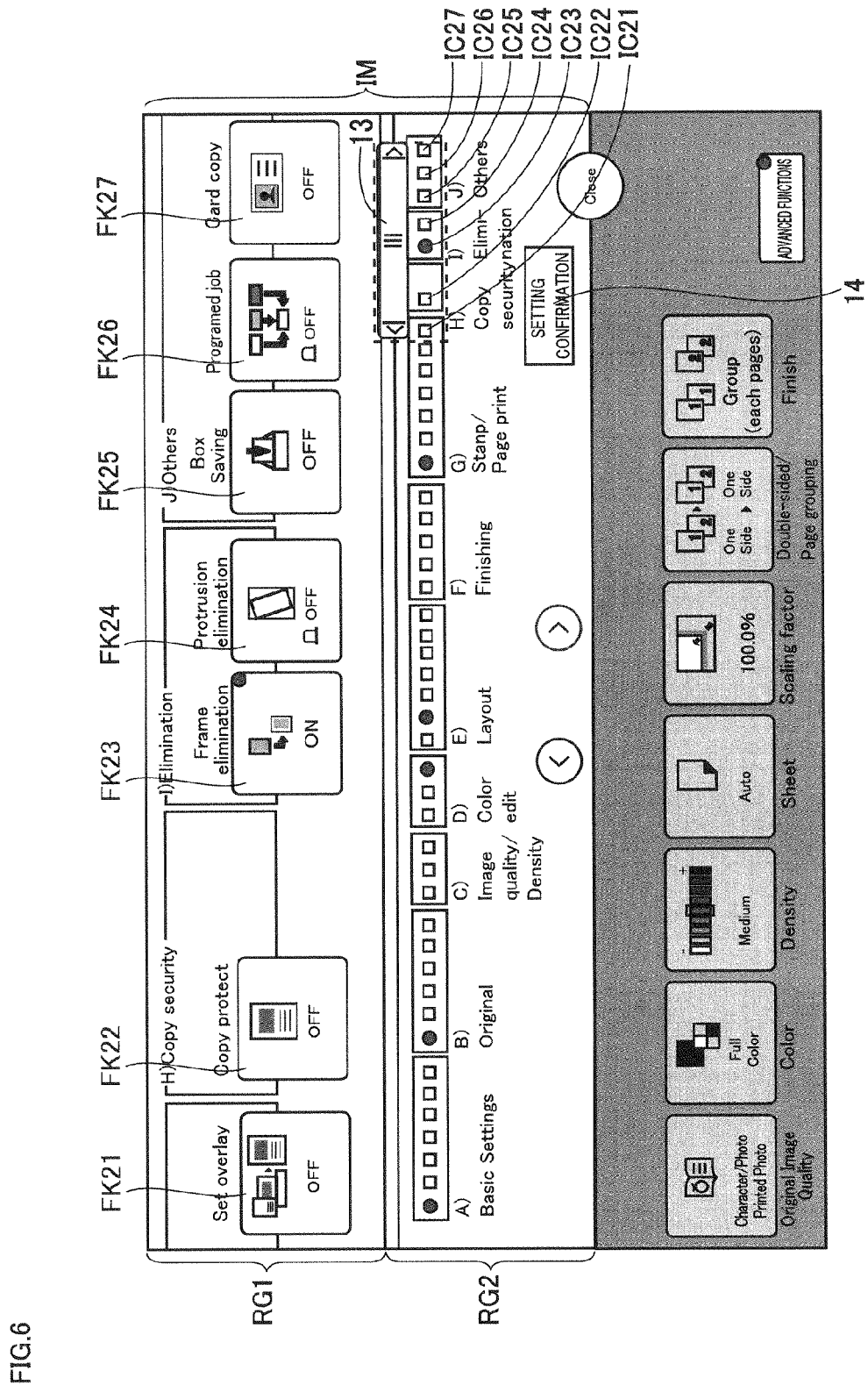
FIG. 6 is a view schematically illustrating the state in which a cursor 13 is moved to a rear end of an icon display region RG2 in a first function key grouping method.

FIG. 6 is a view schematically illustrating the state in which cursor 13 is moved to the rear end of icon display region RG2 in the first function key grouping method.

Referring to FIG. 6, image forming apparatus 1 receives the settings of the plurality of functions, and the plurality of already-set function keys (the function keys to which marks MK1 are added) exist. At this point, in the case that the user scrolls function key display region RG1 to the rear end (or in the case that the user moves cursor 13 to the rear end of icon display region RG2), image forming apparatus 1 displays function keys FK21 to FK27 corresponding to eight icons IC21 to IC27 overlapping post-movement cursor 13 in function key display region RG1, and displays setting check key 14 on mapscroller screen IM.

Setting check key 14 may be deleted, in the case that function key display region RG1 is scrolled to the position except the rear end while setting check key 14 is not pressed, or in the case that the number of functions of the settings received by image forming apparatus 1 becomes one or less. In the case that the settings of the plurality of functions are received, setting check key 14 may always be displayed on mapscroller screen IM irrespective of the position of displayed function key display region RG1.

Figure 7:
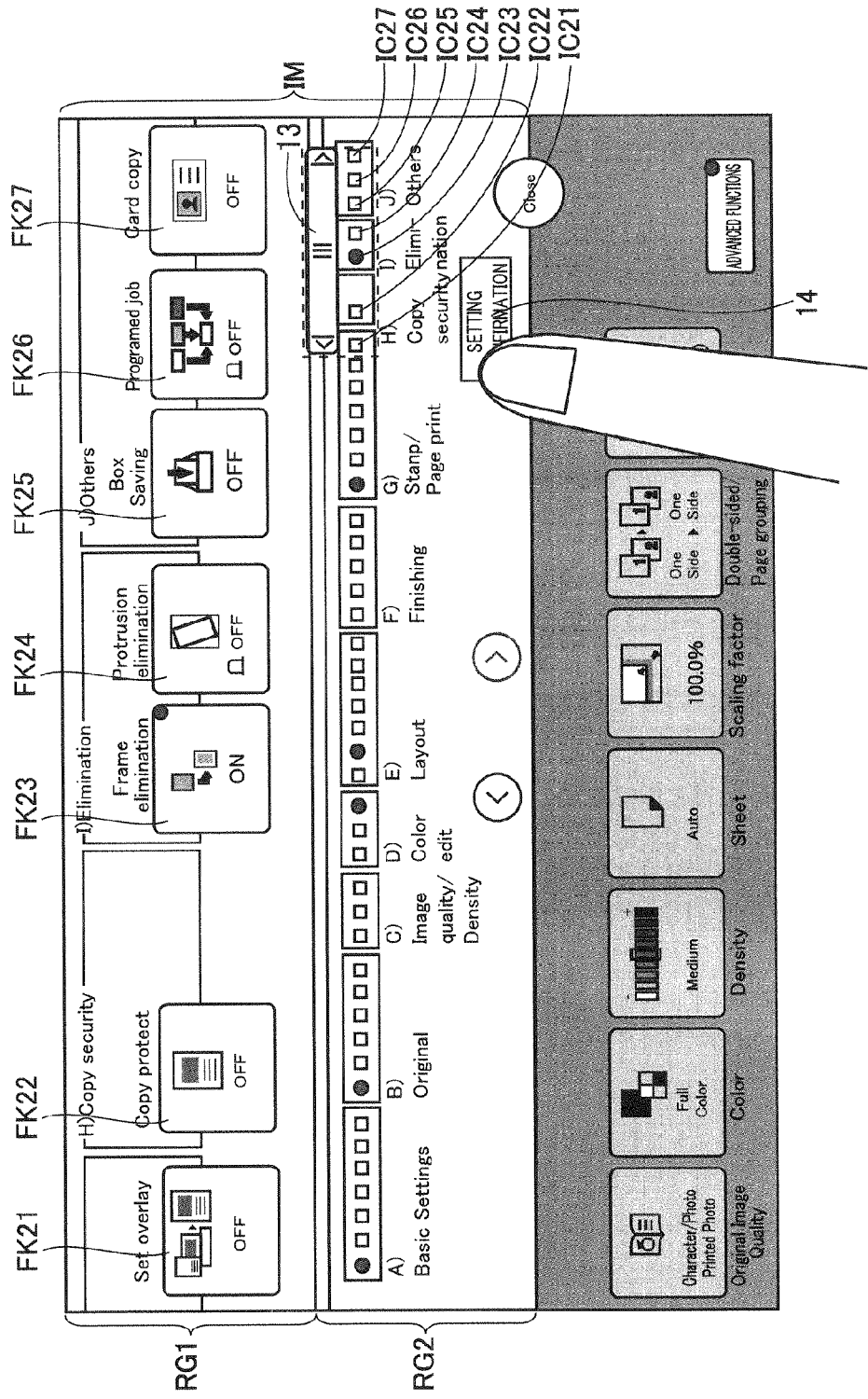
FIG. 7 is a view schematically illustrating the state in which a user presses a setting check key 14 on the mapscroller screen IM in FIG. 6.
Figure 8:
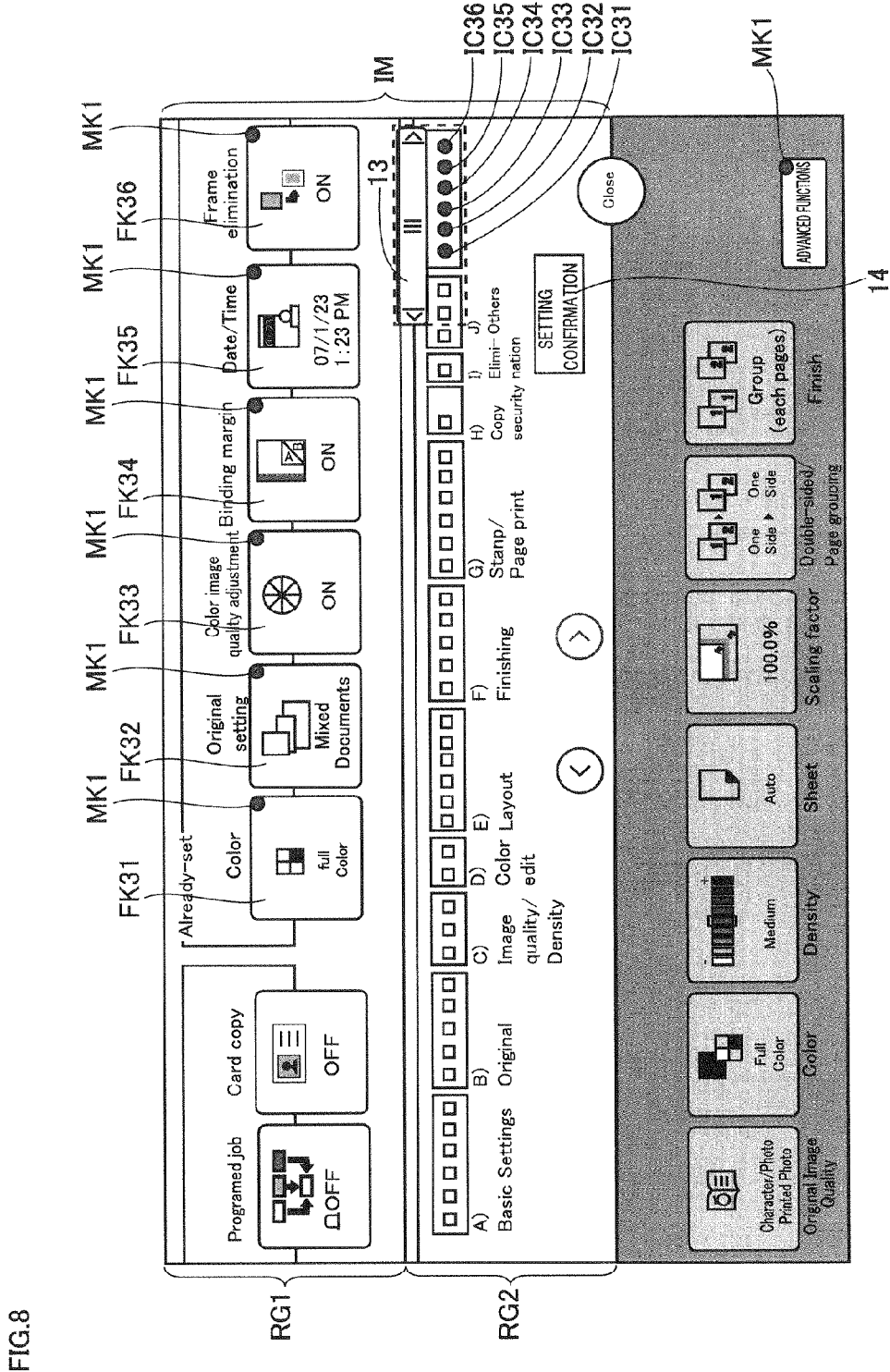
FIG. 8 is a view schematically illustrating the state in which already-set function keys and icons are grouped in the first function key grouping method.

FIG. 7 is a view schematically illustrating the state in which the user presses setting check key 14 on mapscroller screen IM in FIG. 6. FIG. 8 is a view schematically illustrating the state in which the already-set function keys and the icons are grouped in the first function key grouping method.

Referring to FIG. 7, when the user presses setting check key 14, image forming apparatus 1 arbitrarily groups and displays all the already-set function keys and the icons at the positions, as illustrated in FIG. 8.

Hereinafter, sometimes the function keys and the icon, which become a grouping target, are referred to as grouping target keys. The grouping target key may include at least any function key in at least one of the already-set function keys and at least one of the not-set function keys. In first to third, fifth, and sixth function key grouping methods, all the already-set function keys and the icons become the grouping target keys. In a fourth function key grouping method, some of the already-set function keys and the icons become the grouping target keys. In seventh and ninth function key grouping methods, all the not-set function keys and the icons become the grouping target keys. In eighth and tenth function key grouping methods, some of the not-set function keys and the icons become the grouping target keys. The grouping target key may include only the function key, but the grouping target key needs not to include the icon.

In the case that image forming apparatus 1 receives the setting of the function related to the image processing through the function key (for example, each function key related to the basic function included in start screen SI or the function key that is of the hardware key of operation panel 130), which is included in another operation screen different from mapscroller screen IM but not included in mapscroller screen IM, image forming apparatus 1 may group and display the function key and the icon together with the grouping target keys.

Referring to FIG. 8, for example, already-set function keys FK31 to FK36 are grouped and displayed at the rear end of function key display region RG1. Already-set function keys FK31 to FK36 belong to a newly-produced group of "already-set". Already-set icons IC31 to IC36 corresponding to already-set function keys FK31 to FK36 are also grouped and displayed at the rear end of icon display region RG2 in the order corresponding to grouped already-set function keys FK31 to FK36.

Function keys FK31 to FK36 are function keys of "color", "original setting", "color image quality adjustment", "binding margin", "date/time", and "frame erasing", respectively. Function key FK31 and icon IC31 are those to which function key FK1 and icon IC1 in FIG. 4 are moved, function key FK32 and icon IC32 are those to which function key FK8 and icon IC8 in FIG. 4 are moved.

Even if the user scrolls function key display region RG1 forward while the function keys and the icons are grouped and displayed, preferably image forming apparatus 1 continuously displays setting check key 14.

In the case that the press of setting check key 14 is received again while the setting check key 14 is grouped and displayed, image forming apparatus 1 may release the grouping of the already-set function keys and the icons to return already-set function keys FK31 to FK36 and icons IC31 to IC36 to the original positions.

Figure 9:
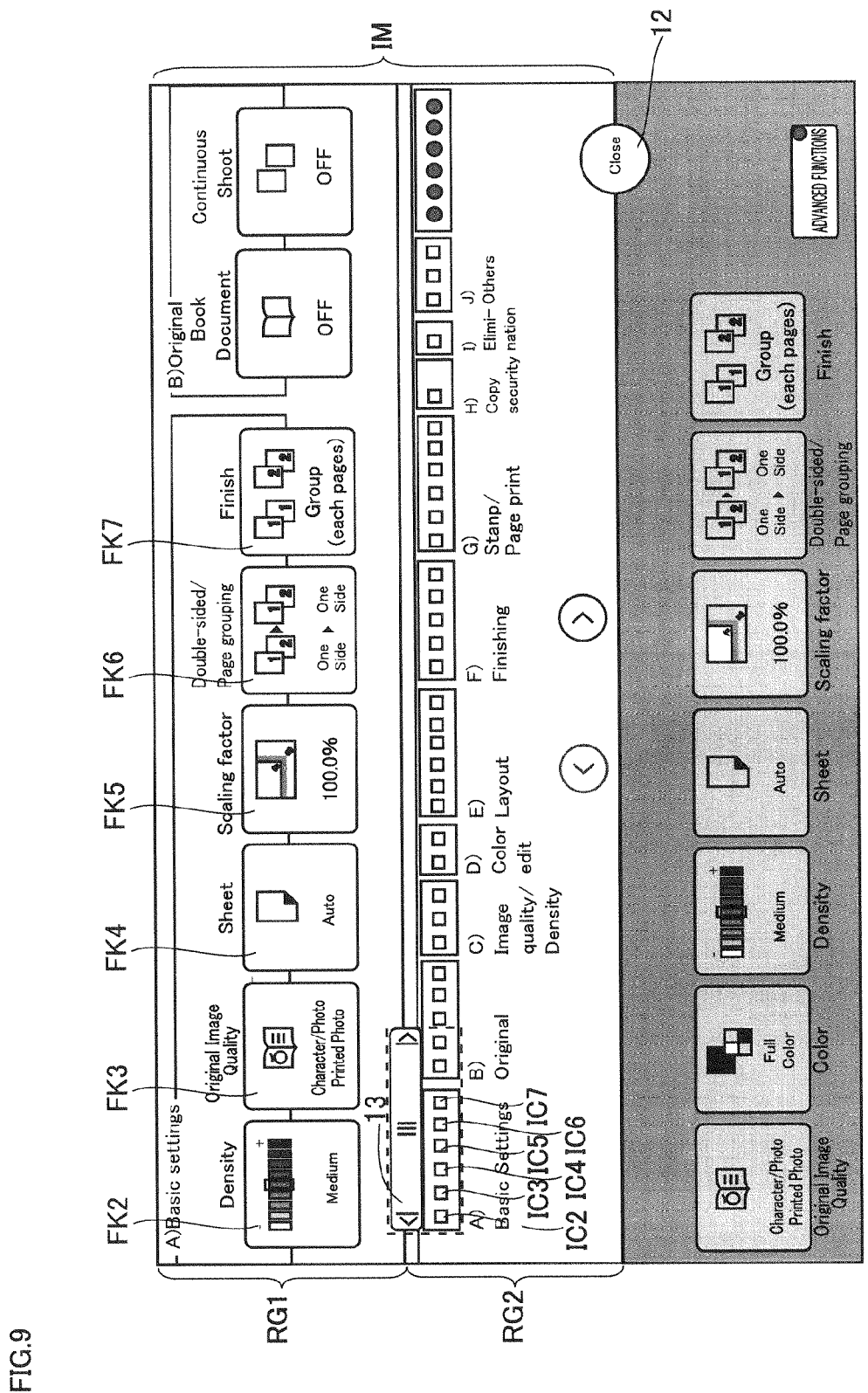
FIG. 9 is a view schematically illustrating the state in which the user scrolls a function key display region RG1 to a front end during function key grouping display in which the first function key grouping method is adopted.

FIG. 9 is a view schematically illustrating the state in which the user scrolls function key display region RG1 to the front end during the function key grouping display in which the first function key grouping method is adopted.

Referring to FIG. 9, during the function key grouping display, each of the grouped and displayed function keys and icons is deleted from the position (the original position) where each of the function keys and icons is displayed before the grouping display. Specifically, while function key FK1 (FIG. 4) of "color" that is of the already-set function key is displayed at the front end of function key display region RG1 before the function key grouping display, function key FK1 of "color" (FIG. 4) is deleted from the front end of function key display region RG1 during the function key grouping display. As a result, only six function keys FK2 to FK7 of "density", "original image quality", "sheet", "scaling factor", "double-sided/page grouping", and "finish" are displayed in the group of "A) basic settings" during the function key grouping display.

Figure 10:
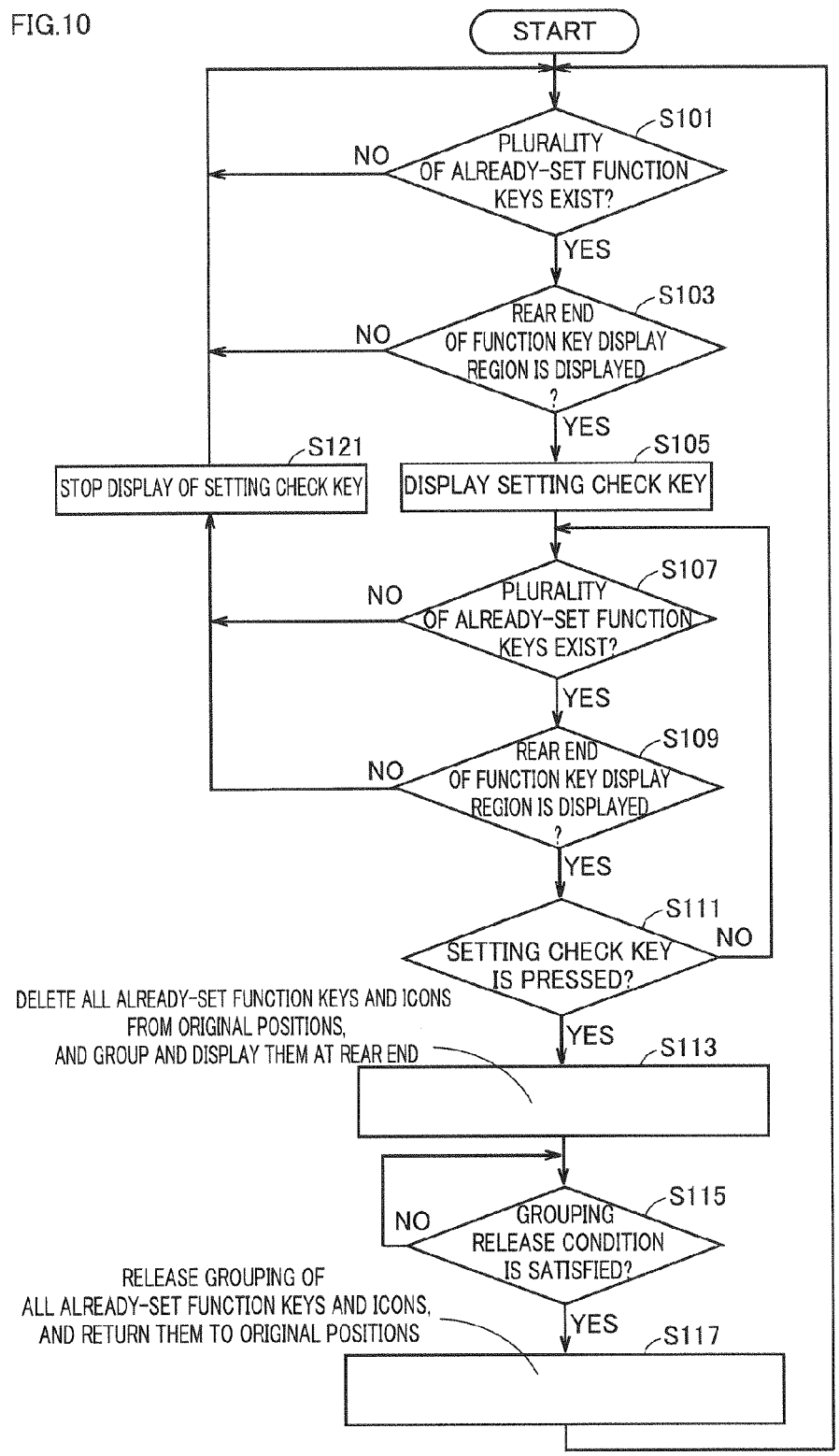
FIG. 10 is a flowchart illustrating display processing performed to the operation panel 130 by the image forming apparatus 1 in the case that the first function key grouping method is adopted.

FIG. 10 is a flowchart illustrating display processing performed to operation panel 130 by image forming apparatus 1 in the case that the first function key grouping method is adopted.

Referring to FIG. 10, in the case that mapscroller screen IM is displayed on display unit 134 of operation panel 130, CPU 101 of image forming apparatus 1 determines whether the plurality of already-set function keys exist (S101).

When it is determined that the plurality of already-set function keys exist in step S101 (YES in S101), CPU 101 determines whether the rear end of function key display region RG1 is currently displayed (S103).

When it is determined that the rear end of function key display region RG1 is currently displayed in step S103 (YES in S103), CPU 101 displays setting check key 14 on the mapscroller screen (S105). Then CPU 101 goes to the processing in step S107.

When it is determined that the plurality of already-set function keys do not exist in step S101 (NO in S101), or when it is determined that the rear end of function key display region RG1 is not currently displayed in step S103 (NO in S103), CPU 101 goes to the processing in step S101.

In step S107, CPU 101 determines whether the plurality of already-set function keys exist (S107).

When it is determined that the plurality of already-set function keys exist in step S107 (YES in S107), CPU 101 determines whether the rear end of function key display region RG1 is currently displayed (S109).

When it is determined that the rear end of function key display region RG1 is currently displayed in step S109 (YES in S109), CPU 101 goes to the processing in step S111.

When it is determined that the plurality of already-set function keys do not exist in step S107 (NO in S107), or when it is determined that the rear end of function key display region RG1 is not currently displayed in step S109 (NO in S109), CPU 101 stops the display of setting check key 14 (S121). Then CPU 101 goes to the processing in step S101.

In step S111, CPU 101 determines whether setting check key 14 is pressed (S111).

When it is determined that setting check key 14 is pressed in step S111 (YES in S111), CPU 101 deletes all the already-set function keys and the icons from the original positions, groups and displays the already-set function keys and the icons at the rear ends of function key display region RG1 and icon display region RG2 (S113). Then CPU 101 goes to the processing in step S115. On the other hand, when it is determined that setting check key 14 is pressed in step S111 (NO in S111), CPU 101 goes to the processing in step S107.

In step S115, CPU 101 determines whether a grouping release condition is satisfied (S115). CPU 101 repeats the processing in step S115 until the grouping release condition is satisfied.

The grouping release condition means one on which image forming apparatus 1 releases the grouping of the grouping target keys. In the first to sixth function key grouping methods, that image forming apparatus 1 receives the press of setting check key 14 again (only in the case of the first function key grouping method) during the grouping display of the grouping function keys, that image forming apparatus 1 receives the flick operation toward the direction in which function key display region RG1 is not scrolled while function key display region RG1 is scrolled to one of the end portions during the grouping display of the grouping function keys, or that image forming apparatus 1 receives the pinch-out operation in icon display region RG2 during the grouping display of the grouping function keys can be adopted as the grouping release condition in image forming apparatus 1.

When it is determined that the grouping release condition is satisfied in step S115 (YES in S115), CPU 101 releases the grouping of all the already-set function keys and the icons, and returns all the already-set function keys and the icons to the original positions (S117). Then CPU 101 goes to the processing in step S101.

[Second Function Key Grouping Method]

In the second function key grouping method, image forming apparatus 1 groups and displays all the already-set function keys and the icons, when image forming apparatus 1 receives the flick operation in the direction in which function key display region RG1 is not scrolled while function key display region RG1 is scrolled to the end portion (the front end or the rear end, the rear end in this case).

Figure 11:
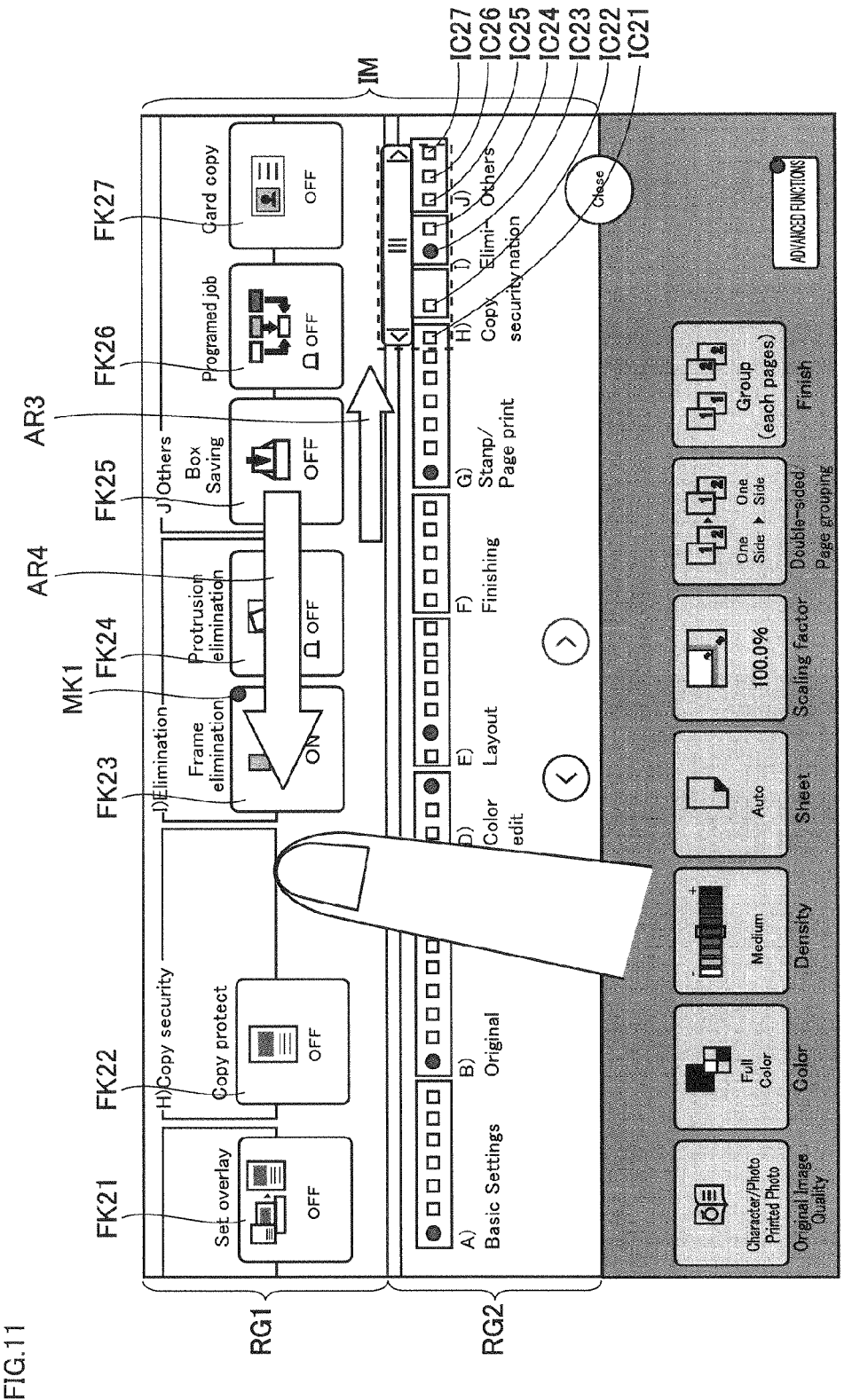
FIG. 11 is a view schematically illustrating the state in which the user performs a flick operation in order to perform the grouping display of grouping target keys in a second function key grouping method.
Figure 12:
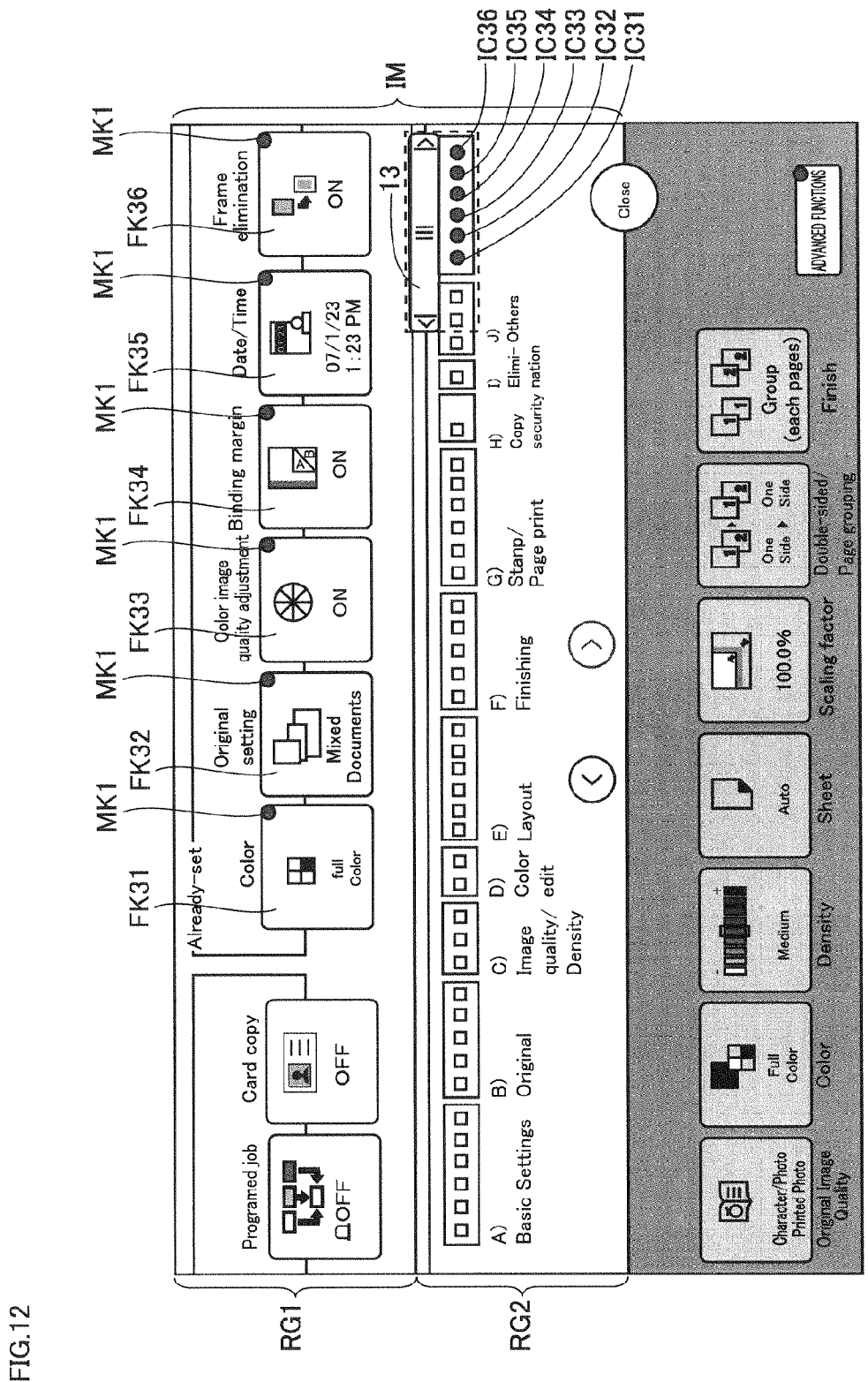
FIG. 12 is a view schematically illustrating the state in which the already-set function keys and the icons are grouped in the second function key grouping method.

FIG. 11 is a view schematically illustrating the state in which the user performs the flick operation in order to perform the grouping display of the grouping target keys in the second function key grouping method. FIG. 12 is a view schematically illustrating the state in which the already-set function keys and the icons are grouped in the second function key grouping method.

Referring to FIG. 11, image forming apparatus 1 receives the settings of the plurality of functions, and the plurality of already-set function keys (the function keys to which marks MK1 are added) exist. Cursor 13 is moved in the direction indicated by an arrow AR3, and located at the rear end of icon display region RG2. Function key display region RG1 is scrolled to the rear end, and function keys FK21 to FK27 corresponding to seven icons IC21 to IC27 overlapping cursor 13 are displayed in function key display region RG1. When receiving the flick operation (to scroll function key display region RG1 backward) in the direction indicated by an arrow AR4 in function key display region RG1, image forming apparatus 1 groups and displays all already-set function keys FK31 to FK36 and icons IC31 to IC36 at the rear ends of function key display region RG1 and icon display region RG2 as illustrated in FIG. 12.

Image forming apparatus 1 may group and display the grouping target keys when receiving the flick operation in the direction in which the scrolling is not performed in function key display region RG1. In the state in FIG. 11, function key display region RG1 is scrolled only in the case that the flick operation to scroll function key display region RG1 forward is received. Accordingly, image forming apparatus 1 may group and display the grouping target keys when receiving the flick operation to scroll function key display region RG1 in a vertical direction in addition to the flick operation to scroll function key display region RG1 backward.

Figure 13:
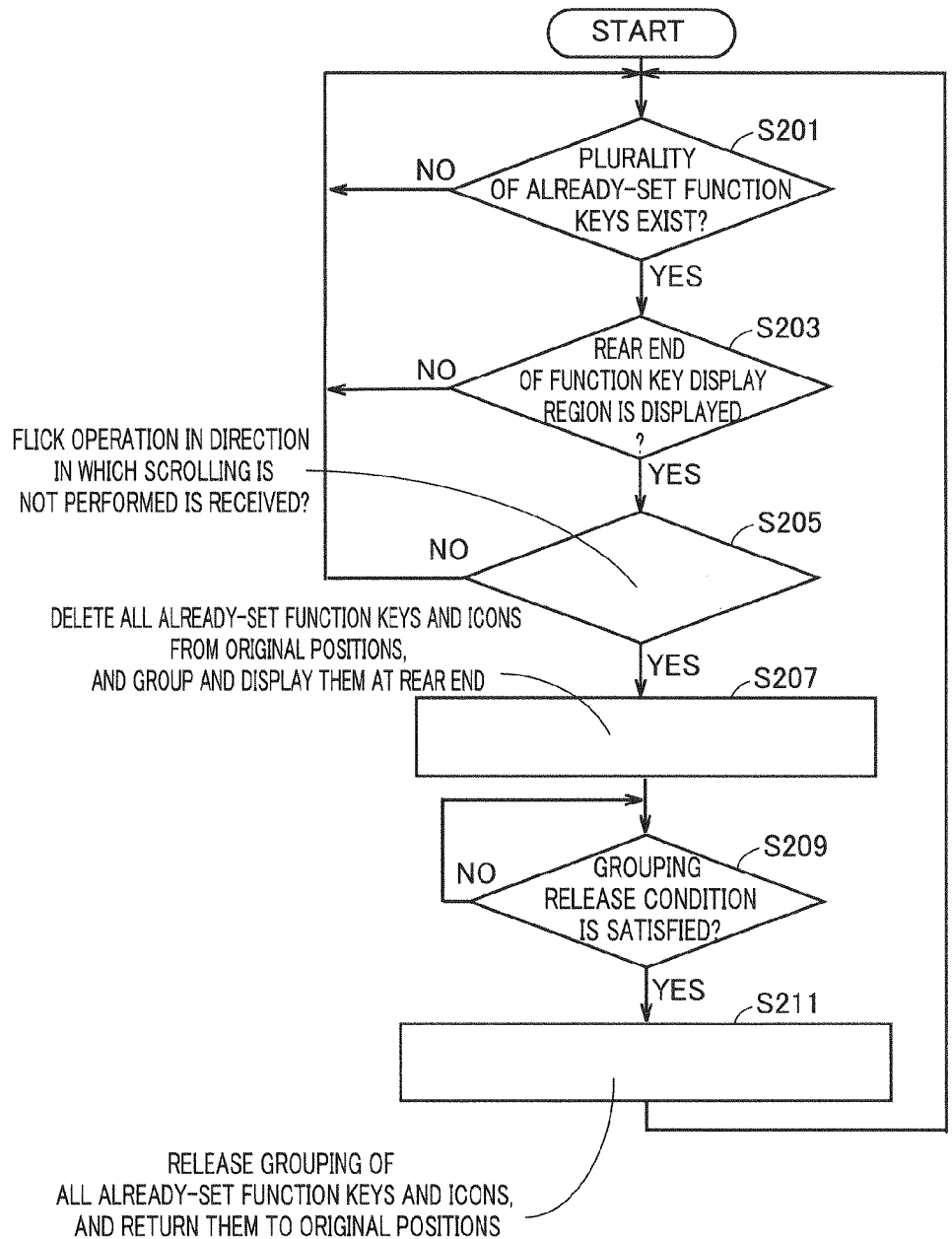
FIG. 13 is a flowchart illustrating the display processing performed to the operation panel 130 by the image forming apparatus 1 in the case that the second function key grouping method is adopted.

FIG. 13 is a flowchart illustrating the display processing performed to operation panel 130 by image forming apparatus 1 in the case that the second function key grouping method is adopted.

Referring to FIG. 13, in the case that mapscroller screen IM is displayed on display unit 134 of operation panel 130, CPU 101 of image forming apparatus 1 determines whether the plurality of already-set function keys exist (S201).

When it is determined that the plurality of already-set function keys exist in step S201 (YES in S201), CPU 101 determines whether the rear end of function key display region RG1 is currently displayed (S203).

When it is determined that the rear end of function key display region RG1 is currently displayed in step S203 (YES in S203), CPU 101 determines whether the flick operation in the direction in which the scrolling is not performed is received (S205).

When it is determined that the plurality of already-set function keys do not exist in step S201 (NO in S201), when it is determined that the rear end of function key display region RG1 is not currently displayed in step S203 (NO in S203), or when it is determined that the flick operation in the direction in which the scrolling is not performed is not received in step S205 (NO in S205), CPU 101 goes to the processing in step S201.

When it is determined that the flick operation in the direction in which the scrolling is not performed is received in step S205 (YES in S205), CPU 101 deletes the already-set function keys and the icons from the original positions, and groups and displays the already-set function keys and the icons at the rear ends of function key display region RG1 and icon display region RG2 (S207). Then CPU 101 goes to the processing in step S209.

In step S209, CPU 101 determines whether the grouping release condition is satisfied (S209). CPU 101 repeats the processing in step S209 until the grouping release condition is satisfied.

When it is determined that the grouping release condition is satisfied in step S209 (YES in S209), CPU 101 releases the grouping of all the already-set function keys and the icons, and returns all the already-set function keys and the icons to the original positions (S211). Then CPU 101 goes to the processing in step S201.

[Third Function Key Grouping Method]

In the third function key grouping method, image forming apparatus 1 groups and displays all the already-set function keys and the icons when receiving the pinch-in operation in icon display region RG2.

Figure 14:
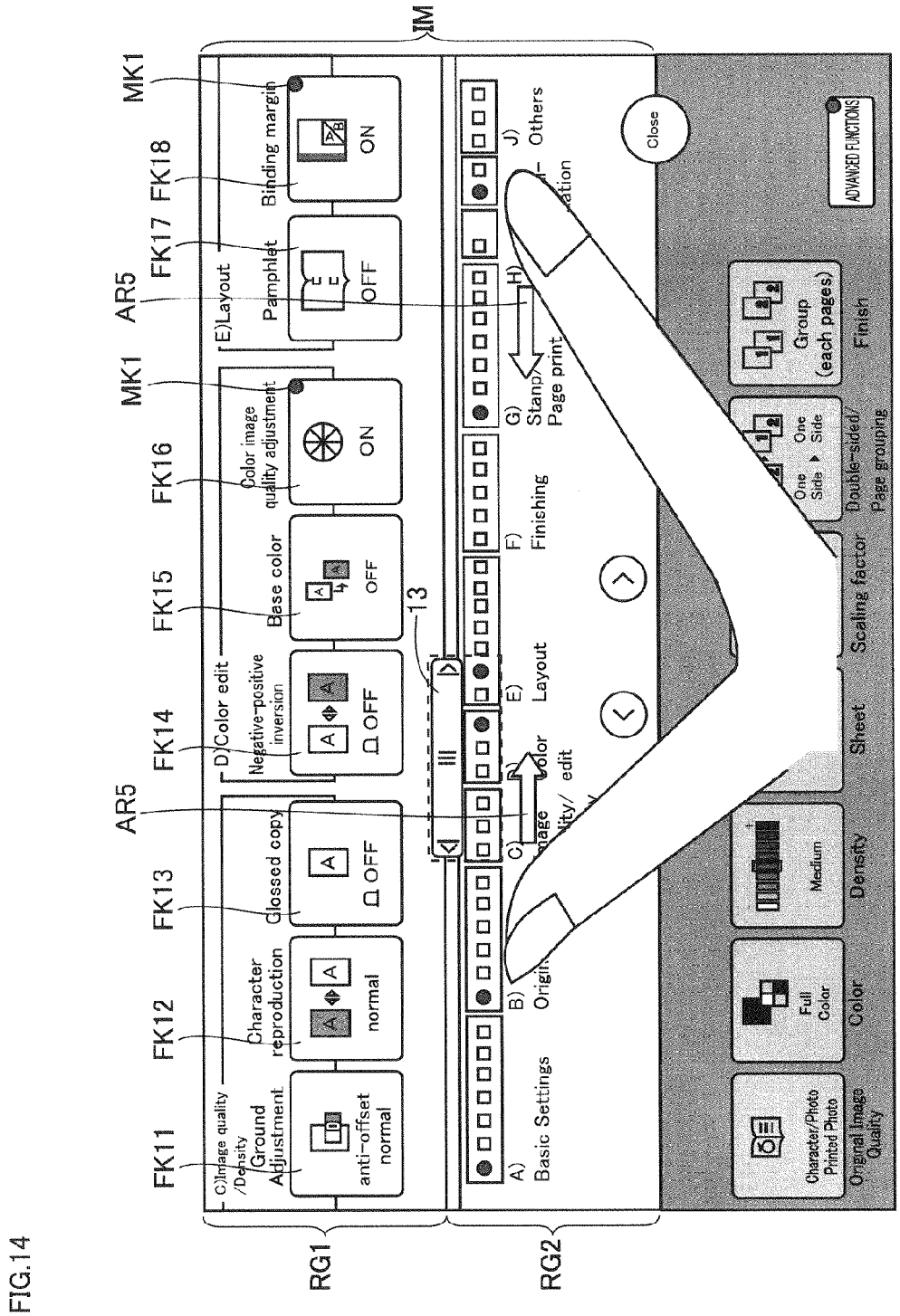
FIG. 14 is a view schematically illustrating the state in which the user performs a pinch-in operation in order to perform the grouping display of the grouping target keys in a third function key grouping method.

FIG. 14 is a view schematically illustrating the state in which the user performs the pinch-in operation in order to perform the grouping display of the grouping target keys in the third function key grouping method.

Referring to FIG. 14, image forming apparatus 1 receives the settings of the plurality of functions, and the plurality of already-set function keys (the function keys to which marks MK1 are added) exist. Cursor 13 exists in any position of icon display region RG2, and the function keys are arbitrarily displayed in function key display region RG1. Image forming apparatus 1 groups and displays all the already-set function keys and the icons when receiving the pinch-in operation as indicated by an arrow AR5 in icon display region RG2.

Figure 15:
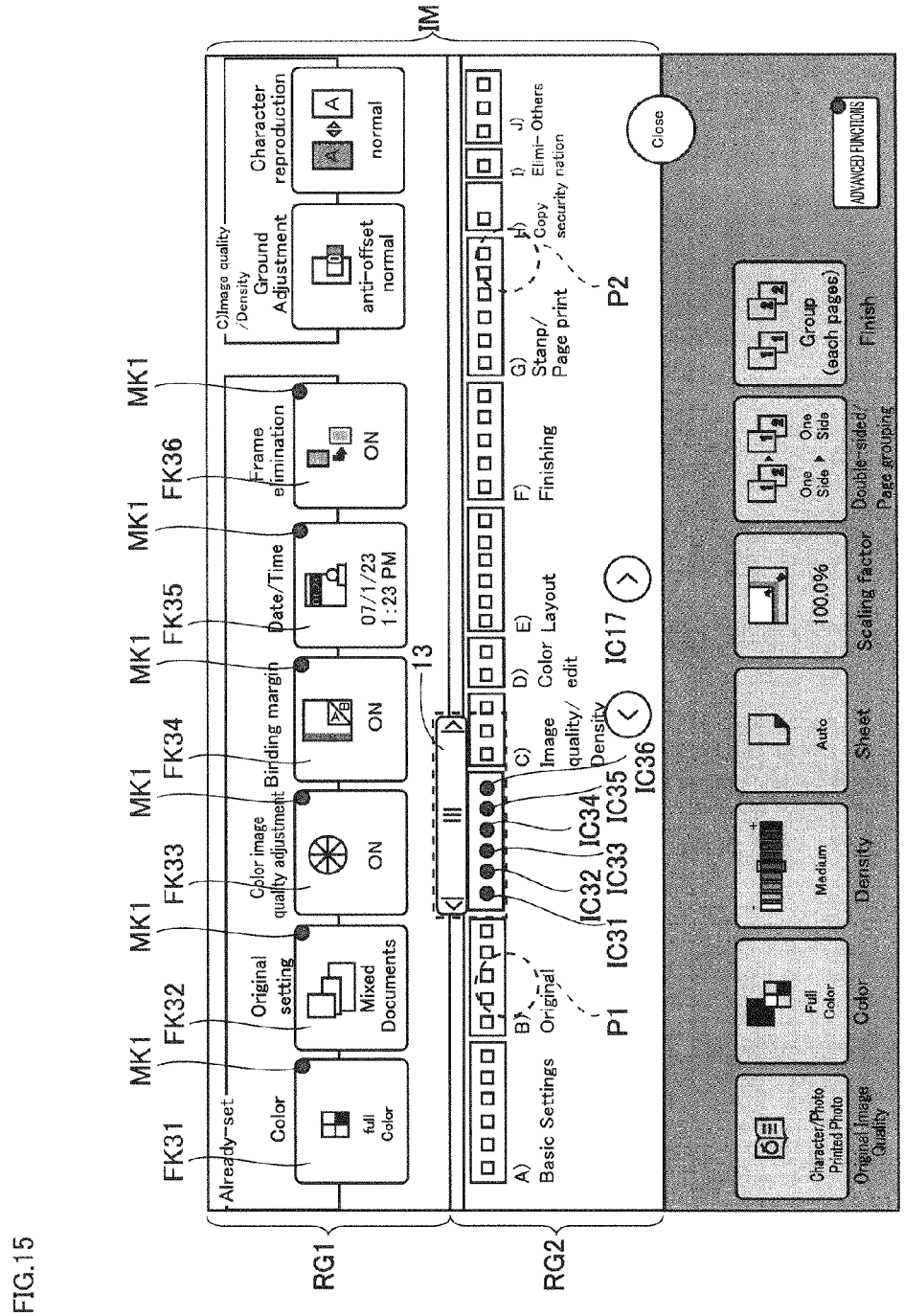
FIG. 15 is a view schematically illustrating the state in which the grouping target keys are grouped in the third function key grouping method.

FIG. 15 is a view schematically illustrating the state in which the grouping target keys are grouped in the third function key grouping method.

Referring to FIG. 15, for example, cursor 13 is moved between a point P1 and a point P2, which are of two starting points of the pinch-in operation. All already-set icons IC31 to IC36 are grouped and displayed in the position where already-set icons IC31 to IC36 overlap cursor 13. Already-set function keys FK31 to FK36 are grouped and displayed in the positions corresponding to icons IC31 to IC36 of function key display region RG1. The positions are a head portion (front end side portion) of the display position when the pinch-in operation is received. In FIG. 15, in each of function key display region RG1 and icon display region RG2, the group of "already-set" is produced between the group of "B) original" and the group of "C) image quality/density", and already-set function keys FK31 to FK36 are grouped in the group of "already-set".

The positions where the already-set function keys and the icons are grouped are arbitrary positions, and the already-set function keys and the icons may be grouped at the front ends or rear ends of function key display region RG1 and icon display region RG2 in addition to the head portion of the display position in receiving the pinch-in operation.

When receiving the pinch-in operation in which point P1 and point P2 are set to the starting points in icon display region RG2, image forming apparatus 1 may set only the already-set function key and the icon, which exist between point P1 and point P2, to the grouping target keys, but not set other already-set function keys and icons to the grouping target keys.

Figure 16:
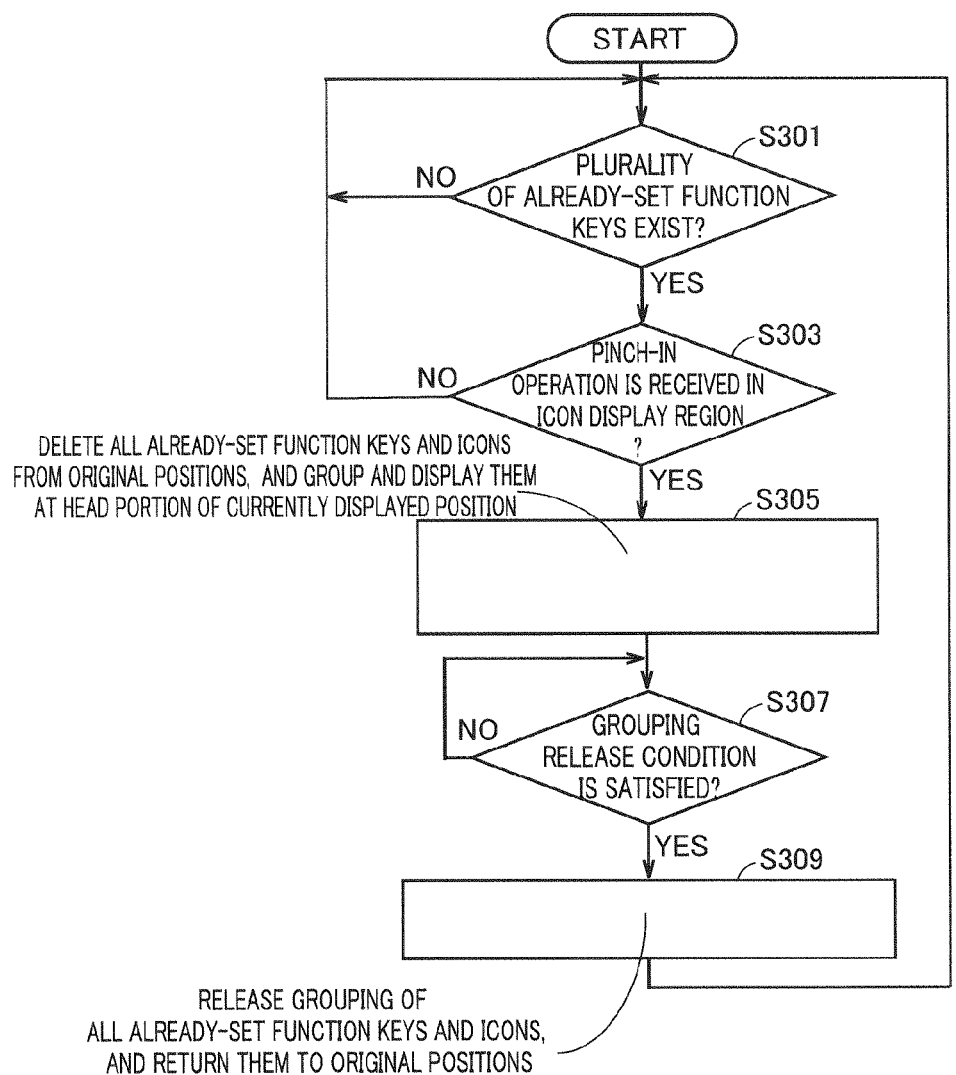
FIG. 16 is a flowchart illustrating the display processing performed to the operation panel 130 by the image forming apparatus 1 in the case that the third function key grouping method is adopted.

FIG. 16 is a flowchart illustrating the display processing performed to operation panel 130 by image forming apparatus 1 in the case that the third function key grouping method is adopted.

Referring to FIG. 16, in the case that mapscroller screen IM is displayed on display unit 134 of operation panel 130, CPU 101 of image forming apparatus 1 determines whether the plurality of already-set function keys exist (S301).

When it is determined that the plurality of already-set function keys exist in step S301 (YES in S301), CPU 101 determines whether the pinch-in operation is received in icon display region RG2 (S303).

When it is determined that the pinch-in operation is received in icon display region RG2 in step S303 (YES in S303), CPU 101 deletes all the already-set function keys and icons from the original positions, and groups and displays all the already-set function keys and icons between point P1 and point P2, which are of the two starting points of the pinch-in operation (S305). Then CPU 101 goes to the processing in step S307.

When it is determined that the plurality of already-set function keys do not exist in step S301 (NO in S301), or when it is determined that the pinch-in operation is not received in icon display region RG2 in step S303 (NO in S303), CPU 101 goes to the processing in step S301.

In step S307, CPU 101 determines whether the grouping release condition is satisfied (S307). CPU 101 repeats the processing in step S307 until the grouping release condition is satisfied.

When it is determined that the grouping release condition is satisfied in step S307 (YES in S307), CPU 101 releases the grouping of all the already-set function keys and the icons, and returns all the already-set function keys and the icons to the original positions (S309). Then CPU 101 goes to the processing in step S301.

[Fourth Function Key Grouping Method]

In the fourth function key grouping method, image forming apparatus 1 partially groups and displays the already-set function keys and the icons, when image forming apparatus 1 receives the flick operation to move one of fingers toward the other finger while the user touches two arbitrary points with the fingers in icon display region RG2.

Figure 17:
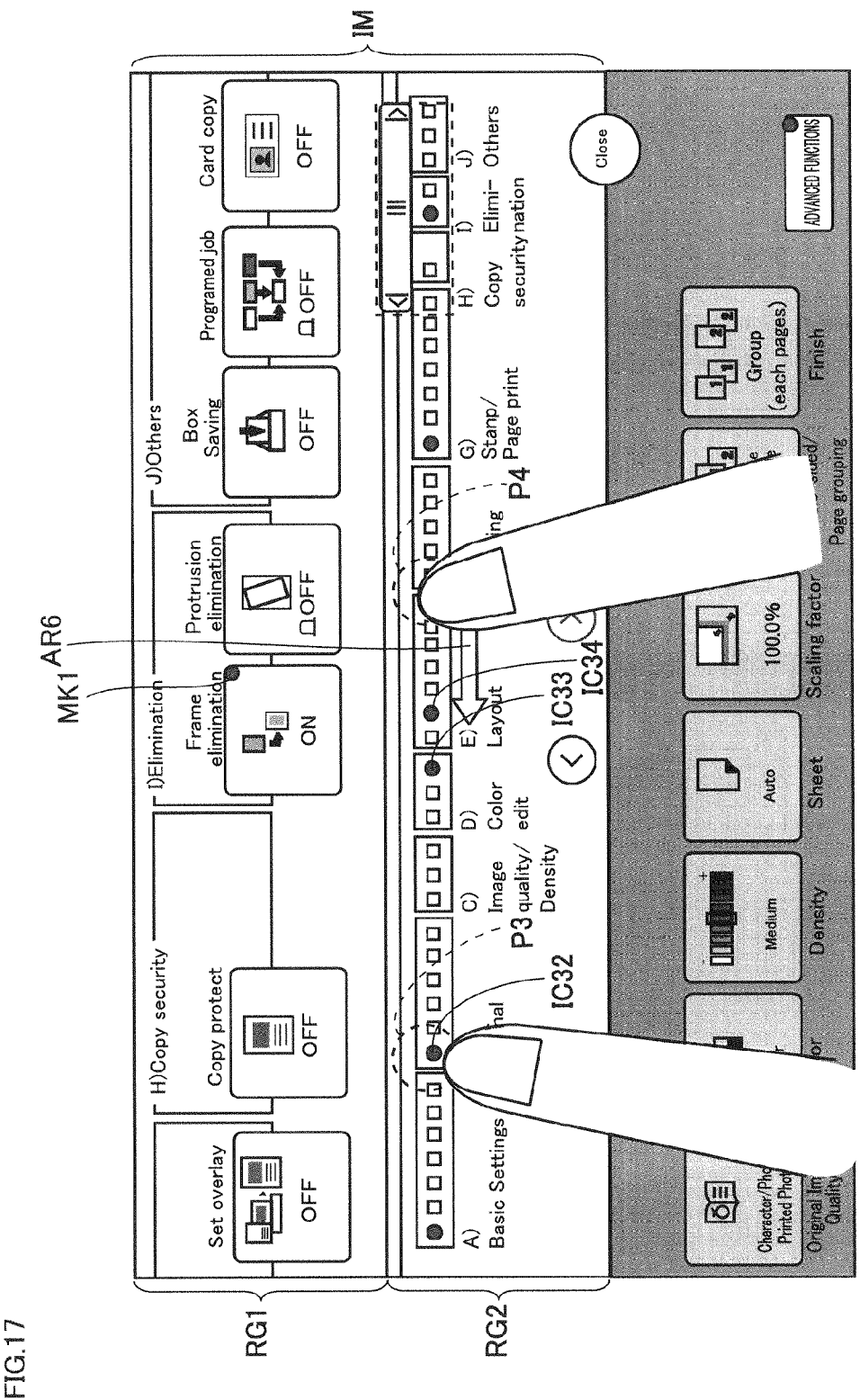
FIG. 17 is a view schematically illustrating the state in which the user performs the flick operation in order to perform the grouping display of the grouping target keys in a fourth function key grouping method.

FIG. 17 is a view schematically illustrating the state in which the user performs the flick operation in order to perform the grouping display of the grouping target keys in the fourth function key grouping method.

Referring to FIG. 17, image forming apparatus 1 receives the settings of the plurality of functions, and the plurality of already-set function keys (the function keys to which marks MK1 are added) exist. Cursor 13 exists in any position of icon display region RG2, and the function keys are arbitrarily displayed in function key display region RG1. At this point, the user touches a point P3 with one of the fingers in icon display region RG2, and performs the flick operation to move the other finger from a point P4 to point P3 as indicated by an arrow AR6. When receiving the flick operation, image forming apparatus 1 groups and displays the grouping target keys.

At this point, the grouping target keys are the already-set icon existing between point P3 and point P4 and the corresponding function key in the already-set function keys and the icons. The function key and the icon, which do not exist between point P3 and point P4, do not become the grouping target keys. All the already-set function keys and the icons may be the grouping target keys irrespective of the positions of point P3 and point P4.

Figure 18:
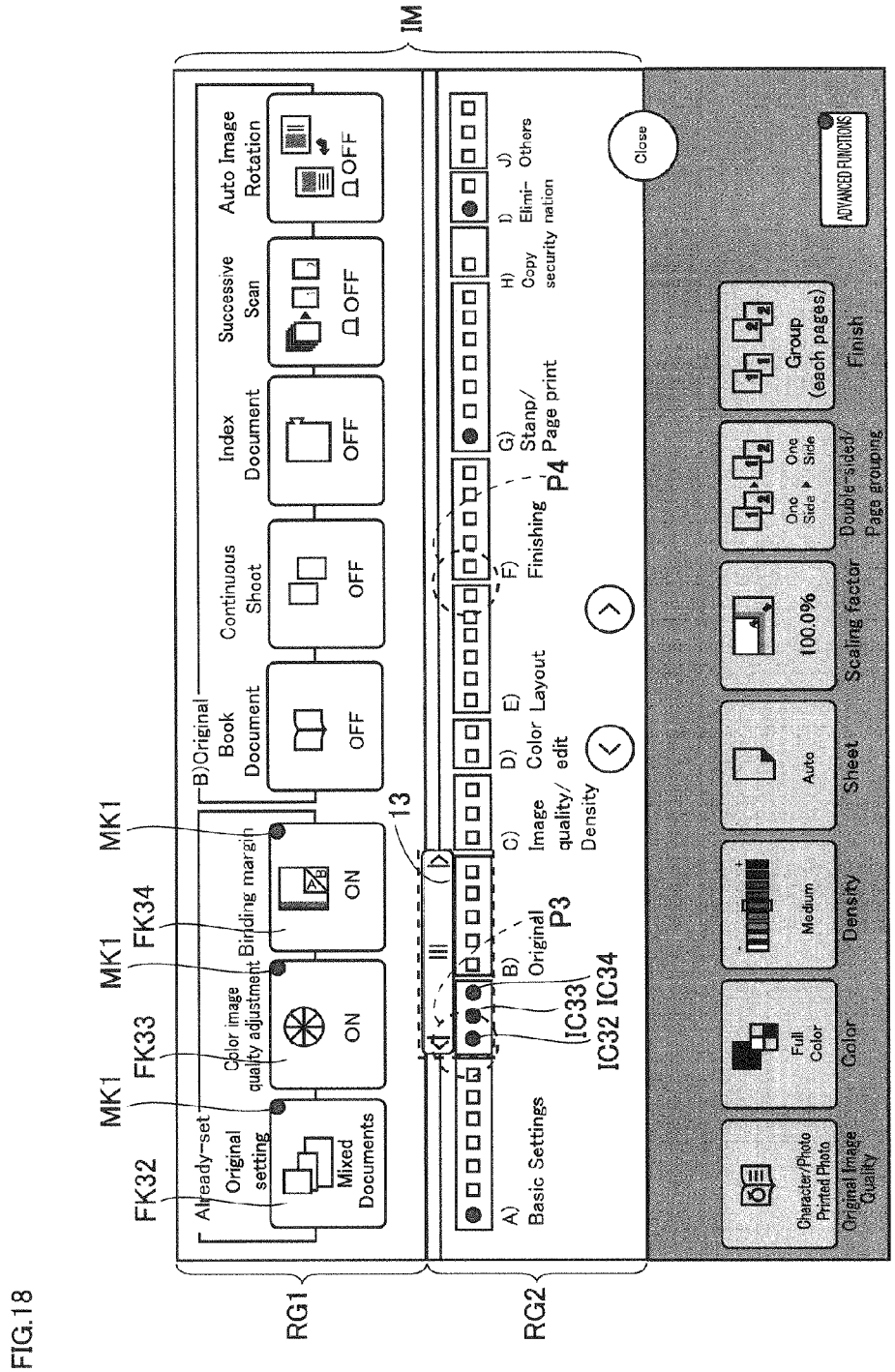
FIG. 18 is a view schematically illustrating the state in which the grouping target keys are grouped in the fourth function key grouping method.

FIG. 18 is a view schematically illustrating the state in which the grouping target keys are grouped in the fourth function key grouping method.

Referring to FIG. 18, in the already-set icons, icons IC32 to IC34 existing between point P3 and point P4 are grouped and displayed in the position of point P3. Cursor 13 is moved to the position of point P3, and overlaps icons IC32 to IC34. Therefore, function keys FK32 to FK34 corresponding to icons IC32 to IC34 are grouped and displayed at the head (the left side) of the current display position of function key display region RG1, and the head of the current display position of function key display region RG1 is the position corresponding to the icons existing at point P3. In FIG. 18, in each of function key display region RG1 and icon display region RG2, the group of "already-set" is produced between the group of "A) basic settings" and the group of "B) original", and the grouped function keys or icons are grouped in the group of "already-set".

The already-set function keys are grouped in any position, and the already-set function keys may be grouped at the front end or the rear end of function key display region RG1.

Figure 19:
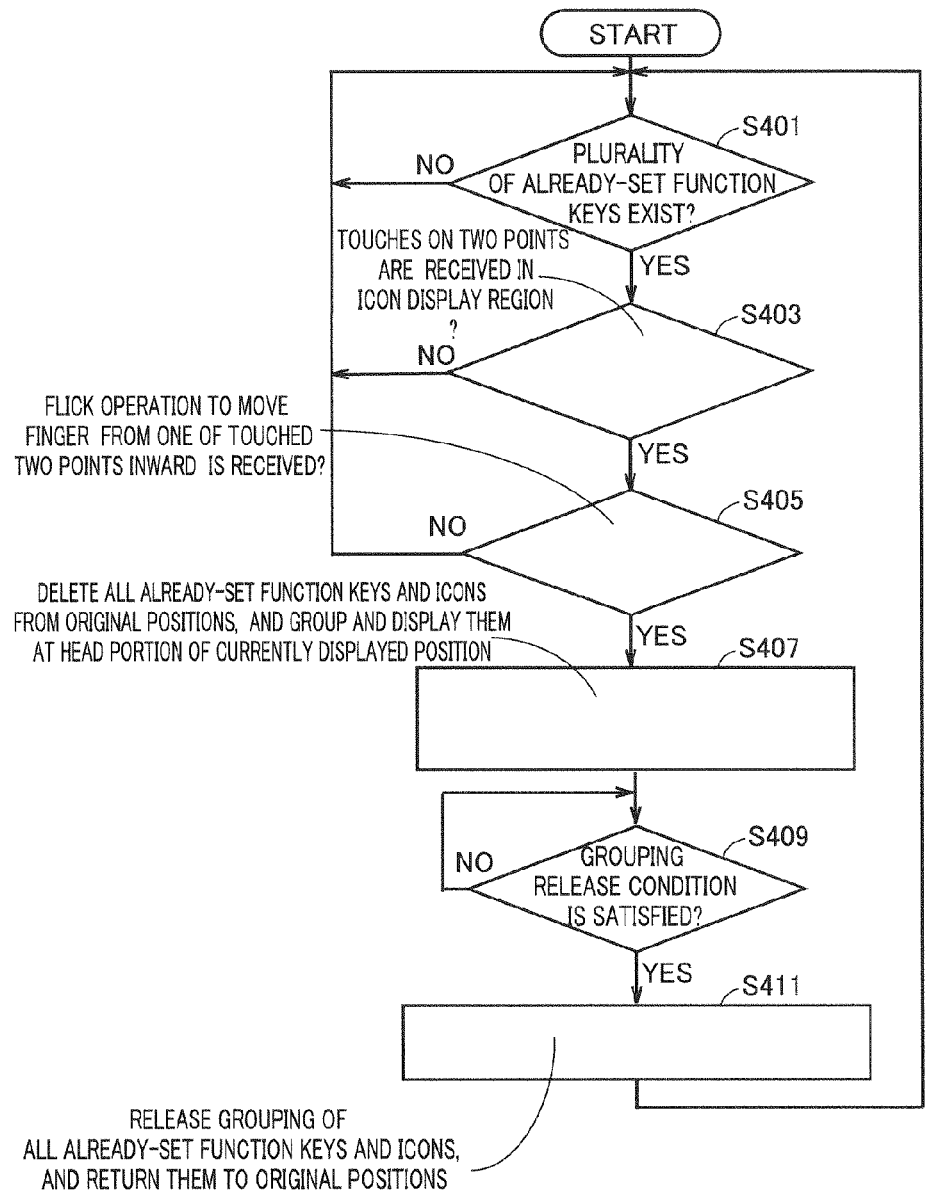
FIG. 19 is a flowchart illustrating the display processing performed to the operation panel 130 by the image forming apparatus 1 in the case that the fourth function key grouping method is adopted.

FIG. 19 is a flowchart illustrating the display processing performed to operation panel 130 by image forming apparatus 1 in the case that the fourth function key grouping method is adopted.

Referring to FIG. 19, in the case that mapscroller screen IM is displayed on display unit 134 of operation panel 130, CPU 101 of image forming apparatus 1 determines whether the plurality of already-set function keys exist (S401).

When it is determined that the plurality of already-set function keys exist in step S401 (YES in S401), CPU 101 determines whether the touches on the two points are received in icon display region RG2 (S403).

When it is determined that the touches on the two points are received in icon display region RG2 in step S403 (YES in S403), CPU 101 determines whether the flick operation to move the finger from one of the touched two points toward the other point (inward) is received (S405).

When it is determined that the plurality of already-set function keys do not exist in step S401 (NO in S401), when it is determined that the touches on the two points are not received in icon display region RG2 in step S403 (NO in S403), or when it is determined that the flick operation is not received in step S405 (No in S405), CPU 101 goes to the processing in step S401.

When it is determined that the flick operation is received in step S405 (YES in S405), CPU 101 deletes the already-set function keys and the icons, which exist between the two points, from the original positions, and groups and displays the already-set function keys and the icons at the head (the left side) of the current display positions (S407). Then CPU 101 goes to the processing in step S409.

In step S409, CPU 101 determines whether the grouping release condition is satisfied (S409). CPU 101 repeats the processing in step S409 until the grouping release condition is satisfied.

When it is determined that the grouping release condition is satisfied in step S409 (YES in S409), CPU 101 releases the grouping of all the already-set function keys and the icons, and returns all the already-set function keys and the icons to the original positions (S411). Then CPU 101 goes to the processing in step S401.

[Fifth Function Key Grouping Method]

In the fifth function key grouping method, image forming apparatus 1 groups and displays all the already-set function keys and the icons when receiving the touches to the plurality of (in this case, two) already-set icons.

Figure 20:
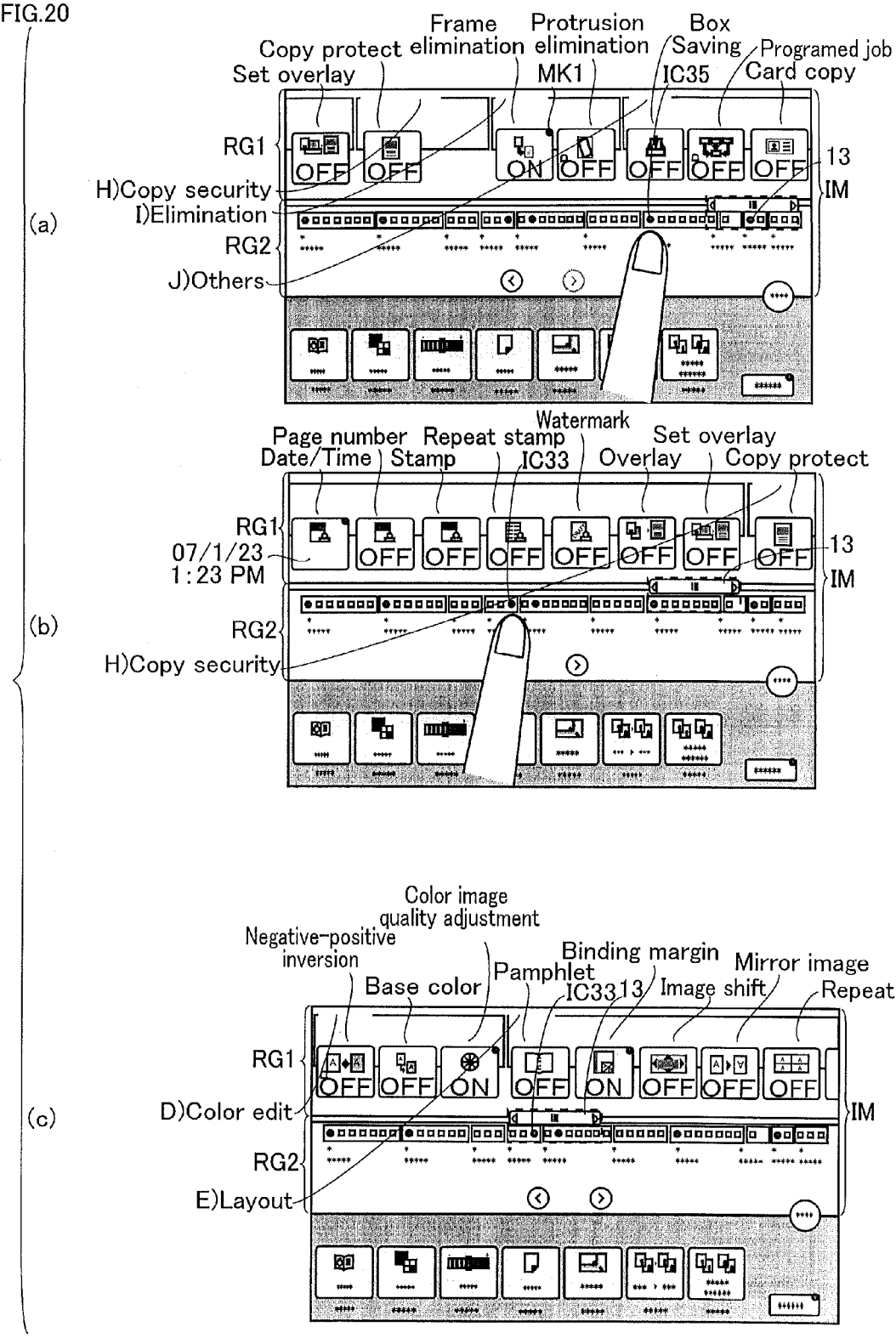
FIG. 20 is a view schematically illustrating the state in which the user performs a touch in order to perform the grouping display of the grouping target keys in a fifth function key grouping method.
Figure 21:
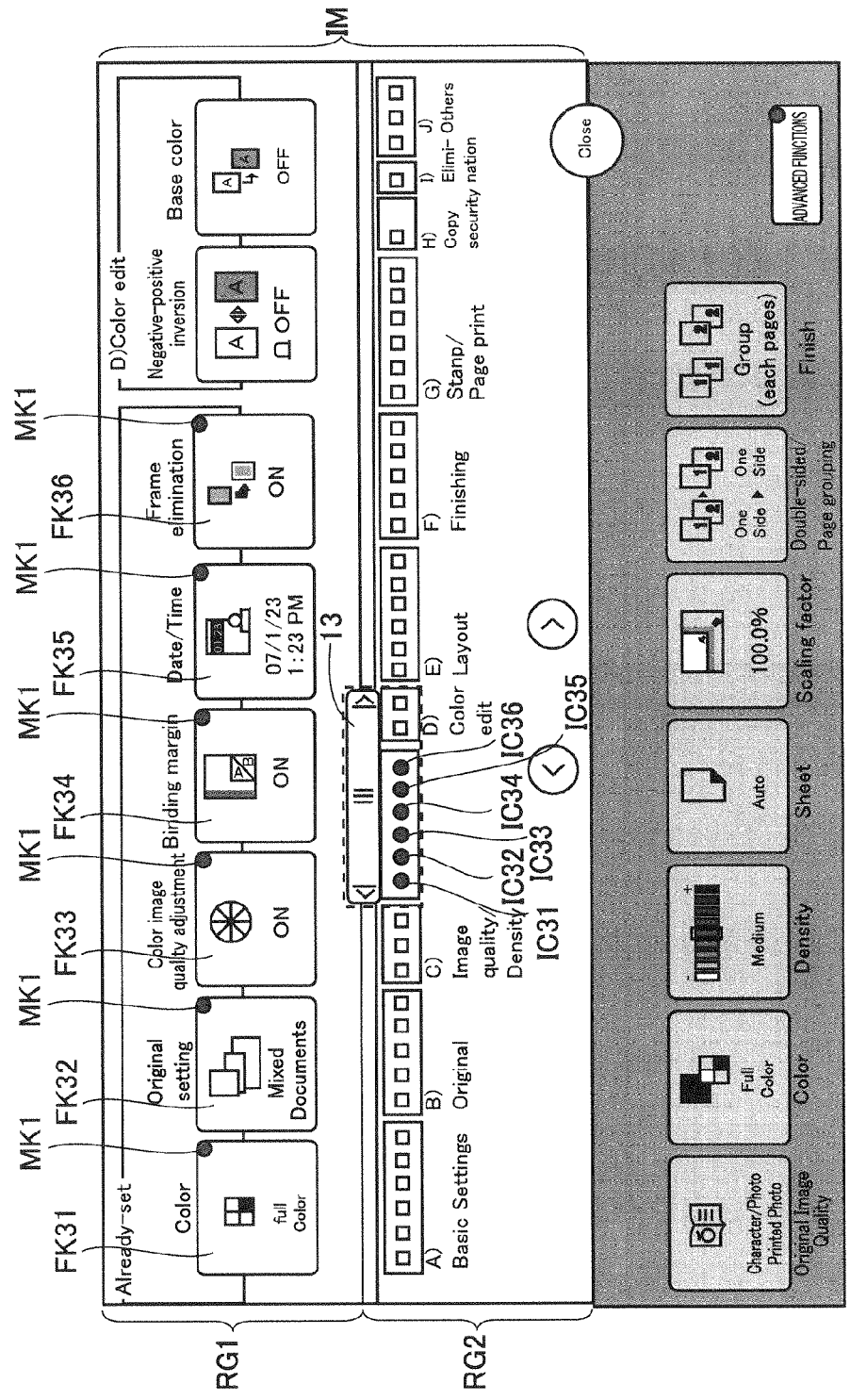
FIG. 21 is a view schematically illustrating the state in which the grouping target keys are grouped in the fifth function key grouping method.

FIG. 20 is a view schematically illustrating the state in which the user performs the touch in order to perform the grouping display of the grouping target keys in the fifth function key grouping method. FIG. 21 is a view schematically illustrating the state in which the grouping target keys are grouped in the fifth function key grouping method.

Referring to FIG. 20, image forming apparatus 1 receives the settings of the plurality of functions, and the plurality of already-set function keys (the function keys to which marks MK1 are added) exist. Cursor 13 exists in any position of icon display region RG2, and the function keys are arbitrarily displayed in function key display region RG1. At this point, as illustrated in FIG. 20(*a*), the user touches (selects) any already-set icon in icon display region RG2 (in this case, an icon IC35 belonging to the group of "G) stamp/page print"). Then, as illustrated in FIG. 20(*b*), the user touches an icon (in this case, an icon IC33 belonging to the group of "D) color edit"), which is of any already-set icon in icon display region RG2 but not touched yet. When the touch to icon IC33 is received, as illustrated in FIG. 20(*c*), cursor 13 moves to the position of icon IC33.

When receiving the touches on the two already-set icons, image forming apparatus 1 groups and displays all the already-set function keys and the icons as illustrated in FIG. 21.

Referring to FIG. 21, all already-set function keys FK31 to FK36 and icons IC31 to IC36 are grouped and displayed at the positions corresponding to finally-touched icon IC33. Cursor 13 is moved to the position of icon IC33, and overlaps icons IC31 to IC36. Already-set function keys FK31 to FK36 are grouped and displayed in the positions corresponding to icons IC31 to IC36 of function key display region RG1. The positions are the head portion (the front end side portion) of the display position when the touch is finally received. In FIG. 21, in each of function key display region RG1 and icon display region RG2, the group of "already-set" is produced between the group of "C) image quality/density" and the group of "D) color edit", and already-set function keys FK31 to FK36 are grouped in the group of "already-set".

The positions where the already-set function keys and the icons are grouped are arbitrary positions, and the already-set function keys and the icons may be grouped at the front ends or rear ends of function key display region RG1 and icon display region RG2 in addition to the head portion of the display position in finally receiving the touch. Image forming apparatus 1 may group and display the grouping target keys in the case that the touches to more than the given number of already-set icons are received.

Figure 22:
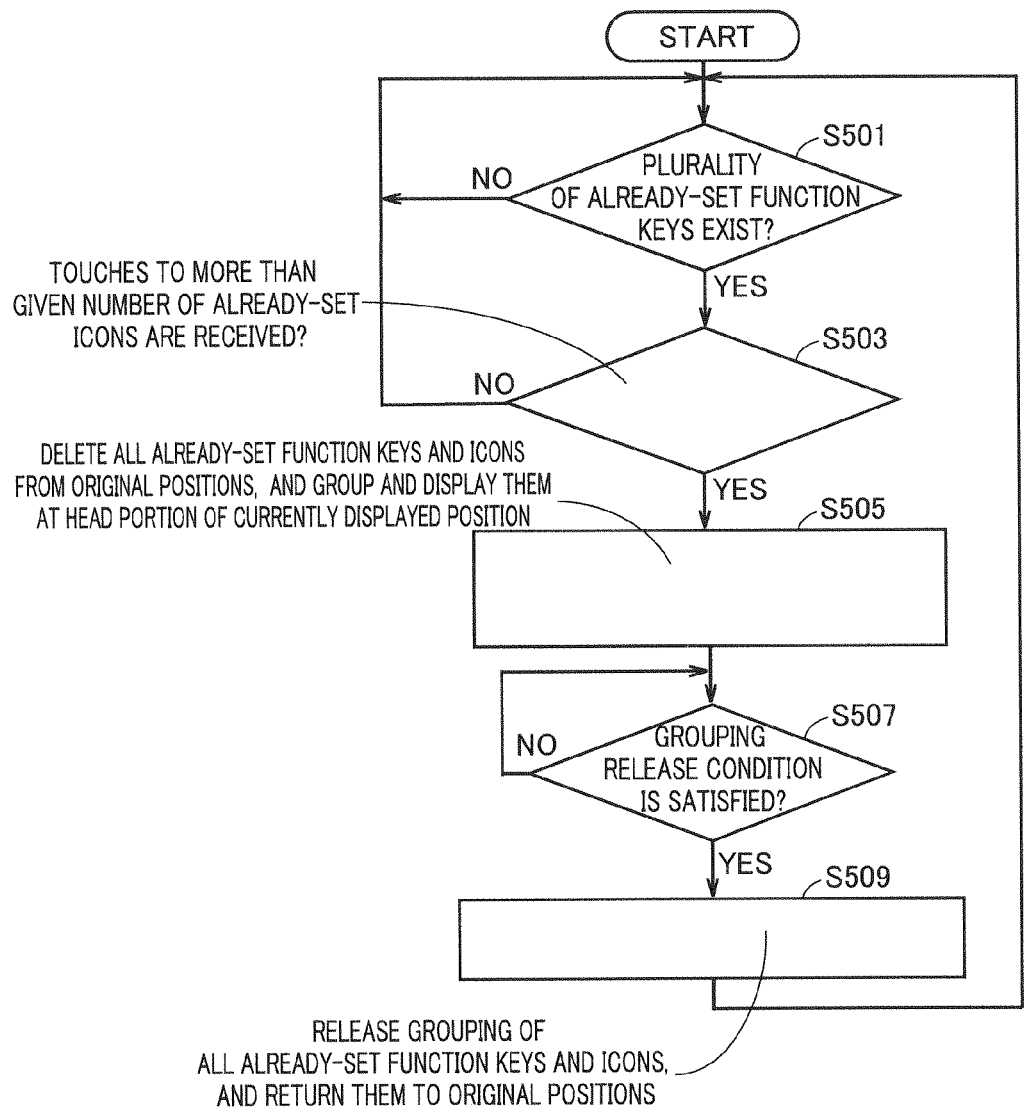
FIG. 22 is a flowchart illustrating the display processing performed to the operation panel 130 by the image forming apparatus 1 in the case that the fifth function key grouping method is adopted.

FIG. 22 is a flowchart illustrating the display processing performed to operation panel 130 by image forming apparatus 1 in the case that the fifth function key grouping method is adopted.

Referring to FIG. 22, in the case that mapscroller screen IM is displayed on display unit 134 of operation panel 130, CPU 101 of image forming apparatus 1 determines whether the plurality of already-set function keys exist (S501).

When it is determined that the plurality of already-set function keys exist in step S501 (YES in S501), CPU 101 determines whether the touches to more than the given number of already-set icons are received (whether more than the number of icons corresponding to the already-set function key is assigned) (S503).

When it is determined that the plurality of already-set function keys do not exist in step S501 (NO in S501), or when it is determined that touch is not received in step S503 (NO in S503), CPU 101 goes to the processing in step S501.

When it is determined that the touch is received in step S503 (YES in S503), CPU 101 deletes the already-set function keys and the icons from the original position, and groups and displays the already-set function keys and the icons at the head (the left side) of the current display positions (S505). Then CPU 101 goes to the processing in step S507.

In step S507, CPU 101 determines whether the grouping release condition is satisfied (S507). CPU 101 repeats the processing in step S507 until the grouping release condition is satisfied.

When it is determined that the grouping release condition is satisfied in step S507 (YES in S507), CPU 101 releases the grouping of all the already-set function keys and the icons, and returns all the already-set function keys and the icons to the original positions (S509). Then CPU 101 goes to the processing in step S501.

[Sixth Function Key Grouping Method]

In the sixth function key grouping method, image forming apparatus 1 groups and displays all the already-set function keys and the icons when receiving the scroll operation at a speed that is faster than a speed of the scroll operation necessary to scroll function key display region RG1 to the end portion.

Figure 23:
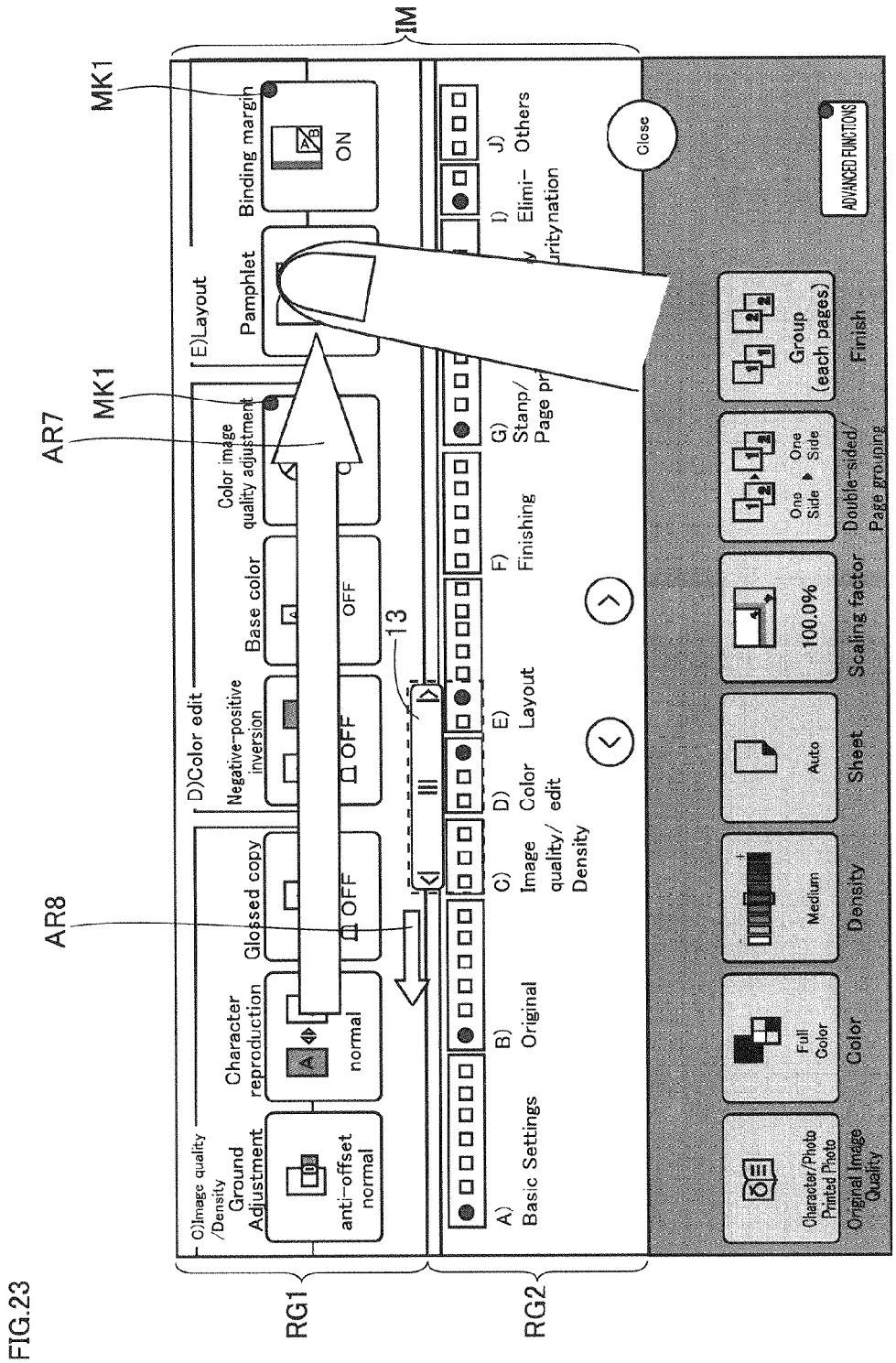
FIG. 23 is a view schematically illustrating the state in which the user performs a scroll operation in order to perform the grouping display of the grouping target keys in a sixth function key grouping method.

FIG. 23 is a view schematically illustrating the state in which the user performs the scroll operation in order to perform the grouping display of the grouping target keys in the sixth function key grouping method.

Referring to FIG. 23, image forming apparatus 1 receives the settings of the plurality of functions, and the plurality of already-set function keys (the function keys to which marks MK1 are added) exist. Cursor 13 exists in any position of icon display region RG2, and the function keys are arbitrarily displayed in function key display region RG1. At this point, image forming apparatus 1 groups and displays all the already-set function keys and the icons when receiving the scroll operation (the scroll operation having momentum of the scroll up to the end portion of function key display region RG1) at the speed V that is faster than the speed of the scroll operation necessary to scroll function key display region RG1 to the end portion.

As used herein, the scroll operation means the flick operation or the operation to move cursor 13. In FIG. 23, it is assumed that the flick operation toward the direction indicated by an arrow AR7 is received to scroll function key display region RG1 forward (toward the direction indicated by an arrow AR8).

Figure 24:
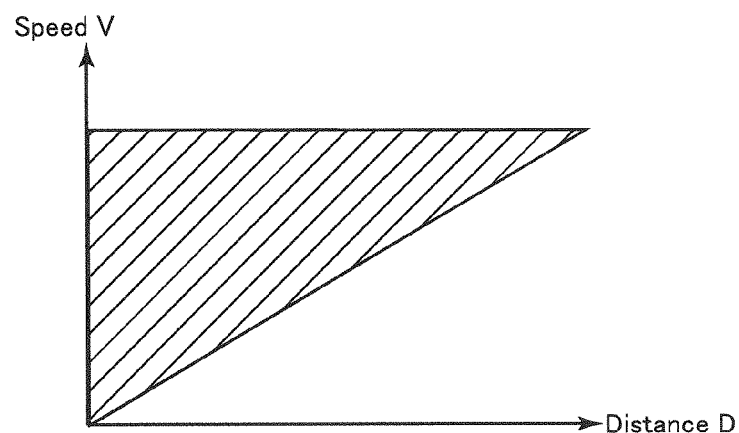
FIG. 24 is a view schematically illustrating a relationship between a distance D from an end portion of the function key display region RG1 to a currently-displayed position in the function key display region RG1 and a speed V of the scroll operation necessary to scroll the function key display region RG1 to the end portion of the function key display region RG1.

FIG. 24 is a view schematically illustrating a relationship between a distance D from the end portion (the end portion closer to the currently-displayed position) of function key display region RG1 to the currently-displayed position in function key display region RG1 and a speed V of the scroll operation necessary to scroll function key display region RG1 to the end portion of function key display region RG1.

Referring to FIG. 24, speed V increases with increasing distance D. Accordingly, the speed of the scroll operation necessary for the grouping display increases as the position of currently-displayed function key display region RG1 is close to the central portion, and the speed of the scroll operation necessary for the grouping display decreases as the position of currently-displayed function key display region RG1 is close to the end portion. A diagonal-line portion is a region satisfying the condition that performs the grouping display.

Figure 25:
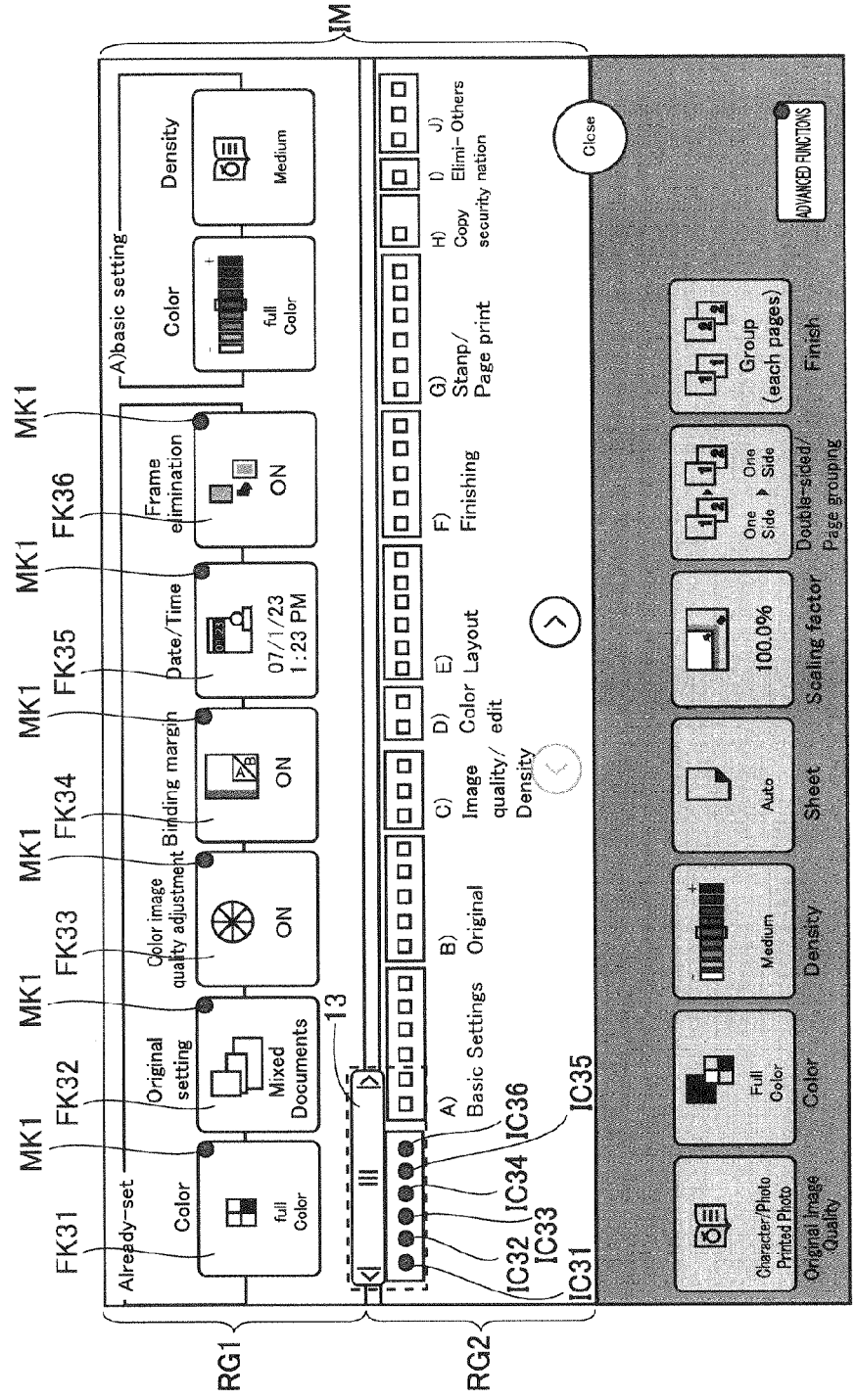
FIG. 25 is a view schematically illustrating the state in which the grouping target keys are grouped in the sixth function key grouping method.

FIG. 25 is a view schematically illustrating the state in which the grouping target keys are grouped in the sixth function key grouping method.

Referring to FIG. 25, cursor 13 is moved to the front end of function key display region RG1 by the scroll operation. All already-set icons IC31 to IC36 are grouped and displayed in the position where already-set icons IC31 to IC36 overlap cursor 13. Already-set function keys FK31 to FK36 are grouped and displayed at the front end of function key display region RG1. Already-set function keys FK31 to FK36 belong to a newly-produced group of "already-set".

The positions where the already-set function keys and the icons are grouped are arbitrary positions, and the already-set function keys and the icons may be grouped at the rear ends of function key display region RG1 and icon display region RG2.

Figure 26:
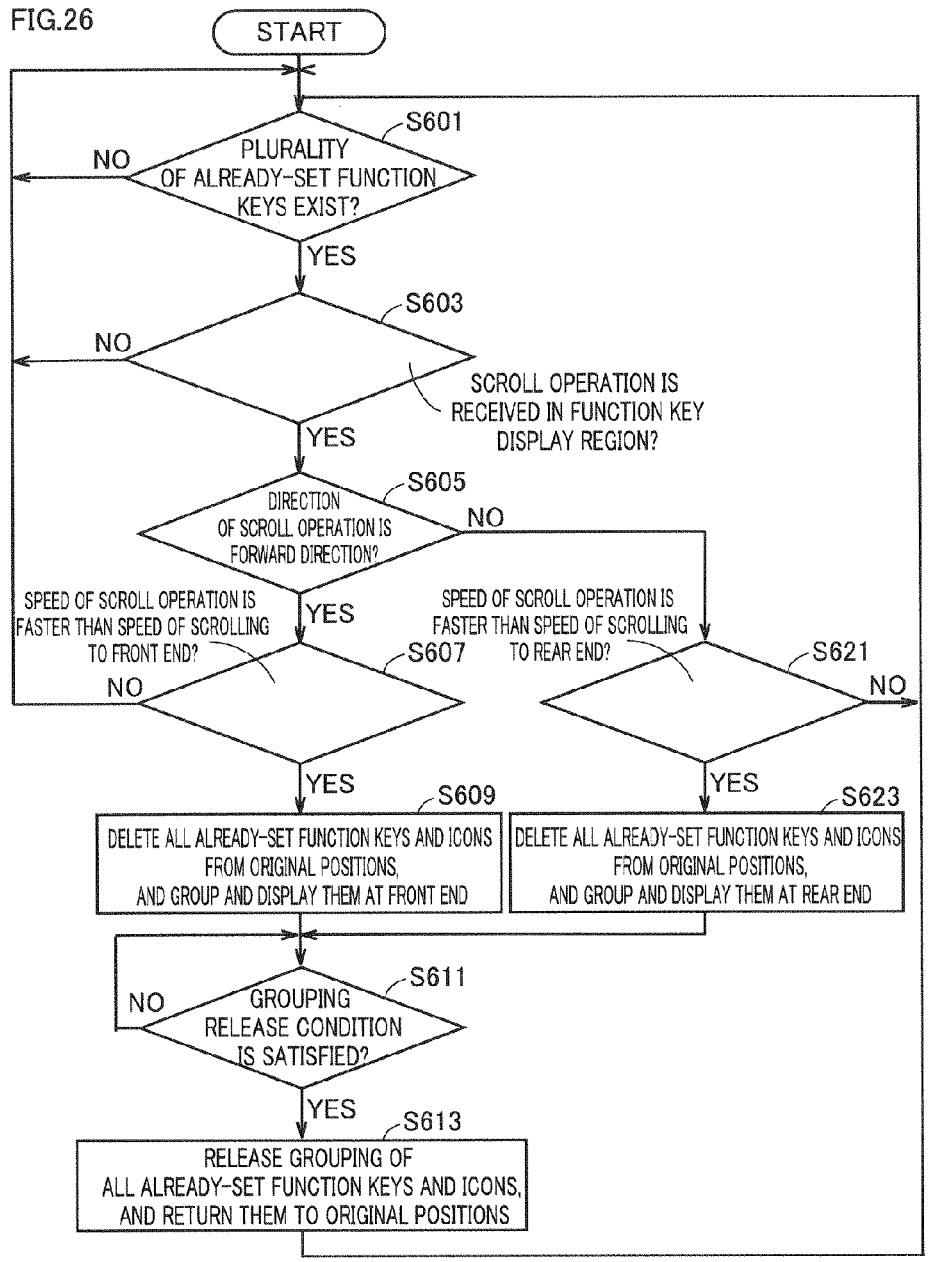
FIG. 26 is a flowchart illustrating the display processing performed to the operation panel 130 by the image forming apparatus 1 in the case that the sixth function key grouping method is adopted.

FIG. 26 is a flowchart illustrating the display processing performed to operation panel 130 by image forming apparatus 1 in the case that the sixth function key grouping method is adopted.

Referring to FIG. 26, in the case that mapscroller screen IM is displayed on display unit 134 of operation panel 130, CPU 101 of image forming apparatus 1 determines whether the plurality of already-set function keys exist (S601).

When it is determined that the plurality of already-set function keys exist in step S601 (YES in S601), CPU 101 determines whether the scroll operation is received (detected) in function key display region RG1 (S603).

When it is determined that the plurality of already-set function keys do not exist in step S601 (NO in S601), or when it is determined that the scroll operation is not received in function key display region RG1 in step S603 (NO in S603), CPU 101 goes to the processing in step S601.

When it is determined that the scroll operation is received in function key display region RG1 in step S603 (YES in S603), CPU 101 determines whether the direction of the scroll operation is the forward direction of function key display region RG1 (S605).

When it is determined that the direction of the scroll operation is the forward direction in step S605 (YES in S605), CPU 101 determines whether the speed of the scroll operation is faster than the speed of the scroll operation necessary to scroll function key display region RG1 to the front end (the cursor reaches the front end) (S607).

When it is determined that the speed of the scroll operation is faster than the speed of the scroll operation necessary to scroll function key display region RG1 to the front end in step S607 (YES in S607), CPU 101 deletes the already-set function keys and the icons from the original positions, and groups and displays the already-set function keys and the icons at the front ends of function key display region RG1 and icon display region RG2 (S609). Then CPU 101 goes to the processing in step S611.

When it is determined that the direction of the scroll operation is the backward direction in step S605 (NO in S605), CPU 101 determines whether the speed of the scroll operation is faster than the speed of the scroll operation necessary to scroll function key display region RG1 to the rear end (the cursor reaches the rear end) (S621).

When it is determined that the speed of the scroll operation is faster than the speed of the scroll operation necessary to scroll function key display region RG1 to the rear end in step S621 (YES in S621), CPU 101 deletes the already-set function keys and the icons from the original positions, and groups and displays the already-set function keys and the icons at the rear ends of function key display region RG1 and icon display region RG2 (S623). Then CPU 101 goes to the processing in step S611.

When it is determined that the speed of the scroll operation is not faster than the speed of the scroll operation necessary to scroll function key display region RG1 to the front end in step S607 (NO in S607), or when it is determined that the speed of the scroll operation is not faster than the speed of the scroll operation necessary to scroll function key display region RG1 to the rear end in step S621 (NO in S621), CPU 101 goes to the processing in step S601.

In step S611, CPU 101 determines whether the grouping release condition is satisfied (S611). CPU 101 repeats the processing in step S611 until the grouping release condition is satisfied.

When it is determined that the grouping release condition is satisfied in step S611 (YES in S611), CPU 101 releases the grouping of all the already-set function keys and the icons, and returns all the already-set function keys and the icons to the original positions (S613). Then CPU 101 goes to the processing in step S601.

[Seventh Function Key Grouping Method]

In the first to sixth function key grouping methods, the grouping target keys are the already-set function key and the icon. Alternatively, the grouping target keys may be the not-set function key and the icon. In the following seventh to tenth function key grouping method, the case that the grouping target keys are the not-set function key and the icon will be described.

In the seventh function key grouping method, in the case that function key display region RG1 is scrolled to the end portion (the front end or the rear end, the rear end in this case) on mapscroller screen IM, image forming apparatus 1 displays a not-set function check key (an example of the grouping display key), which is used to receive the instruction to group the not-set function keys, on mapscroller screen IM. When receiving the press of the not-set function check key, image forming apparatus 1 groups and displays all the not-set function keys and the icons. The seventh function key grouping method differs substantially from the first function key grouping method in that a not-set function check key 15 is displayed instead of the setting check key, and that the not-set function keys and the icons are grouped instead of the already-set function keys and the icons.

Figure 27:
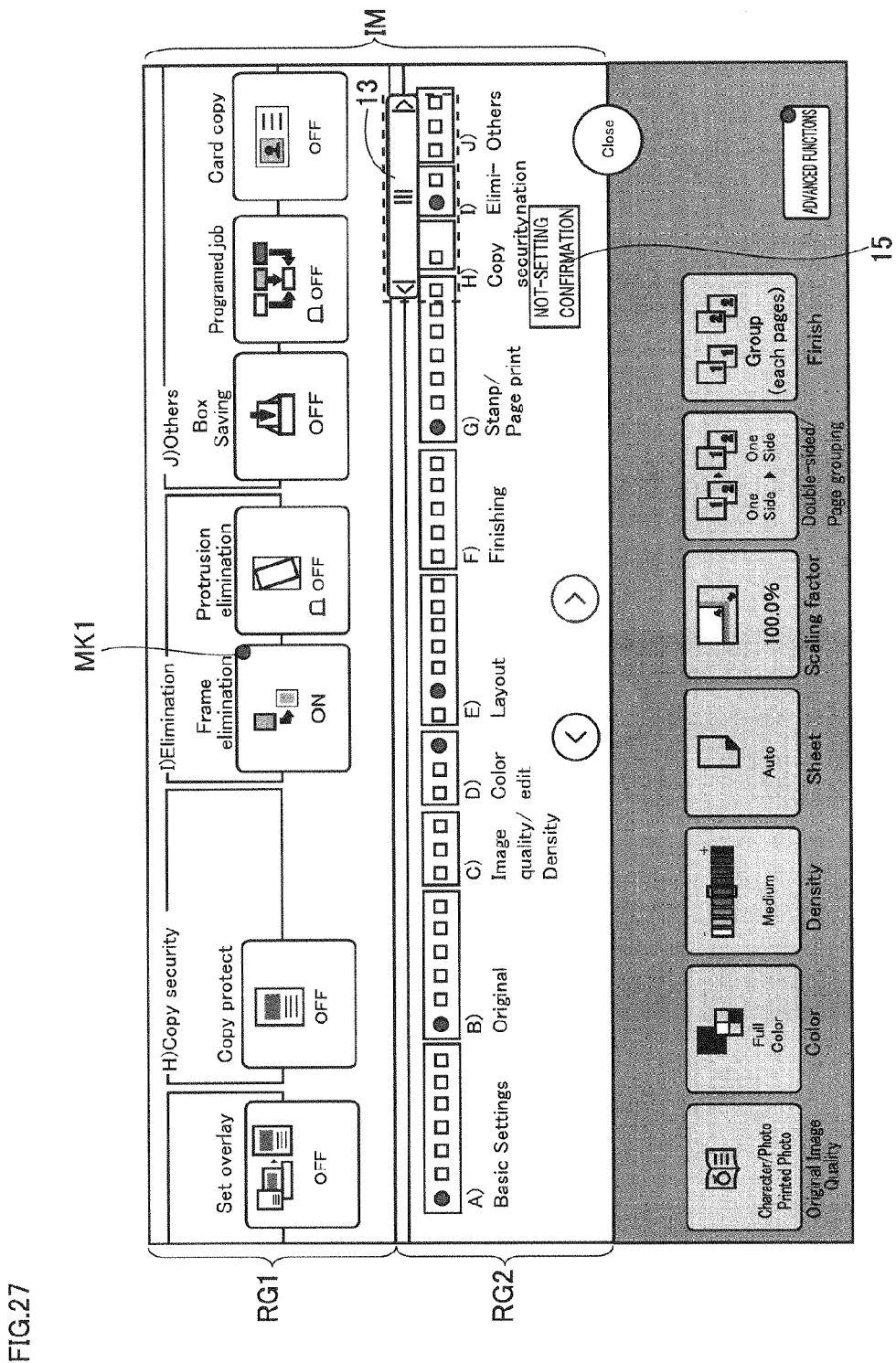
FIG. 27 is a view schematically illustrating the state in which the cursor 13 is moved to the rear end of the icon display region RG2 in a seventh function key grouping method.

FIG. 27 is a view schematically illustrating the state in which cursor 13 is moved to the rear end of icon display region RG2 in the seventh function key grouping method.

Referring to FIG. 27, image forming apparatus 1 receives the settings of the plurality of functions, and the plurality of already-set function keys (the function keys to which marks MK1 are added) exist. At this point, in the case that the user scrolls function key display region RG1 to the rear end (or in the case that the user moves cursor 13 to the rear end of icon display region RG2), image forming apparatus 1 displays not-set function check key 15 (an example of the grouping function key) on mapscroller screen IM.

In the case that function key display region RG1 is scrolled to the position except the front end and the rear end without pressing not-set function check key 15, or in the case that the number of functions in which the setting is received by image forming apparatus 1 becomes one or less, not-set function check key 15 may be deleted. In the case that the settings of the plurality of functions are received, not-set function check key 15 may always be displayed on mapscroller screen IM irrespective of the position of displayed function key display region RG1.

Figure 28:
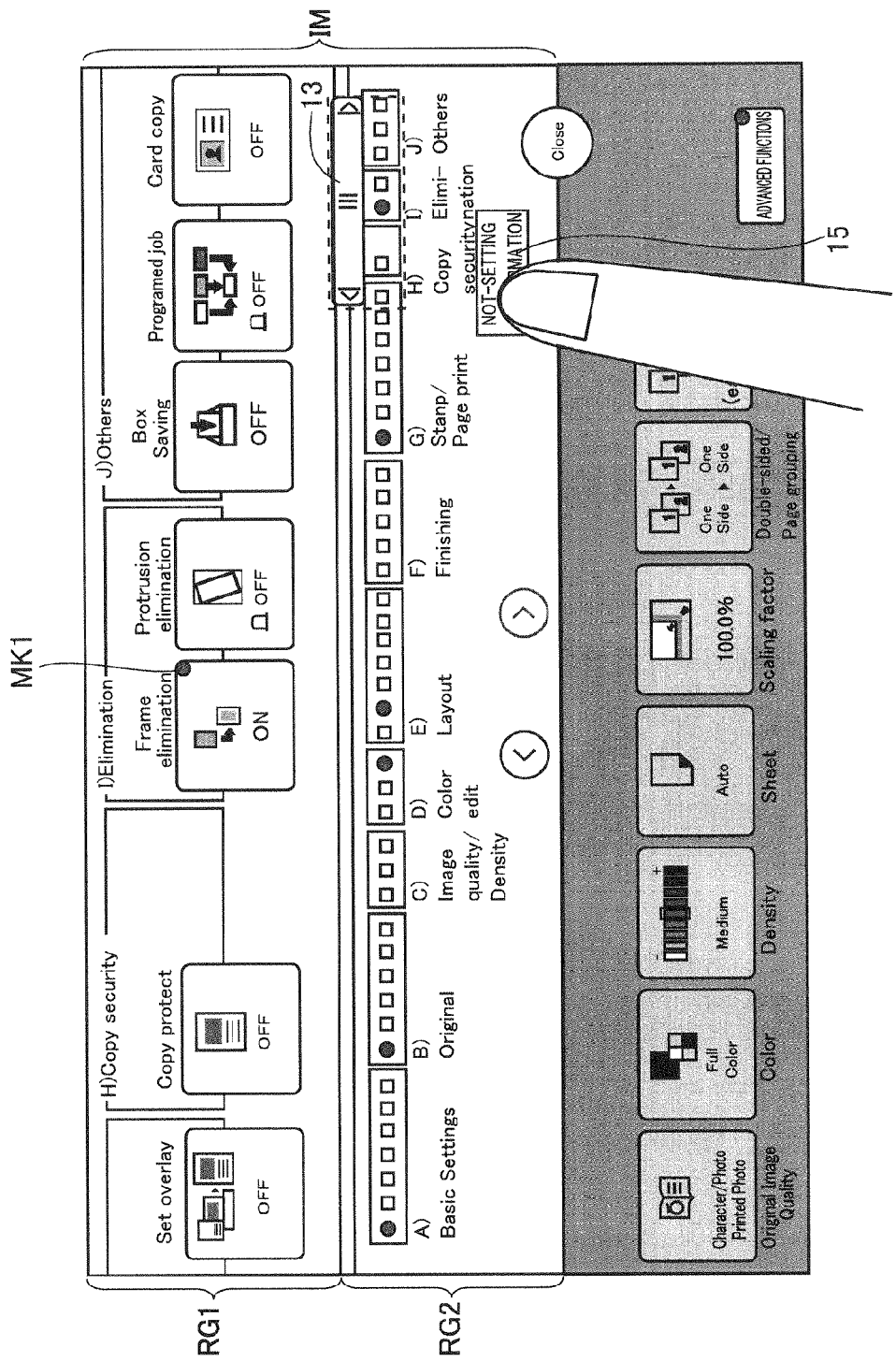
FIG. 28 is a view schematically illustrating the state in which the user presses a not-set function check key 15 on the mapscroller screen IM in FIG. 27.
Figure 29:
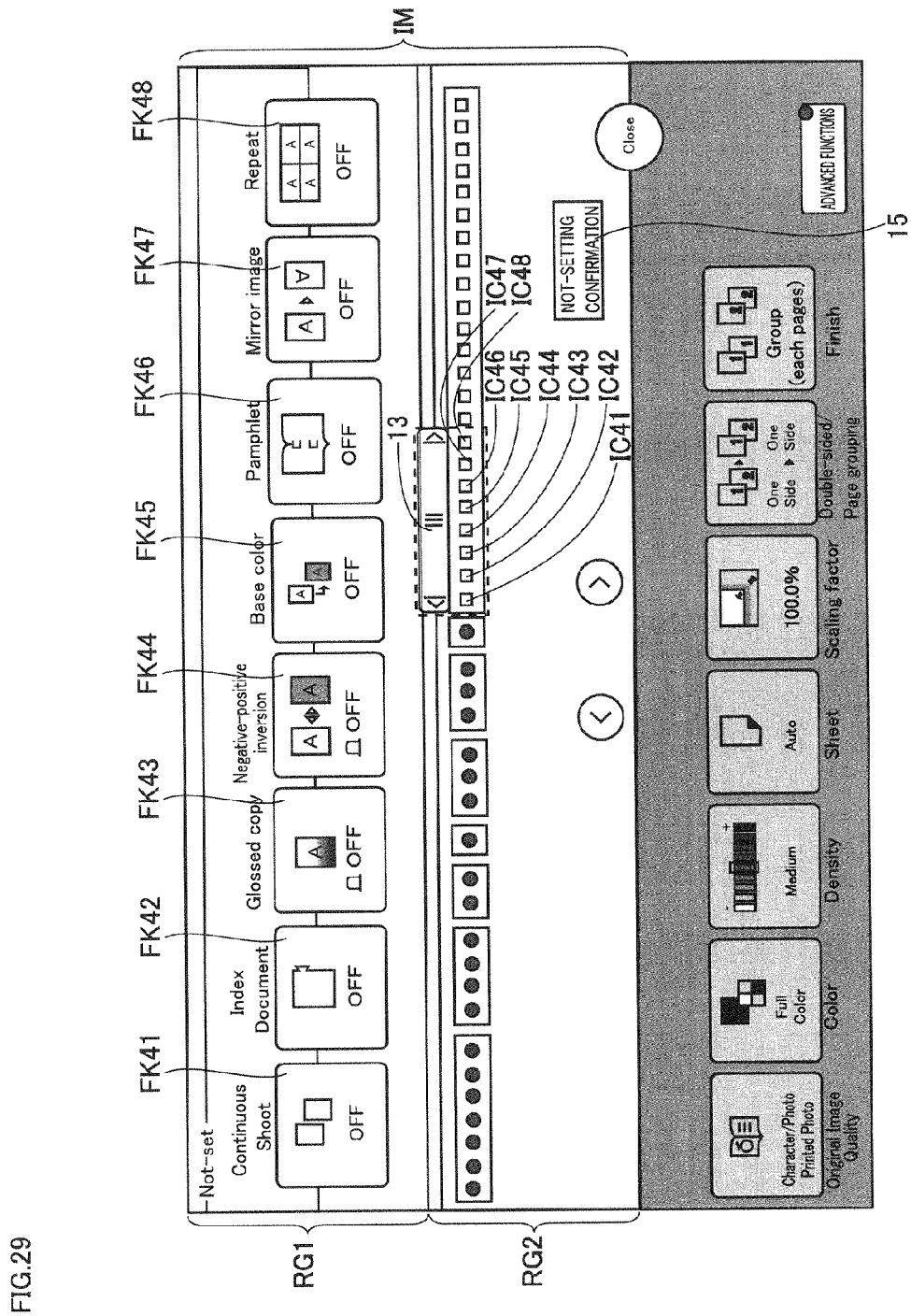
FIG. 29 is a view schematically illustrating the state in which not-set function keys and the icons are grouped in the seventh function key grouping method.

FIG. 28 is a view schematically illustrating the state in which the user presses not-set function check key 15 on mapscroller screen IM in FIG. 27. FIG. 29 is a view schematically illustrating the state in which not-set function keys and the icons are grouped in the seventh function key grouping method.

Referring to FIG. 28, when the user presses not-set function check key 15, image forming apparatus 1 arbitrarily groups and displays all the not-set function keys and the icons at the positions as illustrated in FIG. 29.

Referring to FIG. 29, for example, the not-set function keys are grouped and displayed at the rear end of function key display region RG1. The not-set function keys belong to a newly-produced group of "not-set". The not-set icons corresponding to the not-set function keys are also grouped and displayed at the rear end of icon display region RG2 in the order corresponding to the grouped not-set function keys.

In FIG. 29, only some not-set function keys are displayed because the number of not-set function keys is larger than the number (in this case, eight) of function keys that can be displayed. Cursor 13 is moved to the position overlapping icons IC41 to IC48 existing on the front end side in the grouped not-set function keys. Therefore, only function keys FK41 to FK48 existing on the front end side in the not-set function keys are displayed.

Function keys FK41 to FK48 are function keys of "page continuous copying", "index original", "glossy copying", "negative-positive inversion", "base color", "pamphlet", "mirror image", and "repeat", respectively.

Even if the user scrolls function key display region RG1 forward while the function keys and the icons are grouped and displayed, preferably image forming apparatus 1 continuously displays not-set function check key 15.

In the case that the press of not-set function check key 15 is received again while the not-set function keys and the icons are grouped and displayed, image forming apparatus 1 may release the grouping of the not-set function keys and the icons to return the not-set function keys and the icons to the original positions.

[Eighth Function Key Grouping Method]

In the eighth function key grouping method, when receiving the instruction to group the grouping target keys, image forming apparatus 1 groups and displays the function keys and the icons in a setting enable state in the not-set function keys and the icons, but does not group the function key and the icons in a setting disable state in the not-set function keys and the icons.

Figure 30:
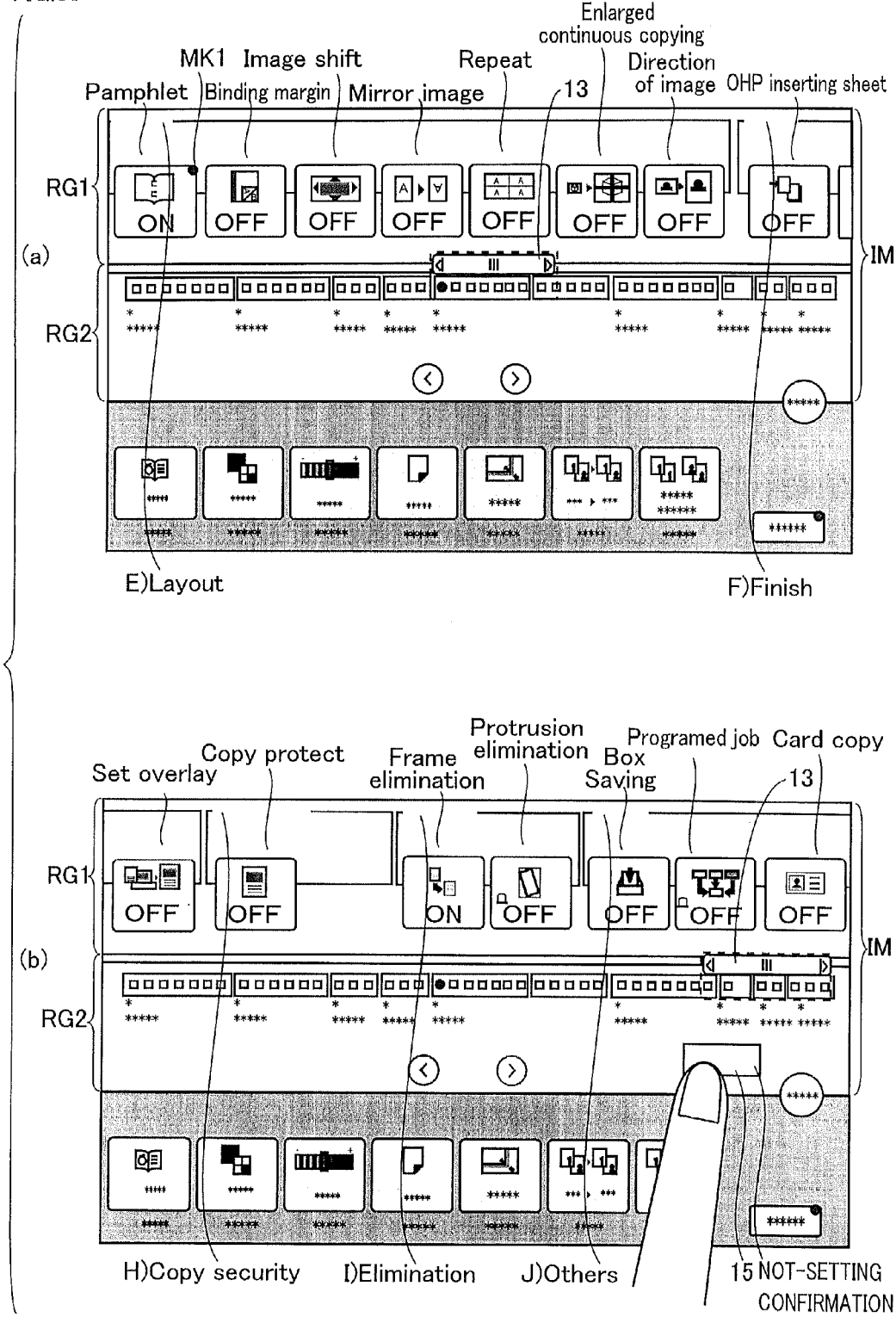
FIG. 30 is a view schematically illustrating the mapscroller screen IM that is displayed in the case that a setting of a function of "pamphlet" is received in an eighth function key grouping method.
Figure 31:
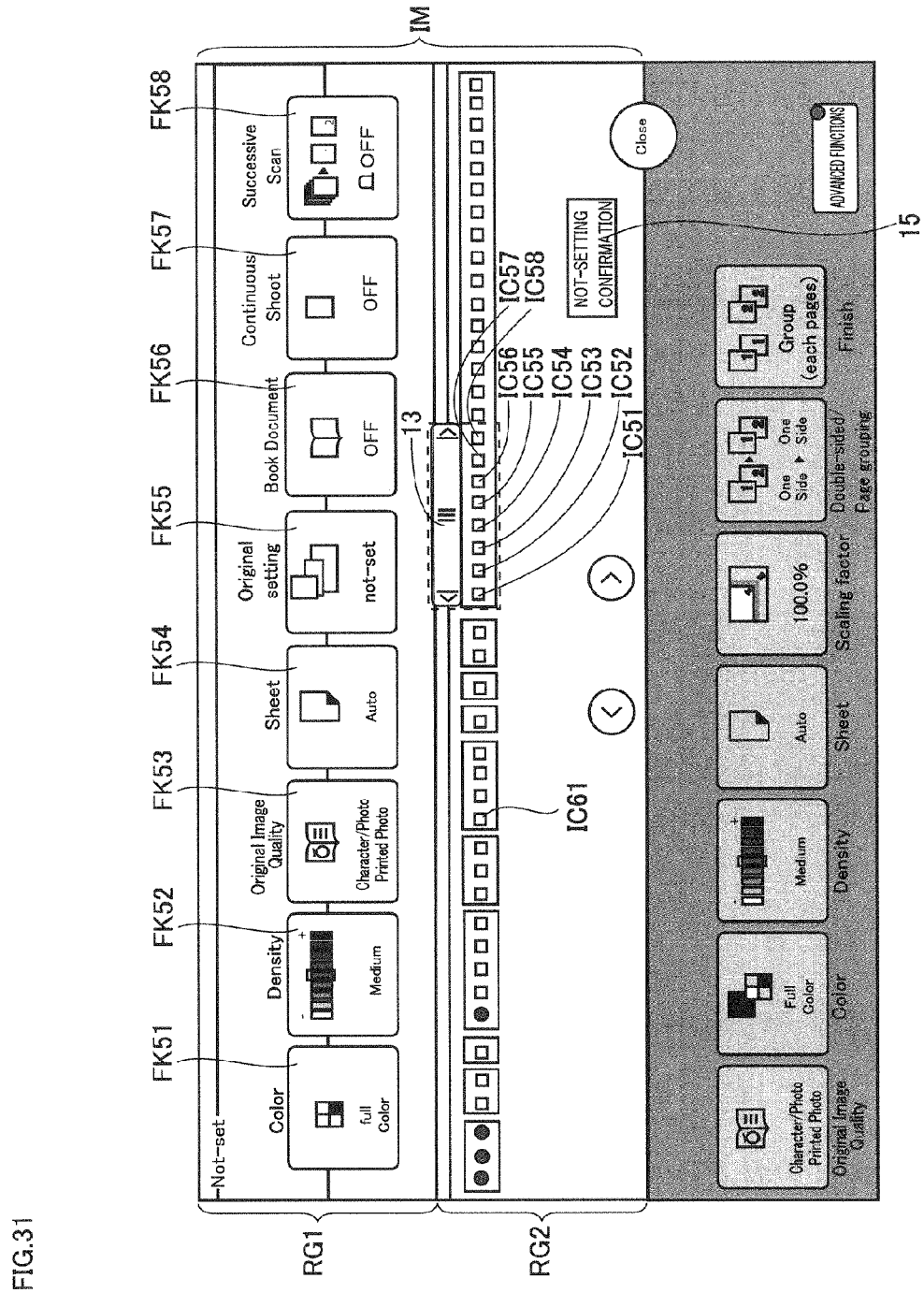
FIG. 31 is a view schematically illustrating the state in which the not-set function keys and the icons are grouped in the eighth function key grouping method.

FIG. 30 is a view schematically illustrating the state in which the setting of the function of "pamphlet" is received in the eighth function key grouping method. FIG. 31 is a view schematically illustrating the state in which the not-set function keys and the icons are grouped in the eighth function key grouping method.

Referring to FIG. 30(a), image forming apparatus 1 receives the setting of the function of "pamphlet". When receiving the setting of the function of "pamphlet", image forming apparatus 1 performs double-sided print, and prints two pages on one of surfaces of the sheet. As a result, when receiving the setting of the function of "pamphlet", image forming apparatus 1 does not receive some functions, which are inconsistent with the print method in the case that the function of "pamphlet" is set. Specifically, image forming apparatus 1 does not receive the settings of the 17 functions of "index original", "automatic image rotation", "glossy copying", "binding margin", "repeat", "enlarged continuous copying", "OHP inserting sheet", "inter-sheet", "insertion page", "repetitive stamp", "watermark", "overlay", "registration overlay", "copy protect", "out-of-original deletion", "program job", and "card copying" in the 40 not-set functions.

Referring to FIG. 30(b), when image forming apparatus 1 receives the press of not-set function check key 15 from the user while receiving the setting of the function of "pamphlet", image forming apparatus 1 groups and displays the function keys and icons related to the 23 functions, in which the setting can be received, in the 40 not-set functions as illustrated in FIG. 31. For example, the not-set function keys are grouped and displayed at the rear end of function key display region RG1. The not-set function keys belong to the newly-produced group of "not-set". On the other hand, image forming apparatus 1 does not group the function keys and icons (for example, an icon IC61 of "OHP inserting sheet") related to the 17 functions, in which the setting is not received, in the 40 not-set functions.

In FIG. 31, only some not-set function keys are displayed because the number of not-set function keys is larger than the number (in this case, eight) of function keys that can be displayed. Cursor 13 is moved to the position overlapping icons IC51 to IC58 existing on the front end side in the grouped not-set function keys. Therefore, only function keys FK51 to FK58 existing on the front end side in the not-set function keys are displayed.

Function keys FK51 to FK58 are the function keys of "color", "density", "original image quality", "sheet", "original setting", "book original", "page continuous copying", and "continuous reading", respectively.

Because other grouping methods are similar to the seventh function key grouping method, the overlapping description is neglected.

Figure 32:
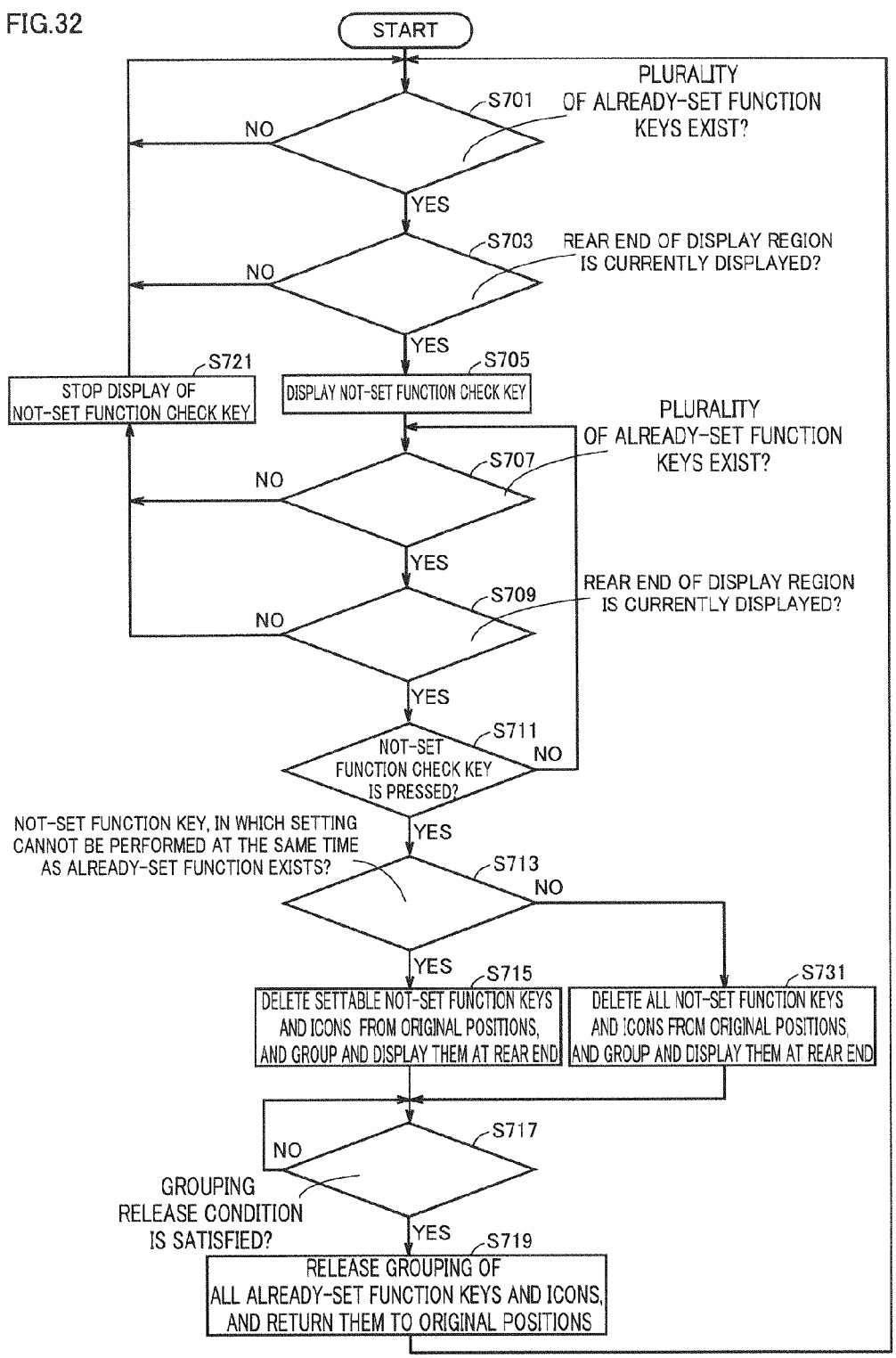
FIG. 32 is a flowchart illustrating the display processing performed to the operation panel 130 by the image forming apparatus 1 in the case that the eighth function key grouping method is adopted.

FIG. 32 is a flowchart illustrating the display processing performed to operation panel 130 by image forming apparatus 1 in the case that the eighth function key grouping method is adopted.

Referring to FIG. 32, in the case that mapscroller screen IM is displayed on display unit 134 of operation panel 130, CPU 101 of image forming apparatus 1 determines whether the plurality of already-set function keys exist (S701).

When it is determined that the plurality of already-set function keys exist in step S701 (YES in S701), CPU 101 determines whether the rear end of function key display region RG1 is currently displayed (S703).

When it is determined that the rear end of function key display region RG1 is currently displayed in step S703 (YES in S703), CPU 101 displays not-set function check key 15 on the mapscroller screen (S705). Then CPU 101 goes to the processing in step S707.

When it is determined that the plurality of already-set function keys do not exist in step S701 (NO in S701), or when it is determined that the rear end of function key display region RG1 is not currently displayed in step S703 (NO in S703), CPU 101 goes to the processing in step S701.

In step S707, CPU 101 determines whether the plurality of already-set function keys exist (S707).

When it is determined that the plurality of already-set function keys exist in step S707 (YES in S707), CPU 101 determines whether the rear end of function key display region RG1 is currently displayed (S709).

When it is determined that the rear end of function key display region RG1 is currently displayed in step S709 (YES in S709), CPU 101 goes to the processing in step S711.

When it is determined that the plurality of already-set function keys do not exist in step S707 (NO in S707), or when it is determined that the rear end of function key display region RG1 is not currently displayed in step S709 (NO in S709), CPU 101 stops the display of not-set function check key 15 (S721). Then CPU 101 goes to the processing in step S701.

In step S711, CPU 101 determines whether not-set function check key 15 is pressed (S711).

When it is determined that not-set function check key 15 is pressed in step S711 (YES in S711), CPU 101 determines whether the function key related to the not-set function, in which the setting cannot be performed at the same time as the already-set function exists (S713). On the other hand, when it is determined that not-set function check key 15 is pressed in step S711 (NO in S711), CPU 101 goes to the processing in step S707.

When it is determined that the function key related to the function, in which the setting cannot simultaneously be performed exists in step S713 (YES in S713), CPU 101 deletes the function keys and icons related to the not-set function, in which the setting can simultaneously be performed, from the original positions, and groups and displays the not-set function keys and the icons at the rear ends of function key display region RG1 and icon display region RG2 (S715). Then CPU 101 goes to the processing in step S717.

When it is determined that the function key related to the not-set function, in which the setting cannot simultaneously be performed does not exist in step S713 (NO in S713), CPU 101 deletes all the not-set function keys and the icons from the original positions, and groups and displays the not-set function keys and the icons at the rear ends of function key display region RG1 and icon display region RG2 (S731). Then CPU 101 goes to the processing in step S717.

In step S717, CPU 101 determines whether the grouping release condition is satisfied (S717). CPU 101 repeats the processing in step S717 until the grouping release condition is satisfied.

In the seventh to tenth function key grouping methods, that image forming apparatus 1 receives the press of not-set function check key 15 again (only in the case of the seventh and eighth function key grouping methods) during the grouping display of the grouping function keys, that image forming apparatus 1 receives the flick operation toward the direction in which function key display region RG1 is not scrolled while function key display region RG1 is scrolled to one of the end portions during the grouping display of the grouping function keys, or that image forming apparatus 1 receives the pinch-out operation in icon display region RG2 during the grouping display of the grouping function keys can be adopted as the grouping release condition in image forming apparatus 1.

When it is determined that the grouping release condition is satisfied in step S717 (YES in S717), CPU 101 releases the grouping of the grouped not-set function keys and icons, and returns the grouped not-set function keys and icons to the original positions (S719). Then CPU 101 goes to the processing in step S701.

[Ninth Function Key Grouping Method]

In the ninth function key grouping method, image forming apparatus 1 groups and displays all the not-set function keys and the icons when image forming apparatus 1 receives the flick operation in the direction in which function key display region RG1 is not scrolled while function key display region RG1 is scrolled to the end portion. The ninth function key grouping method differs substantially from the second function key grouping method in that the not-set function keys and the icons are grouped instead of the already-set function keys and the icons.

Figure 33:
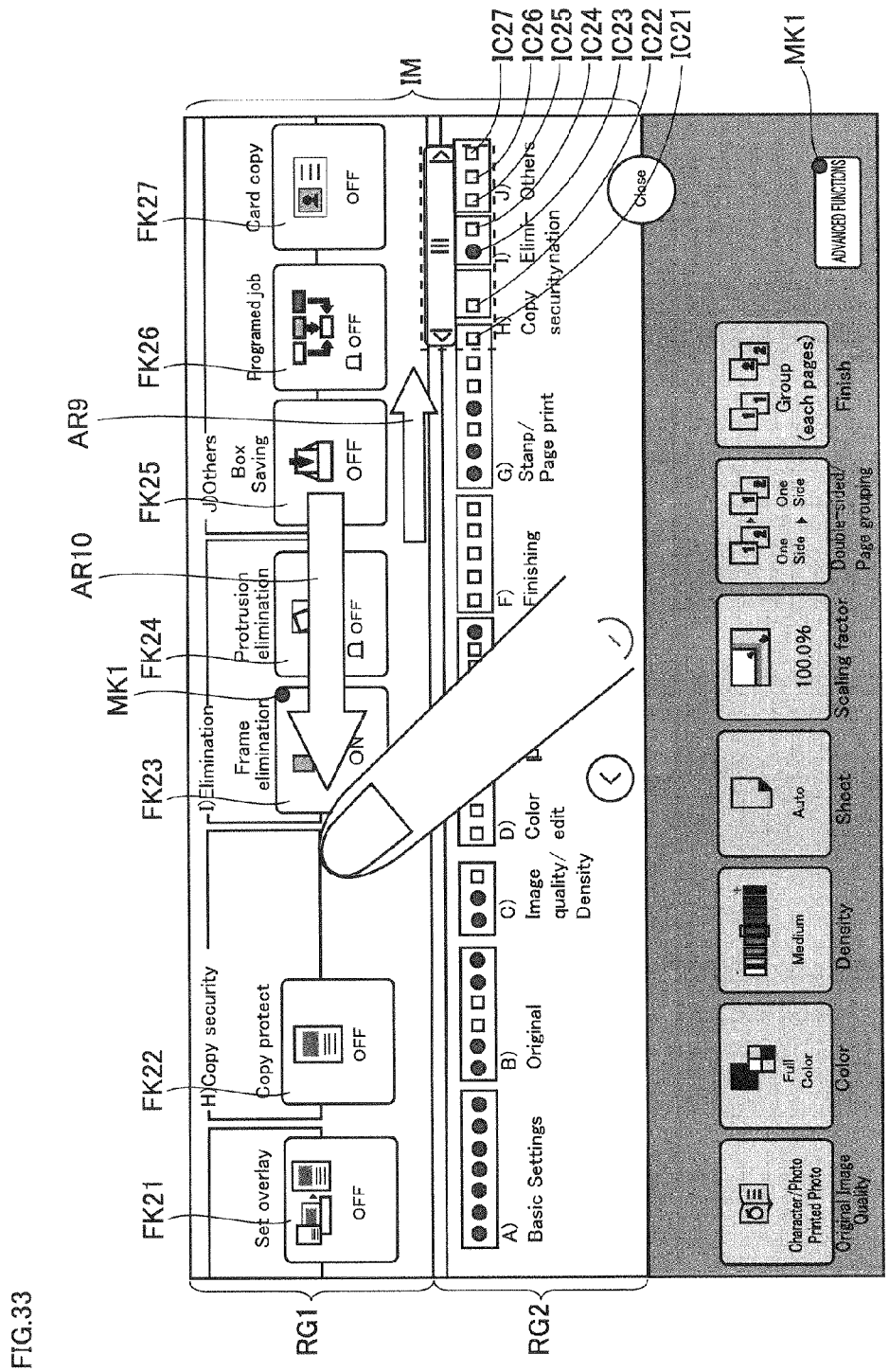
FIG. 33 is a view schematically illustrating the state in which the user performs the flick operation in order to perform the grouping display of grouping target keys in a ninth function key grouping method.
Figure 34:
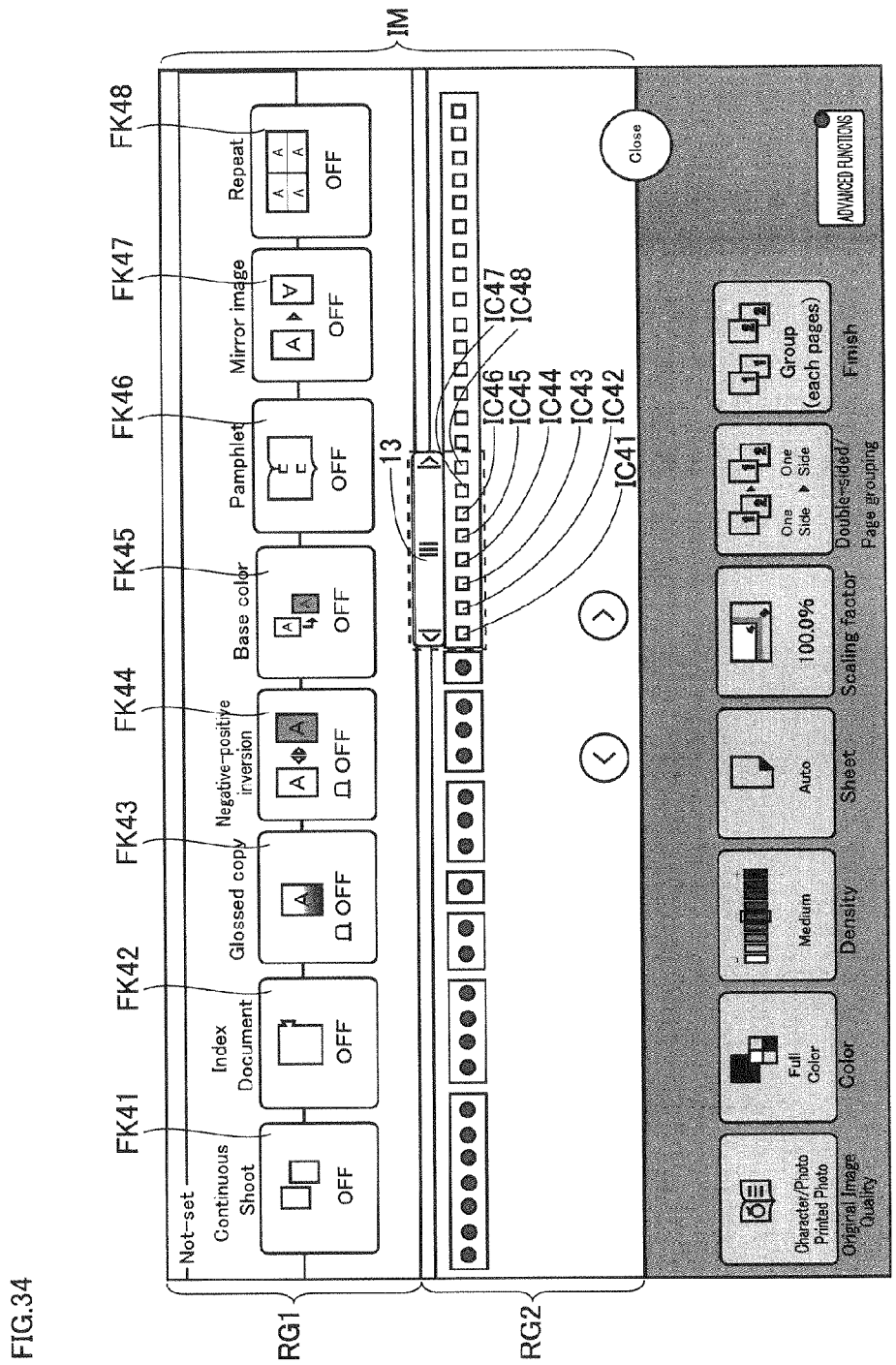
FIG. 34 is a view schematically illustrating the state in which the already-set function keys and the icons are grouped in the ninth function key grouping method.

FIG. 33 is a view schematically illustrating the state in which the user performs the flick operation in order to perform the grouping display of grouping target keys in the ninth function key grouping method. FIG. 34 is a view schematically illustrating the state in which the already-set function keys and the icons are grouped in the ninth function key grouping method.

Referring to FIG. 33, image forming apparatus 1 receives the settings of the plurality of functions, and the plurality of already-set function keys (the function keys to which marks MK1 are added) exist. Cursor 13 is moved in the direction indicated by an arrow AR9, and located at the rear end of icon display region RG2. Function key display region RG1 is scrolled to the rear end, and function keys FK21 to FK27 corresponding to seven icons IC21 to IC27 overlapping cursor 13 are displayed in function key display region RG1. When receiving the flick operation (to scroll function key display region RG1 backward) in the direction indicated by an arrow AR10 in function key display region RG1, image forming apparatus 1 groups and displays the not-set function keys and the icons at the rear ends of function key display region RG1 and icon display region RG2 as illustrated in FIG. 34.

Image forming apparatus 1 may group and display the grouping target keys when receiving the flick operation in the direction in which the scrolling is not performed in function key display region RG1. In the state in FIG. 33, function key display region RG1 is scrolled only in the case that the flick operation to scroll function key display region RG1 backward is received. Accordingly, image forming apparatus 1 may group and display the grouping target keys when receiving the flick operation to scroll function key display region RG1 in the vertical direction in addition to the flick operation to scroll function key display region RG1 backward.

In FIG. 34, only some not-set function keys are displayed because the number of not-set function keys is larger than the number (in this case, eight) of function keys that can be displayed. Cursor 13 is moved to the position overlapping icons IC41 to IC48 existing on the front end side in the grouped not-set function keys. Therefore, only function keys FK41 to FK48 existing on the front end side in the not-set function keys are displayed.

[Tenth Function Key Grouping Method]

In the tenth function key grouping method, when receiving the instruction to group the grouping target keys in the ninth function key grouping method, image forming apparatus 1 groups and displays only the function keys and the icons in the setting enable state in the not-set function keys and the icons.

Figure 36:
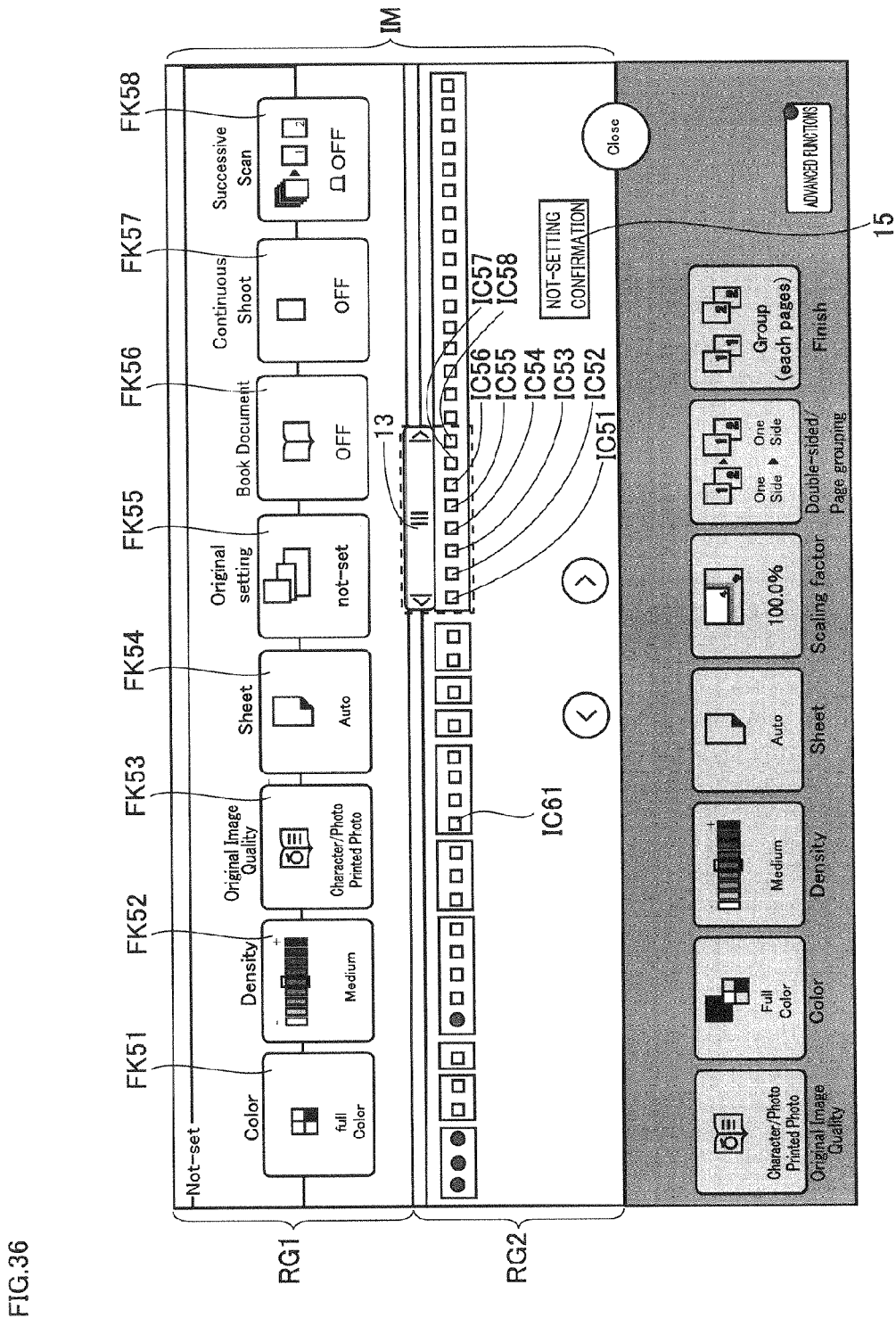
FIG. 36 is a view schematically illustrating the state in which the not-set function keys and the icons are grouped in the tenth function key grouping method.

FIG. 35 is a view schematically illustrating the state in which the setting of the function of "pamphlet" is received in the tenth function key grouping method. FIG. 36 is a view schematically illustrating the state in which the not-set function keys and the icons are grouped in the tenth function key grouping method.

Referring to FIG. 35(a), image forming apparatus 1 receives the setting of the function of "pamphlet". When receiving the setting of the function of "pamphlet", image forming apparatus 1 performs double-sided print, and prints two pages on one of surfaces of the sheet. As a result, when receiving the setting of the function of "pamphlet", image forming apparatus 1 does not receive some functions, which are inconsistent with the print method in the case that the function of "pamphlet" is set.

Referring to FIG. 35(b), image forming apparatus 1 groups and displays only the function keys and icons related to the functions, in which the setting can be received, in the not-set functions as illustrated in FIG. 36, when image forming apparatus 1 receives the flick operation in the direction in which function key display region RG1 is not scrolled as indicated by an arrow AR11 while image forming apparatus 1 receives the setting of the function of "pamphlet" and function key display region RG1 is scrolled to the rear end. The function keys and icons related to the functions, in which the setting can be received, in the not-set functions are similar to those of the eighth function key grouping method. For example, the not-set function keys are grouped and displayed at the rear end of function key display region RG1. The not-set function keys belong to the newly-produced group of "not-set". On the other hand, image forming apparatus 1 does not group the function keys and icons related to the functions, in which the setting is not received, in the not-set functions.

In FIG. 36, only some not-set function keys are displayed because the number of not-set function keys is larger than the number (in this case, eight) of function keys that can be displayed. Cursor 13 is moved to the position overlapping icons IC51 to IC58 existing on the front end side in the grouped not-set function keys. Therefore, only function keys FK51 to FK58 existing on the front end side in the not-set function keys are displayed.

Figure 37:
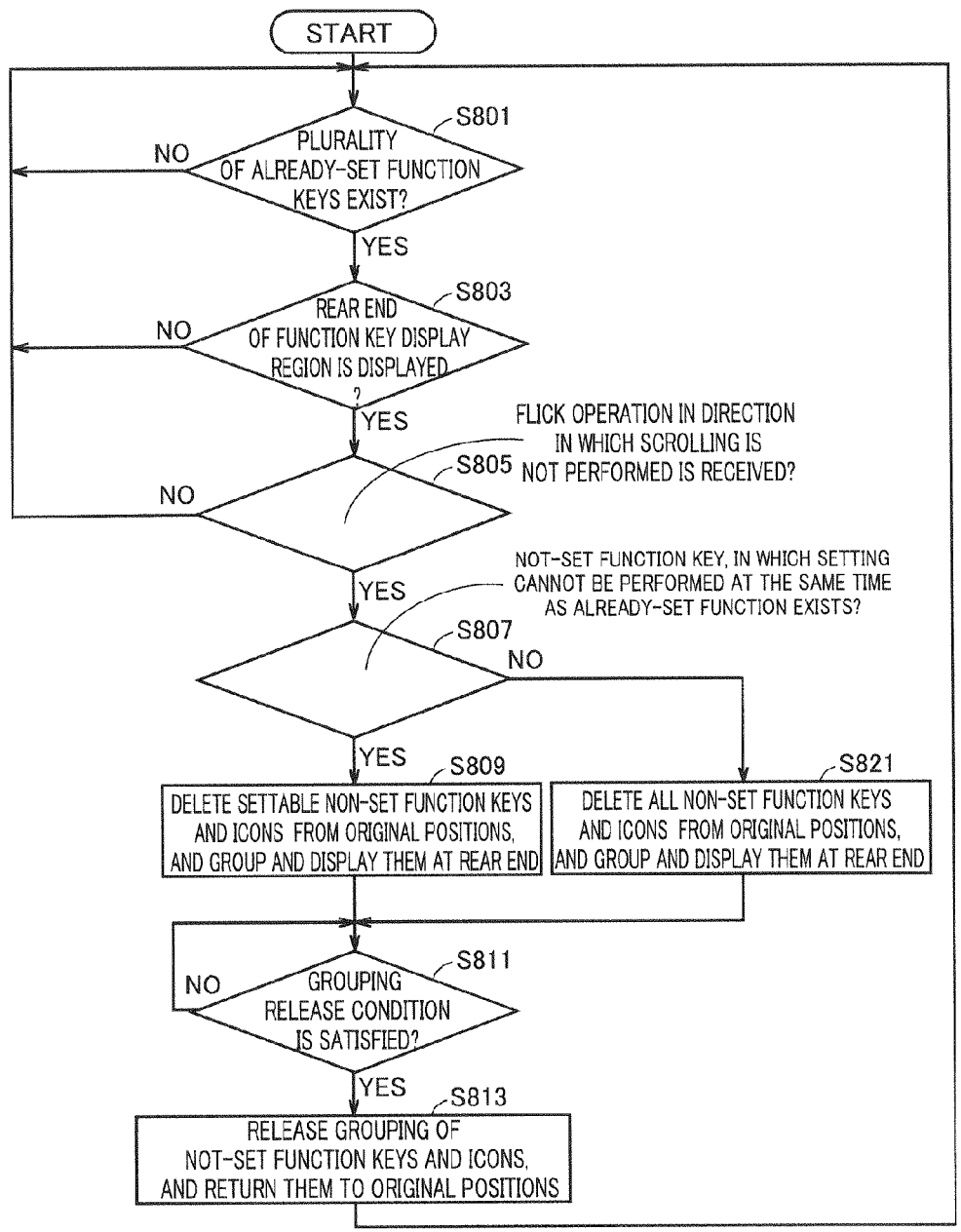
FIG. 37 is a flowchart illustrating the display processing performed to the operation panel 130 by the image forming apparatus 1 in the case that the tenth function key grouping method is adopted.

FIG. 37 is a flowchart illustrating the display processing performed to operation panel 130 by image forming apparatus 1 in the case that the tenth function key grouping method is adopted.

Referring to FIG. 37, in the case that mapscroller screen IM is displayed on display unit 134 of operation panel 130, CPU 101 of image forming apparatus 1 determines whether the plurality of already-set function keys exist (S801).

When it is determined that the plurality of already-set function keys exist in step S801 (YES in S801), CPU 101 determines whether the rear end of function key display region RG1 is currently displayed (S803).

When it is determined that the rear end of function key display region RG1 is currently displayed in step S803 (YES in S803), CPU 101 determines whether the flick operation in the direction in which the scrolling is not performed is received (S805).

When it is determined that the plurality of already-set function keys do not exist in step S801 (NO in S801), when it is determined that the rear end of function key display region RG1 is not currently displayed in step S803 (NO in S803), or when it is determined that the flick operation in the direction in which the scrolling is not performed is not received in step S805 (NO in S805), CPU 101 goes to the processing in step S801.

When it is determined that the flick operation in the direction in which the scrolling is not performed is received in step S805 (YES in S805), CPU 101 determines whether the function key related to the not-set function, in which the setting cannot be performed at the same time as the already-set function exists (S807).

When it is determined that the function key related to the not-set function, in which the setting cannot simultaneously be performed exists in step S807 (YES in S807), CPU 101 deletes the function keys and icons related to the not-set function, in which the setting can simultaneously be performed, from the original positions, and groups and displays the function keys and the icons at the rear ends of function key display region RG1 and icon display region RG2 (S809). Then CPU 101 goes to the processing in step S811.

When it is determined that the function key related to the not-set function, in which the setting cannot simultaneously be performed does not exist in step S807 (NO in S807), CPU 101 deletes all the not-set function keys and the icons from the original positions, and groups and displays the not-set function keys and the icons at the rear ends of function key display region RG1 and icon display region RG2 (S821). Then CPU 101 goes to the processing in step S811.

In step S811, CPU 101 determines whether the grouping release condition is satisfied (S811). CPU 101 repeats the processing in step S811 until the grouping release condition is satisfied.

When it is determined that the grouping release condition is satisfied in step S811 (YES in S811), CPU 101 releases the grouping of the grouped not-set function keys and icons, and returns the grouped not-set function keys and icons to the original positions (S813). Then CPU 101 goes to the processing in step S801.

[First Modification]

When image forming apparatus 1 receives the operation to move the grouping target keys (for example, the drag operation of the grouping target keys) while grouping and displaying the grouping target keys, image forming apparatus 1 may move the grouping position of the grouping target keys in accordance with the received operation.

Figure 38:
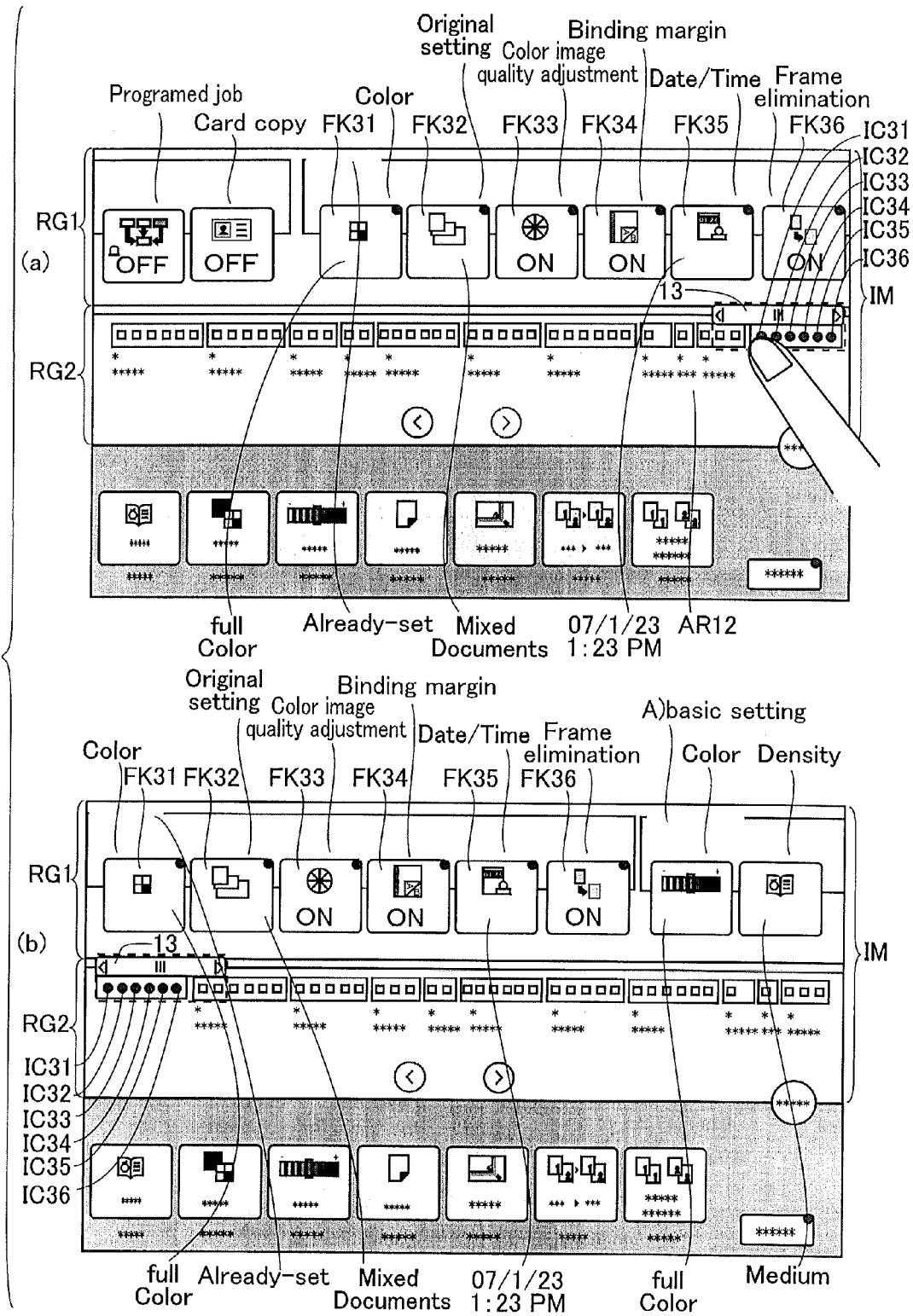
FIG. 38 is a view schematically illustrating the state in which a grouping position of the grouping target keys moves in a first modification.

FIG. 38 is a view schematically illustrating the state in which the grouping position of the grouping target keys moves in a first modification.

Referring to FIG. 38(a), already-set function keys FK31 to FK36 and icons IC31 to IC36 are grouped and displayed at the rear ends of function key display region RG1 and icon display region RG2. At this point, as indicated by an arrow AR12, the user performs the drag operation forward with grouped icons IC31 to IC36 as the starting point (or the user performs the drag operation forward with grouped function keys FK31 to FK36 as the starting point).

When receiving the drag operation, image forming apparatus 1 moves function keys FK31 to FK36 and icons IC31 to IC36 forward by the distance in accordance with the movement distance of the drag operation. In FIG. 38(b), function keys FK31 to FK36 and icons IC31 to IC36 are moved to the front end portions of function key display region RG1 and icon display region RG2.

[Second Modification]

Image forming apparatus 1 may receive the setting information on the function related to the print from information processing apparatus 3 or another image forming apparatus 1 instead of receiving the setting of the function related to the print through operation panel 130.

Figure 39:
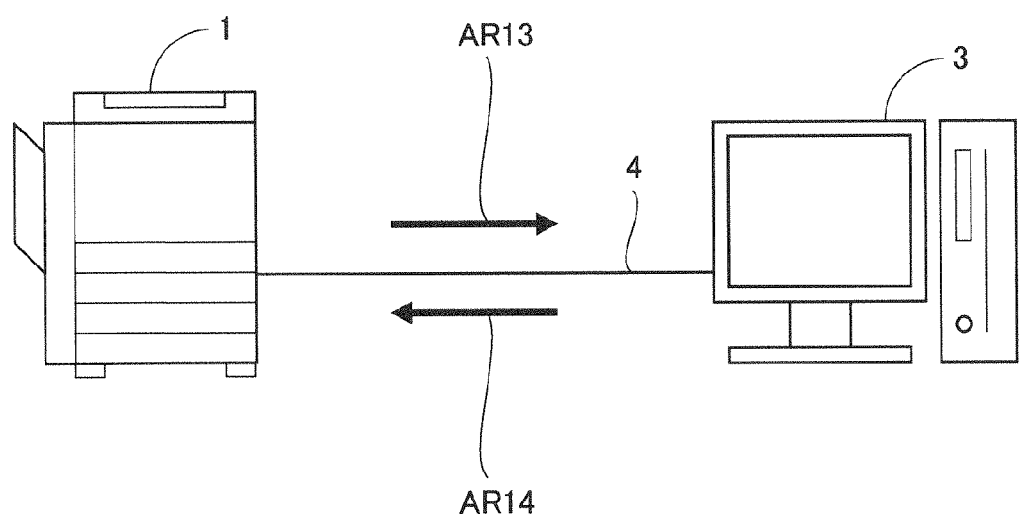
FIG. 39 is a view schematically illustrating the state in which the image forming apparatus 1 receives information on the setting of a function related to print from an information processing apparatus 3 in a second modification.

FIG. 39 is a view schematically illustrating the state in which image forming apparatus 1 receives information on the setting of the function related to print from information processing apparatus 3 in a second modification.

Referring to FIG. 39, image forming apparatus 1 makes the request to information processing apparatus 3 to transmit the information as indicated by an arrow AR13 in response to the request from the user through operation panel 130. When receiving the request, information processing apparatus 3 transmits the setting information (a setting file) on the function related to the print stored in the fixed storage device of information processing apparatus 3 to image forming apparatus 1 through network 4 as indicated by an arrow AR14. Image forming apparatus 1 reflects the setting of the function related to the print on mapscroller screen IM based on the received information. Information processing apparatus 3 may transmit the setting information on the function related to the print to image forming apparatus 1 in response to the request from the user through the operation unit of information processing apparatus 3. Image forming apparatus 1 groups and displays the grouping target keys by one of the first to tenth function key grouping methods in the predetermined case.

[Effect of Embodiment]

According to the embodiment, the image processor that can easily check the function setting situation can be provided.

According to the embodiment, when setting the plurality of functions, the user can easily check the already-set function or the not-set function on mapscroller screen IM, and easily check the function setting situation. Because the function setting situation can be checked on mapscroller screen IM, the user can easily change the setting using the screen identical to the screen, with which the setting is checked, when changing the setting.

[Others]

In the case that the grouping target keys are grouped and displayed, image forming apparatus 1 may simultaneously display a print execution key on mapscroller screen IM to make an inquiry to the user about whether the print is performed by the received setting. In the case that the grouping target keys are grouped and displayed, image forming apparatus 1 may simultaneously display a storage key on mapscroller screen IM to make an inquiry to the user about whether the received setting is stored in image forming apparatus 1 or information processing apparatus 3.

The setting check key or the not-set function check key may be provided as the hardware key of operation panel 130. In this case, image forming apparatus 1 performs the grouping display only when the setting check key or the not-set function check key is pressed while the plurality of settings are received. When the setting check key or the not-set function check key is pressed while the plurality of settings are not received, image forming apparatus 1 cancels the operation.

In the first to tenth function key grouping methods, the function keys and the icons are collected in arbitrary positions, and the function keys and the icons may be collected at the rear ends and the front ends of the display regions or other positions.

The array directions of the function keys and the icons are not limited to the horizontal direction, but the function keys and the icons may be arrayed in one arbitrary direction. A plurality of stages of the function keys and the icons, which are arrayed in one direction, may be provided.

The grouping display may always be performed, in the case that the plurality of function settings are received, or in the case that some sort of condition is satisfied while the plurality of function settings are received (for example, the reception of the grouping instruction).

The processing of the embodiment may be performed by software or a hardware circuit. A program that executes the processing of the embodiment may be provided, and the program may be provided to the user while stored in a recording medium such as a CD-ROM, a flexible disk, a hard disk, a ROM, a RAM, and a memory card. The program is executed by a computer such as a CPU. The program may be downloaded on a device through a communication line such as the Internet.

The embodiment is described only by way of example, but not restrictive. The scope of the present invention is indicated by not the above description but the claims of the present invention, and the meanings equivalent to the claims and all the changes within the scope of the present invention are also included in the present invention.

Although the preset invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a first display unit for displaying an operation screen including a function key display region, the function key display region displaying a plurality of function keys arrayed in a first direction while being scrollable in said first direction, each of the plurality of function keys being configured to accept a setting of a respective function related to image processing,
a determining unit for determining whether settings of two or more of the plurality of functions are accepted;
a second display unit for grouping, displaying and rearranging, on said operation screen, when it is determined that settings of two or more of the plurality of functions are accepted, the plurality of function keys so that a targeted group of targeted function keys is formed of:
only targeted function keys which are two or more function keys corresponding to the two or more of the plurality of functions in which the setting is accepted, or
only targeted function keys which correspond to a function other than the two or more of the plurality of functions in which the setting is accepted; and
a grouping instruction receiving unit for receiving a grouping instruction, wherein
said second display unit groups and displays said targeted group of targeted function keys when said grouping instruction receiving unit receives the grouping instruction.

2. The image processing apparatus according to claim 1, further comprising:
a grouping display key display unit for displaying, on said operation screen, a grouping display key which is of a key receiving the grouping instruction, when said function key display region is scrolled to one of end portions on said operation screen.

3. The image processing apparatus according to claim 2, further comprising
a first grouping release unit for releasing the grouping of said targeted group of targeted function keys, when a press of said grouping display key is received with said targeted group of targeted function keys grouped and displayed by said second display unit, wherein
said grouping instruction receiving unit includes a first grouping instruction receiving unit for receiving the press of said grouping display key as the grouping instruction.

4. The image processing apparatus according to claim 1, wherein said grouping instruction receiving unit includes a second grouping instruction receiving unit for receiving, as the grouping instruction, a flick operation toward a direction in which said function key display region is not scrolled with said function key display region scrolled to one of end portions on said operation screen.

5. The image processing apparatus according to claim 1, wherein said grouping instruction receiving unit includes a sixth grouping instruction receiving unit for receiving, as the grouping instruction, a scroll operation at a speed faster than a speed of a scroll operation necessary to scroll said function key display region to the end portion.

6. The image processing apparatus according to claim 1, wherein said second display unit groups and displays, as said targeted group of targeted function keys, the targeted function keys which is a key corresponding to a function other than the two or more of the plurality of functions in which the setting is accepted, and
said second display unit groups and displays said targeted group of targeted function keys in a setting enable state, but does not group the targeted group of targeted function keys in a setting disable state.

7. The image processing apparatus according to claim 1, further comprising:
a setting receiving unit for receiving the setting of the respective function related to the image processing through another screen function key, said another screen function key being a function key which is included in an operation screen different from said operation screen but not included in said operation screen, wherein
said second display unit groups and displays said another screen function key as said targeted group of targeted function keys.

8. The image processing apparatus according to claim 1, further comprising:
a grouping position moving unit for moving a grouping position of said targeted group of targeted function keys when an operation to move said targeted group of targeted function keys grouped and displayed by said second display unit is received.

9. The image processing apparatus according to claim 1, further comprising:
a second grouping release unit for releasing the grouping of said targeted group of targeted function keys when a flick operation toward a direction in which said function key display region is not scrolled is received with said function key display region scrolled to one of end portions in said operation screen after said targeted group of targeted function keys are grouped and displayed by said second display unit.

10. The image processing apparatus according to claim 1, wherein said operation screen further includes an icon display region, the icon display region displaying a plurality of icons arrayed in said first direction in an order identical to that of the plurality of function keys displayed in said function key display region, the plurality of icons corresponding to the plurality of function keys displayed in said function key display region.

11. The image processing apparatus according to claim 10, wherein said grouping instruction receiving unit includes a third grouping instruction receiving unit for receiving, as the grouping instruction, a pinch-in operation which is performed in said icon display region.

12. The image processing apparatus according to claim 11, wherein said second display unit groups and displays said targeted group of targeted function keys in a position corresponding to an icon existing between two starting points of said pinch-in operation.

13. The image processing apparatus according to claim 10, wherein said grouping instruction receiving unit includes a fourth grouping instruction receiving unit for receiving, as the grouping instruction, a flick operation in which, with one of two arbitrary points being touched in said icon display region, the other point is moved toward the one point.

14. The image processing apparatus according to claim 13, wherein said second display unit groups and displays, as said targeted group of targeted function keys, the function key corresponding to the icon existing between said two arbitrary points in at least one of the plurality of function keys corresponding to the plurality of functions, in which the setting is accepted, and the plurality of function keys corresponding to the plurality of functions, in which the setting is not accepted, but does not group the function key corresponding to the icon which does not exist between said two arbitrary points.

15. The image processing apparatus according to claim 13, wherein said second display unit groups and displays said targeted group of targeted function keys in a position corresponding to an icon existing in one of said points.

16. The image processing apparatus according to claim 10, wherein said grouping instruction receiving unit includes a fifth grouping instruction receiving unit for receiving, as the grouping instruction, a touch to the plurality of icons corresponding to the functions, in which the setting is accepted.

17. The image processing apparatus according to claim 16, wherein said second display unit groups and displays said targeted group of targeted function keys in a position corresponding to an icon which is finally touched in said fifth grouping instruction receiving unit.

18. The image processing apparatus according to claim 10, further comprising:
a third grouping release unit for releasing the grouping of said targeted group of targeted function keys when a pinch-out operation is received in said icon display region after said targeted group of targeted function keys are grouped and displayed by said second display unit.

19. The image processing apparatus according to claim 10, wherein said second display unit groups and displays, as the targeted group of targeted function keys on said operation screen, at least a part of the plurality of icons corresponding to the plurality of functions, in which the setting is accepted, or at least a part of the plurality of icons corresponding to the plurality of functions, in which the setting is not accepted.

20. An image processing apparatus control method comprising:
displaying an operation screen including a function key display region, the function key display region displaying a plurality of function keys arrayed in a first direction while being scrollable in said first direction, each of the plurality of function keys accepting a setting of a respective function related to image processing;
determining whether settings of two or more of the plurality of functions are accepted;
grouping, displaying and rearranging, on said operation screen, when it is determined that settings of two or more of the plurality of functions are accepted, the plurality of function keys so that a targeted group of targeted function keys is formed of:
only targeted function keys which are two or more function keys corresponding to the two or more of the plurality of functions, in which the setting is accepted, or
only targeted function keys which correspond to a function other than the two or more of the plurality of functions, in which the setting is accepted; and
receiving a grouping instruction, wherein
said targeted group of targeted function keys is grouped and displayed when the grouping instruction is received.

21. A non-transitory, computer-readable recording medium in which a control program for an image processing apparatus is stored, said control program causing a computer to execute:

displaying an operation screen including a function key display region, the function key display region displaying a plurality of function keys arrayed in a first direction while being scrollable in said first direction, each of the plurality of function keys accepting a setting of a respective function related to image processing;

determining whether settings of two or more of the plurality of functions are accepted;

grouping, displaying and rearranging, on said operation screen, when it is determined that settings of two or more of the plurality of functions are accepted, the plurality of function keys so that a targeted group of targeted function keys is formed of:

only targeted function keys which are two or more function keys corresponding to the two or more of the plurality of functions, in which the setting is accepted, or only targeted function keys which correspond to a function other than the two or more of the plurality of functions, in which the setting is accepted; and receiving a grouping instruction, wherein said targeted group of targeted function keys is grouped and displayed when the grouping instruction is received.

\* \* \* \* \*